US011092113B2

(12) United States Patent
Franklin et al.

(10) Patent No.: US 11,092,113 B2
(45) Date of Patent: Aug. 17, 2021

(54) FUEL SYSTEM CONTROL

(71) Applicant: Eaton Intelligent Power Limited, Dublin (IE)

(72) Inventors: Max Russell Franklin, Birmingham, MI (US); Nikhil Nahar, Pune (IN); Vaughn Kevin Mills, Chelsea, MI (US); Mark Beaupre, Southfield, MI (US); Matthew Memmer, Plymouth, MI (US); Steven L. Ambrose, Farmington Hills, MI (US); Robert P. Benjey, Dexter, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/880,906

(22) Filed: May 21, 2020

(65) Prior Publication Data
US 2020/0284226 A1 Sep. 10, 2020

Related U.S. Application Data

(63) Continuation of application No. 15/589,404, filed on May 8, 2017, now Pat. No. 10,662,900.
(Continued)

(30) Foreign Application Priority Data

Mar. 21, 2017 (IN) .............................. 201711009914

(51) Int. Cl.
*B60K 15/035* (2006.01)
*F02M 25/08* (2006.01)
(Continued)

(52) U.S. Cl.
CPC ....... *F02M 25/08* (2013.01); *B60K 15/03519* (2013.01); *F16K 5/166* (2013.01);
(Continued)

(58) Field of Classification Search
CPC ............ F02M 25/08; F02M 2025/0863; F16K 11/166; F16K 11/161; F16K 11/0836;
(Continued)

(56) References Cited

U.S. PATENT DOCUMENTS 5,246,199 A 9/1993 Numoto et al.
5,282,497 A ‡ 2/1994 Allison ............ B60K 15/03504
137/58
(Continued)

FOREIGN PATENT DOCUMENTS

WO 2016049320 A1 3/2016
WO WO 2016/049320 ‡ 3/2016 ............. F02M 37/00
(Continued)

OTHER PUBLICATIONS

International Search Report and Written Opinion for International Application No. PCT/US2015/051950 dated Dec. 9, 2015, 14 pages.‡

*Primary Examiner* — Nicolas A Arnett
(74) *Attorney, Agent, or Firm* — RMCK Law Group PLC

(57) ABSTRACT

An evaporative emissions control system includes a first vent valve configured to selectively open and close a first vent, a second vent valve configured to selectively open and close a second vent, a fuel level sensor configured to sense a fuel level in the fuel tank, a pressure sensor configured to sense a pressure in the fuel tank, an accelerometer configured to measure an acceleration of the vehicle, and a controller configured to regulate operation of the first and second vent valves to provide pressure relief for the fuel tank. The controller is programmed to determine if a refueling event is occurring based one signals indicating the fuel level is increasing, the pressure in the fuel tank is increasing,
(Continued)

and the vehicle is not moving, and open at least one of the first and second vent valves based on determining the refueling event is occurring.

18 Claims, 48 Drawing Sheets

Related U.S. Application Data

(60) Provisional application No. 62/336,963, filed on May 16, 2016, provisional application No. 62/339,465, filed on May 20, 2016, provisional application No. 62/455,178, filed on Feb. 6, 2017, provisional application No. 62/465,482, filed on Mar. 1, 2017, provisional application No. 62/475,584, filed on Mar. 23, 2017, provisional application No. 62/483,737, filed on Apr. 10, 2017.

(51) Int. Cl.
| | |
|---|---|
| *F16K 11/07* | (2006.01) |
| *F16K 31/524* | (2006.01) |
| *F16K 5/16* | (2006.01) |
| *F16K 31/54* | (2006.01) |
| *F16K 11/16* | (2006.01) |
| *F16K 11/083* | (2006.01) |
| *F16K 31/04* | (2006.01) |
| *F16K 31/06* | (2006.01) |
| *F16K 31/53* | (2006.01) |
| *B60K 15/03* | (2006.01) |
| *B60K 15/077* | (2006.01) |

(52) U.S. Cl.
CPC .......... *F16K 11/07* (2013.01); *F16K 11/0836* (2013.01); *F16K 11/161* (2013.01); *F16K 11/166* (2013.01); *F16K 31/047* (2013.01); *F16K 31/0627* (2013.01); *F16K 31/52408* (2013.01); *F16K 31/52416* (2013.01); *F16K 31/53* (2013.01); *F16K 31/54* (2013.01); *B60K 2015/0319* (2013.01); *B60K 2015/0325* (2013.01); *B60K 2015/03203* (2013.01); *B60K 2015/03217* (2013.01); *B60K 2015/03302* (2013.01); *B60K 2015/03509* (2013.01); *B60K 2015/03514* (2013.01); *B60K 2015/03523* (2013.01); *B60K 2015/03576* (2013.01); *B60K 2015/03585* (2013.01); *B60K 2015/0777* (2013.01); *B60Y 2400/302* (2013.01); *B60Y 2400/306* (2013.01); *B60Y 2400/3019* (2013.01); *F02M 2025/0863* (2013.01)

(58) Field of Classification Search
CPC .......... F16K 11/07; F16K 5/166; F16K 31/54; F16K 31/52416; F16K 31/047; F16K 31/53; F16K 31/0627; F16K 31/52408; B60K 15/03519; B60K 2015/0319; B60K 2015/03203; B60K 2015/03523; B60K 2015/0325; B60K 2015/03576; B60K 2015/03217; B60K 2015/03514; B60K 2015/03509; B60K 2015/03302; B60K 2015/03585; B60Y 2400/3019; B60Y 2400/306; B60Y 2400/302

See application file for complete search history.

(56) References Cited

U.S. PATENT DOCUMENTS

| | | | |
|---|---|---|---|
| 5,553,595 A | | 9/1996 | Nishioka et al. |
| 5,669,361 A | ‡ | 9/1997 | Weissinger ...... B60K 15/03519 123/520 |
| 5,878,725 A | | 3/1999 | Osterbrink |
| 6,003,568 A | | 12/1999 | Strnad, Jr. |
| 6,024,137 A | | 2/2000 | Strnad et al. |
| 6,213,170 B1 | | 4/2001 | Burke et al. |
| 6,230,693 B1 | | 5/2001 | Meiller et al. |
| 6,347,617 B1 | ‡ | 2/2002 | Kitamura ............ F02D 41/0032 123/198 D |
| 6,354,343 B1 | | 3/2002 | Strnad et al. |
| 6,382,191 B1 | | 5/2002 | Curran et al. |
| 6,405,747 B1 | ‡ | 6/2002 | King ................ B60K 15/03519 137/202 |
| 6,877,488 B2 | ‡ | 4/2005 | Washeleski ...... B60K 15/03504 123/41.31 |
| 7,296,600 B2 | * | 11/2007 | Ferreria .............. F02M 25/0836 141/302 |
| 7,568,494 B2 | ‡ | 8/2009 | Devall ................. F16K 24/044 137/202 |
| 7,634,347 B2 | ‡ | 12/2009 | Hill ........................ B60K 15/00 123/520 |
| 7,694,665 B2 | ‡ | 4/2010 | Ehrman ............. F02M 25/0872 123/51 |
| 7,866,356 B2 | ‡ | 1/2011 | Benjey ................. B67D 7/0476 141/19 |
| 8,584,704 B2 | ‡ | 11/2013 | Pifer .................. F02M 25/0836 137/59 |
| 8,869,777 B2 | ‡ | 10/2014 | Espinoza ............... F02M 25/08 123/198 D |
| 9,347,368 B2 | ‡ | 5/2016 | Ulrey ..................... F02M 25/08 |
| 9,809,441 B2 | ‡ | 11/2017 | Dudar ................... B67D 7/3272 |
| 9,932,944 B2 | ‡ | 4/2018 | Yang ................... F02M 37/0047 |
| 9,989,018 B2 | ‡ | 6/2018 | Dudar ................ F02D 41/0042 |
| 10,288,013 B2 | ‡ | 5/2019 | Dudar ................ F02M 25/089 |
| 10,364,763 B2 | * | 7/2019 | Dudar ................ F02M 25/0809 |
| 10,662,900 B2 | * | 5/2020 | Franklin ............. F16K 11/0836 |
| 2001/0029931 A1 | | 10/2001 | Burke et al. |
| 2002/0153374 A1 | ‡ | 10/2002 | Isobe ................... F02M 25/089 220/86.2 |
| 2013/0133628 A1 | | 5/2013 | Fornara et al. |
| 2013/0160877 A1 | ‡ | 6/2013 | Walter ............. B60K 15/03519 137/56 |
| 2013/0253799 A1 | | 9/2013 | Peters et al. |
| 2014/0033802 A1 | ‡ | 2/2014 | Dudar ................ F02M 25/0818 73/40.5 R |
| 2014/0060160 A1 | | 3/2014 | Pursifull |
| 2014/0116399 A1 | ‡ | 5/2014 | Ulrey ..................... F02M 25/08 123/520 |
| 2014/0158094 A1 | | 6/2014 | Meiller |
| 2014/0182561 A1 | ‡ | 7/2014 | Ibizugbe, Jr. ........... F02B 43/12 123/511 |
| 2014/0209069 A1 | | 7/2014 | Peters et al. |
| 2015/0114350 A1 | | 4/2015 | Pursifull |
| 2015/0316007 A1 | | 11/2015 | Williams et al. |
| 2016/0069303 A1 | | 3/2016 | Pursifull |
| 2016/0221518 A1 | ‡ | 8/2016 | McNicholas .......... B60K 28/10 |
| 2016/0341141 A1 | | 11/2016 | Dudar et al. |
| 2016/0348614 A1 | | 12/2016 | Dudar et al. |
| 2016/0368373 A1 | ‡ | 12/2016 | Dudar ................ B60K 15/077 |
| 2016/0369713 A1 | | 12/2016 | Pursifull et al. |
| 2017/0008390 A1 | ‡ | 1/2017 | Dudar ................ F02M 25/0818 |
| 2017/0159588 A1 | | 6/2017 | Honjo |
| 2017/0174501 A1 | | 6/2017 | Dudar et al. |
| 2017/0198662 A1 | | 7/2017 | Dudar |
| 2017/0260918 A1 | | 9/2017 | Dudar et al. |
| 2017/0292476 A1 | | 10/2017 | Dudar |
| 2017/0363046 A1 | | 12/2017 | Dudar et al. |
| 2018/0050587 A1 | | 2/2018 | Qin et al. |
| 2018/0066595 A1 | | 3/2018 | Dudar et al. |
| 2018/0087475 A1 | ‡ | 3/2018 | Mills ................ B60K 15/03519 |
| 2018/0163646 A1 | | 6/2018 | Tsutsumi et al. |
| 2018/0216578 A1 | | 8/2018 | Wodausch |
| 2018/0372030 A1 | | 12/2018 | Achleitner et al. |
| 2019/0040823 A1 | | 2/2019 | Pursifull et al. |
| 2019/0055905 A1 | | 2/2019 | Dudar |
| 2019/0101082 A1 | | 4/2019 | Sanuma et al. |
| 2019/0105960 A1 | | 4/2019 | Dudar |
| 2019/0113007 A1 | | 4/2019 | Kato et al. |
| 2019/0145326 A1 | ‡ | 5/2019 | Nahar ................. F02D 41/003 |
| 2019/0145331 A1 | | 5/2019 | Dudar |

(56) References Cited

U.S. PATENT DOCUMENTS

| | | |
|---|---|---|
| 2019/0178177 A1 | 6/2019 | Groussard et al. |
| 2019/0178179 A1 | 6/2019 | Wodausch et al. |
| 2019/0186423 A1 | 6/2019 | Choi |
| 2019/0203666 A1 | 7/2019 | Asanuma et al. |
| 2019/0211760 A1 | 7/2019 | Choi |
| 2019/0353112 A1 | 11/2019 | Kim |
| 2020/0254869 A1* | 8/2020 | Smith ................ F02M 25/0818 |

FOREIGN PATENT DOCUMENTS

| | | | | |
|---|---|---|---|---|
| WO | 2018013785 A2 | | 1/2018 | |
| WO | WO 2018/013785 | ‡ | 1/2018 | ........... B60K 15/035 |

\* cited by examiner
‡ imported from a related application

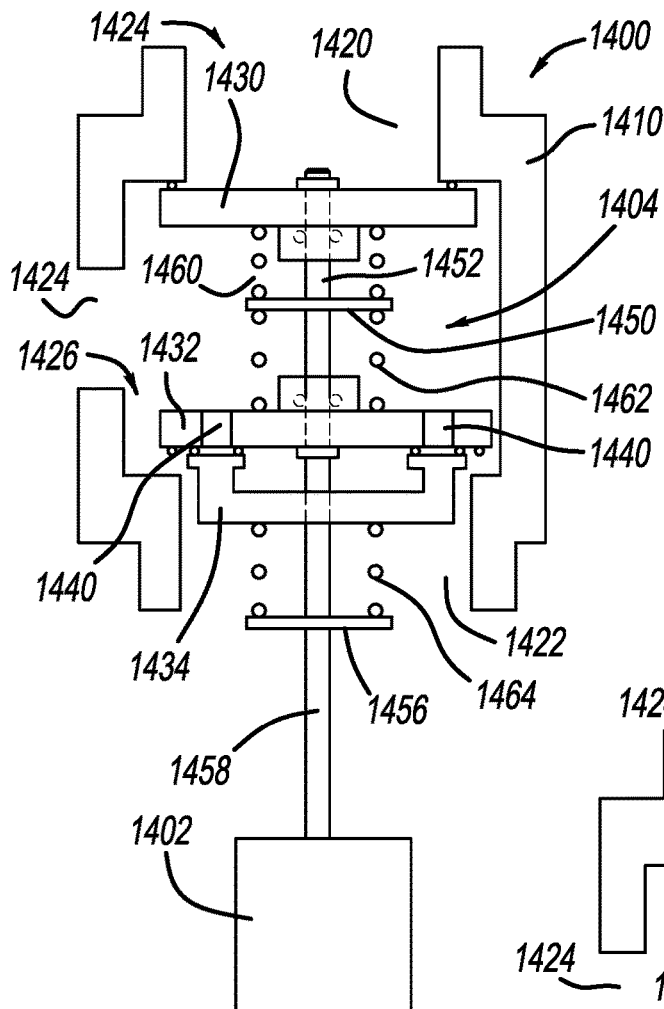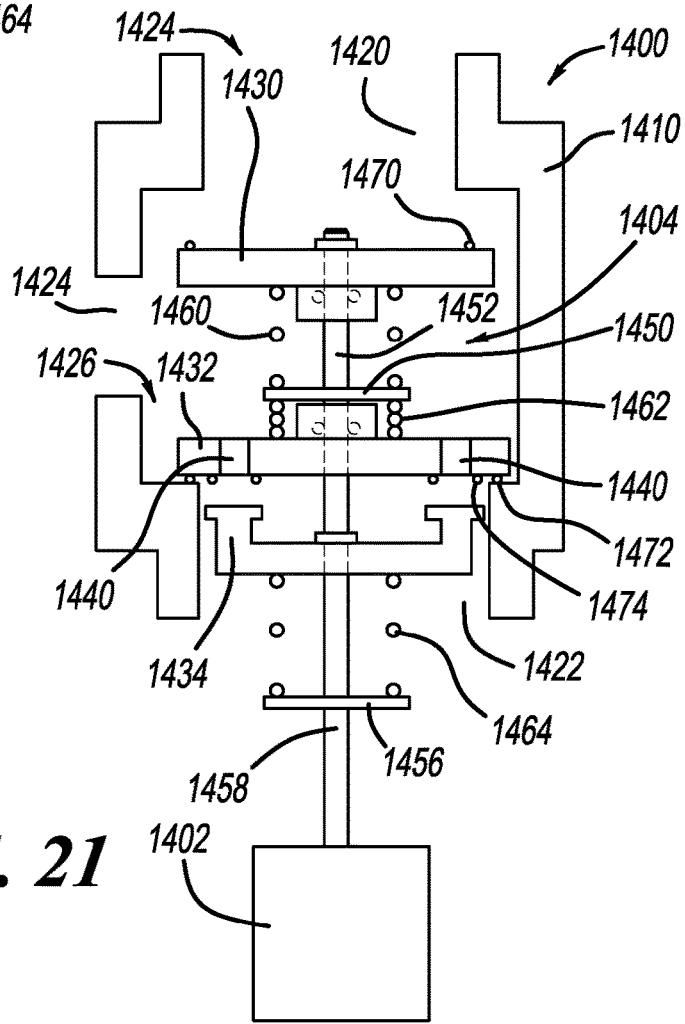

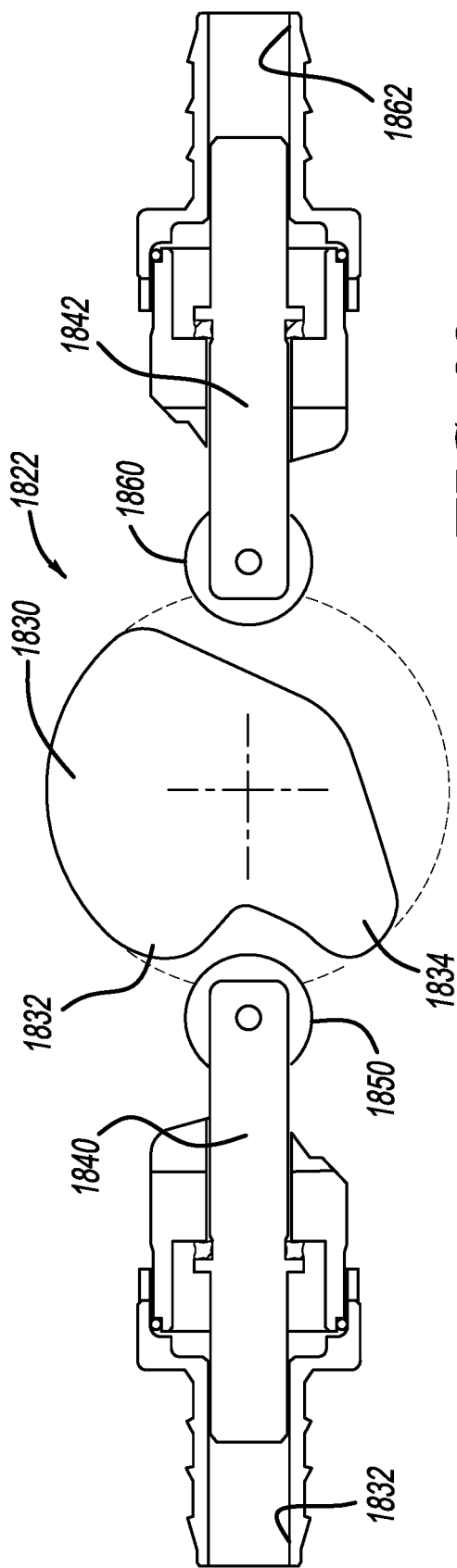
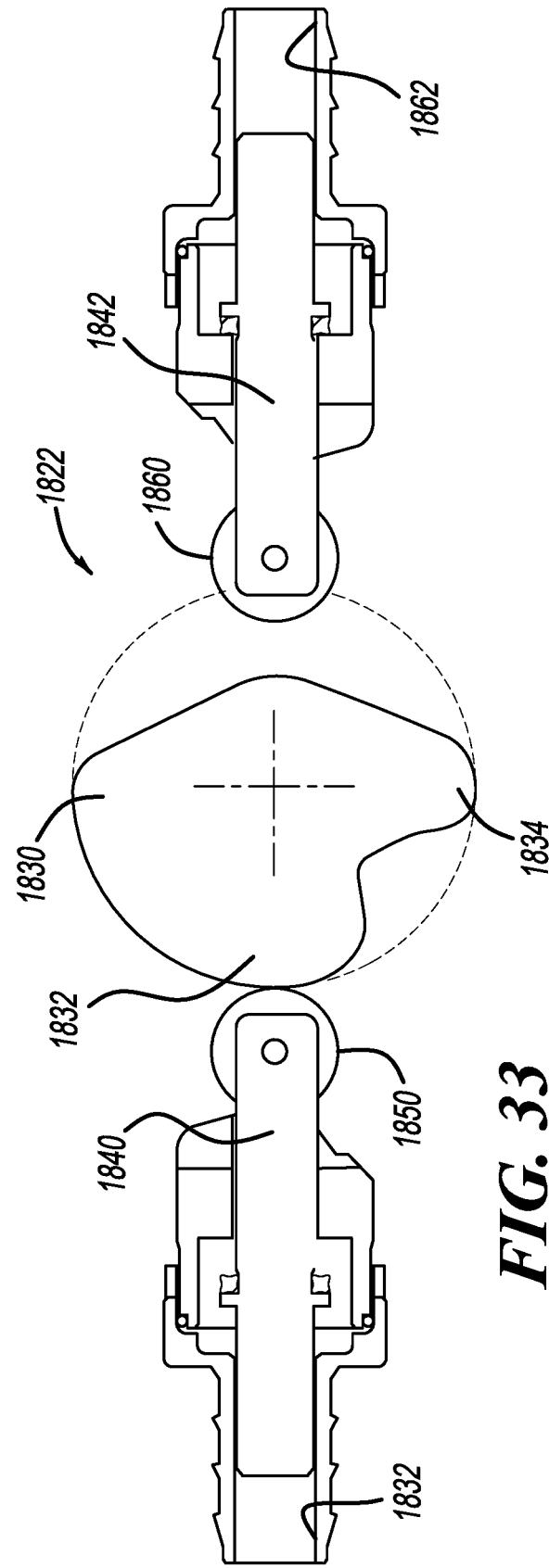
FIG. 32
FIG. 33

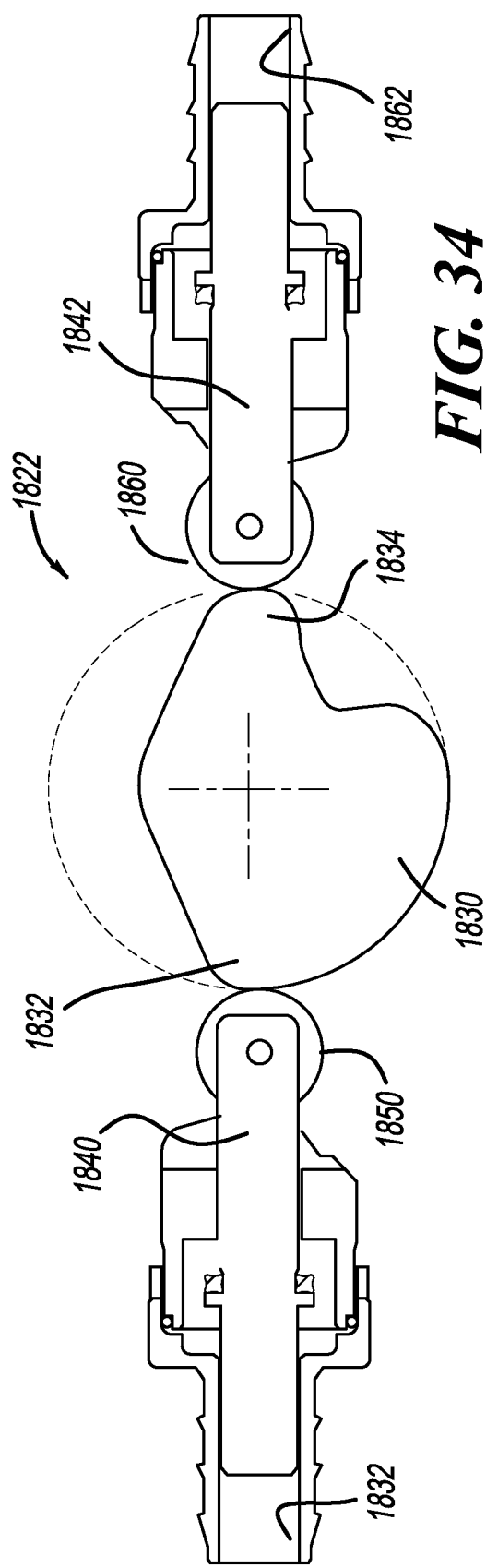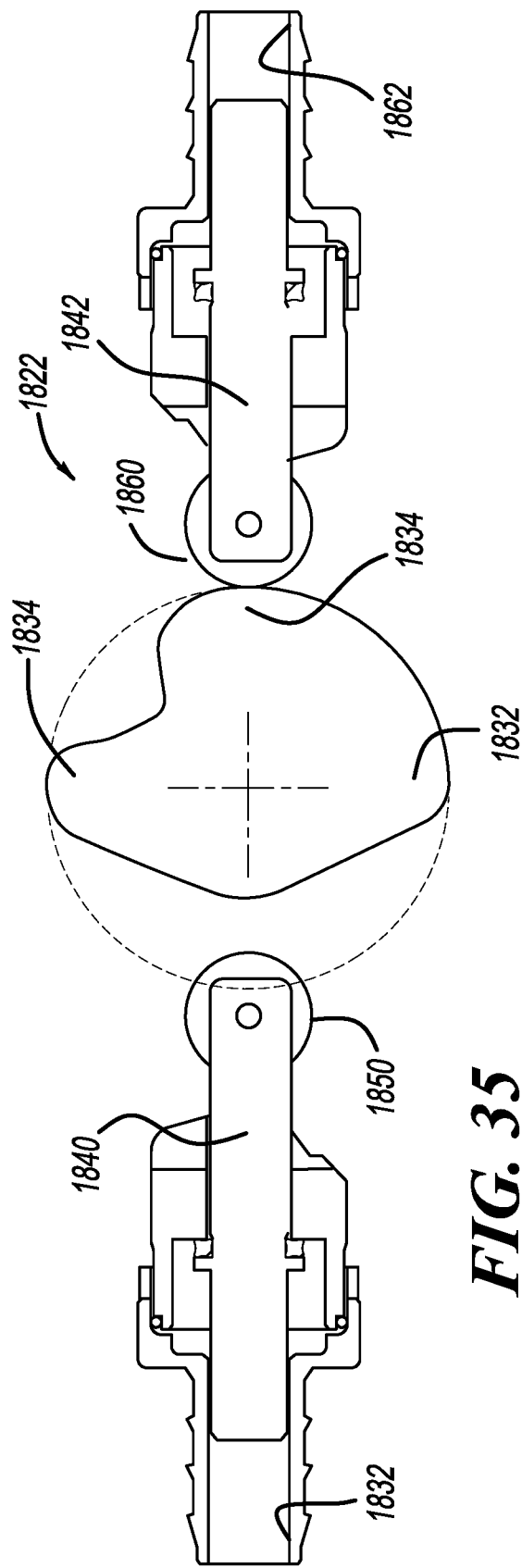

FUEL SYSTEM CONTROL

CROSS-REFERENCE TO RELATED APPLICATIONS

This application is a continuation of U.S. patent application Ser. No. 15/589,404 filed on May 8, 2017, which claims the benefit of U.S. Patent Application No. 62/336,963 filed on May 16, 2016, U.S. Patent Application No. 62/339,465 filed on May 20, 2016, U.S. Patent Application No. 62/455,178 filed on Feb. 6, 2017, U.S. Patent Application No. 62/465,482 filed on Mar. 1, 2017, Indian Patent Application No. 201711009914 filed on Mar. 21, 2017, U.S. Patent Application No. 62/475,584 filed on Mar. 23, 2017, and U.S. Patent Application No. 62/483,737 filed on Apr. 10, 2017.

FIELD

The present disclosure relates generally to fuel tanks on passenger vehicles and, more particularly, to a fuel tank system having a vent valve control strategy during vehicle refueling.

BACKGROUND

Fuel vapor emission control systems are becoming increasingly more complex, in large part in order to comply with environmental and safety regulations imposed on manufacturers of gasoline powered vehicles. Along with the ensuing overall system complexity, complexity of individual components within the system has also increased. Certain regulations affecting the gasoline-powered vehicle industry require that fuel vapor emission from a fuel tank's ventilation system be stored during periods of an engine's operation. In order for the overall vapor emission control system to continue to function for its intended purpose, periodic purging of stored hydrocarbon vapors is necessary during operation of the vehicle.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In one aspect, evaporative emissions control system operably associated with a vehicle fuel tank and configured to recapture and recycle fuel vapor emitted from the fuel tank is provided in accordance to one example of the present disclosure. The evaporative emissions control system includes a first vent valve configured to selectively open and close a first vent, a second vent valve configured to selectively open and close a second vent, a fuel level sensor configured to sense a fuel level in the fuel tank, a pressure sensor configured to sense a pressure in the fuel tank, an accelerometer configured to measure an acceleration of the vehicle, and a controller configured to regulate operation of the first and second vent valves to provide pressure relief for the fuel tank. The controller is programmed to determine if a fuel level in the fuel tank is increasing based on a first signal from the fuel level sensor, determine if a pressure in the fuel tank is increasing based on a second signal from the pressure sensor, determine if the vehicle is not moving based on a third signal from the accelerometer, determine a refueling event is occurring if the first signal indicates the fuel level is increasing, the second signal indicates pressure in the fuel tank is increasing, and the third signal indicates the vehicle is not moving, and open at least one of the first and second vent valves based on determining the refueling event is occurring.

In addition to the foregoing, the described system may include one or more of the following features: wherein the controller is further programmed to determine if the fuel level in the fuel tank has exceeded a predetermined shutoff level threshold based on a fourth signal from the fuel level sensor, and close the first and second vent valves if the determined fuel level exceeds the predetermined shutoff level threshold; wherein the controller is further programmed to open at least one of the first and second vent valves after a predetermined amount of time has elapsed since closing the first and second electronically controlled valves to enable further refueling, and determine if the fuel level in the fuel tank has exceeded a second predetermined shutoff level threshold based on a fifth signal from the fuel level sensor; and wherein the controller is further programmed to close the first and second vent valves if the determined fuel level exceeds the second predetermined shutoff level threshold.

In addition to the foregoing, the described system may include one or more of the following features: wherein the controller is further programmed to open at least one of the first and second vent valves after a second predetermined amount of time has elapsed since closing the first and second vent valves to enable further refueling, and determine if the fuel level in the fuel tank has exceeded a third predetermined shutoff level threshold based on a sixth signal from the fuel level sensor; wherein the controller is further programmed to close the first and second vent valves if the determined fuel level exceeds the third predetermined shutoff level threshold; wherein the fuel level sensor is a float level sensor; a cam assembly operably associated with the first and second vent valves, the cam assembly having a cam shaft that includes a first cam and a second cam; and wherein the first and second cams have respective profiles that correspond to at least a fully opened valve position, a fully closed valve position, and a partially open valve position.

In addition to the foregoing, the described system may include one or more of the following features: wherein the first and second vent valves are caused to selectively open and close based on rotation of the respective first and second cams; an actuator assembly that drives the cam assembly, the actuator assembly including a motor; wherein the motor comprises a direct current motor that rotates a worm gear that in turn drives a drive gear coupled to the cam shaft; wherein one of the first and second vent valves comprises a solenoid activated vent valve; and wherein the controller is further programmed to pulse at least one of the first and second vent valves open and closed if the pressure in the fuel tank builds above a predetermined threshold after closing the first and second vent valves.

In another aspect, a method is provided of controlling an evaporative emissions control system associated with a fuel tank for a vehicle, the evaporative emissions control system including at least one vent valve configured to selectively open and close a vent, a fuel level sensor configured to sense a fuel level in the fuel tank, a pressure sensor configured to sense a pressure in the fuel tank, and an accelerometer configured to measure an acceleration of the vehicle, in accordance to one example of the present disclosure. The method includes determining if the vehicle is not moving based on a signal from the accelerometer sensor, determining if a fuel level in the fuel tank is increasing based on a first signal from the fuel level sensor, determining if a pressure in the fuel tank is increasing based on a signal from the pressure sensor, determining a refueling event is occurring if it is determined the fuel level is increasing, the pressure in the fuel tank is increasing, and the vehicle is not moving, and opening the at least one vent valve in response to determining the refueling event is occurring.

In addition to the foregoing, the described method may include one or more of the following features: determining if the fuel level in the fuel tank has exceeded a predetermined shutoff level threshold based on a second signal from fuel level sensor, and closing the at least one vent valve if the determined fuel level exceeds the predetermined shutoff level threshold; opening the at least one vent valve after a predetermined amount of time has elapsed since closing the at least one vent valve, and determining if the fuel level in the fuel tank has exceeded a second predetermined shutoff level threshold based on a third signal from the fuel level sensor; closing the at least one vent valves if the determined fuel level exceeds the second predetermined shutoff level threshold; opening the at least one vent valve after a second predetermined amount of time has elapsed since closing the at least one valve, determining if the fuel level in the fuel tank has exceeded a third predetermined shutoff level threshold based on a fourth signal from the fuel level sensor, and closing the at least one vent valve if the determined fuel level exceeds the third predetermined shutoff level threshold; and pulsing the at least one vent valve open and closed when a pressure in the fuel tank exceeds a predetermined threshold after closing the at least one vent valve.

BRIEF DESCRIPTION OF THE DRAWINGS

The present disclosure will become more fully understood from the detailed description and the accompanying drawings, wherein:

FIG. 20 is a sectional view of the vent shut-off assembly of FIG. 18 and shown with the valve member assembly in a third position wherein the first inlet is closed and the second inlet is open;

FIG. 21 is a sectional view of the vent shut-off assembly of FIG. 18 and shown with the valve member assembly in a fourth position wherein the first and second inlets are open;

FIG. 32 is a sectional view of a vent shut-off assembly constructed in accordance to another example of the present disclosure and shown in a first venting state where first and second poppet valves are closed;

FIG. 33 is a sectional view of the vent shut-off assembly of FIG. 32 and shown with the first poppet valve open and the second poppet valve closed;

FIG. 34 is a sectional view of the vent shut-off assembly of FIG. 32 and shown with the first and second poppet valves open;

FIG. 35 is a sectional view of the vent shut-off assembly of FIG. 32 and shown with the first poppet valve closed and the second poppet valve open;

DETAILED DESCRIPTION

Figure 1:
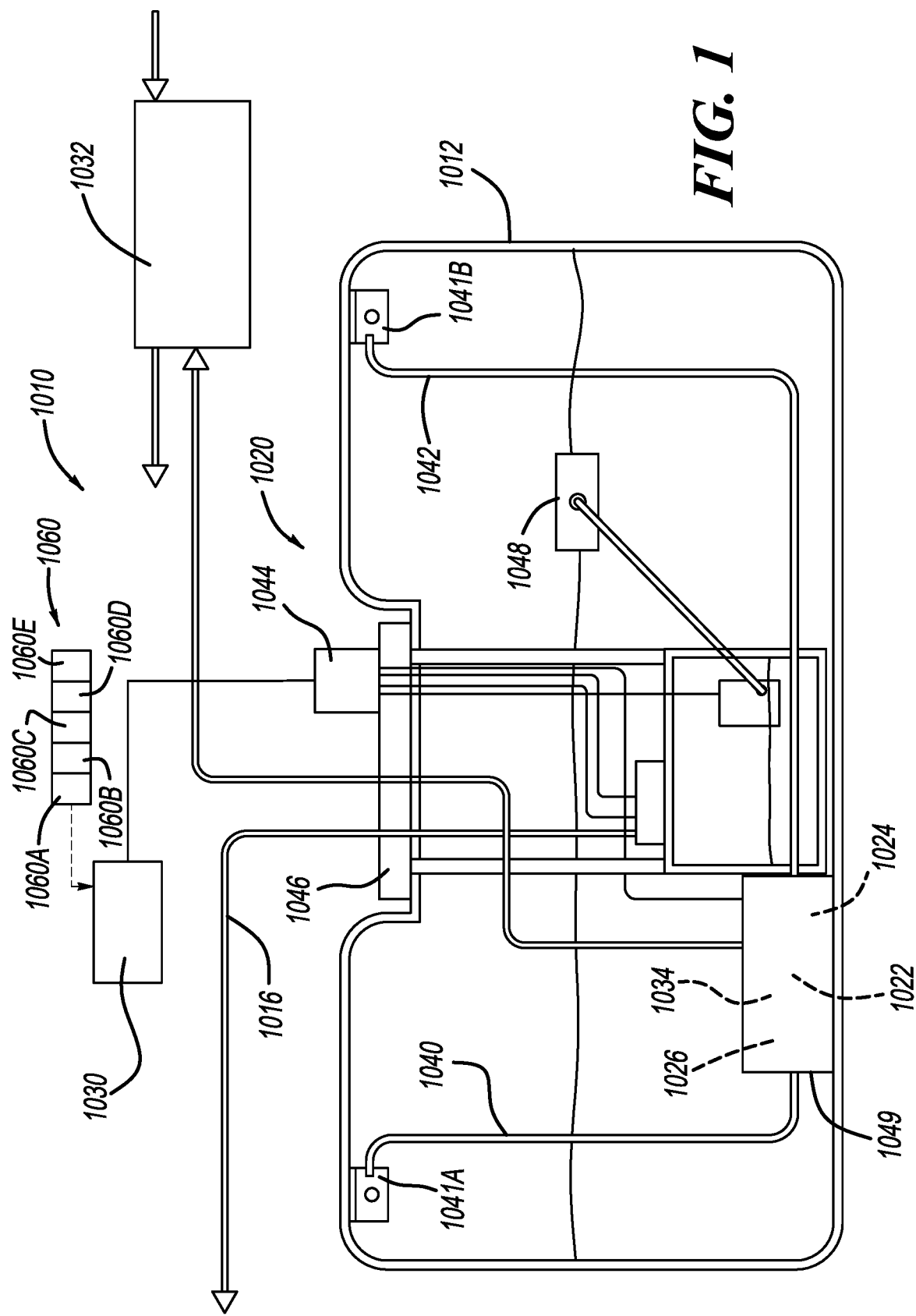
FIG. 1 is a schematic illustration of a fuel tank system having an evaporative emissions control system including a vent shut-off assembly, a controller, an electrical connector and associated wiring in accordance to one example of the present disclosure.

With initial reference to FIG. 1, a fuel tank system constructed in accordance to one example of the present disclosure is shown and generally identified at reference number 1010. The fuel tank system 1010 can generally include a fuel tank 1012 configured as a reservoir for holding fuel to be supplied to an internal combustion engine via a fuel delivery system, which includes a fuel pump 1014. The fuel pump 1014 can be configured to deliver fuel through a fuel supply line 1016 to a vehicle engine. An evaporative emissions control system 1020 can be configured to recapture and recycle the emitted fuel vapor. As will become appreciated from the following discussion, the evaporative emissions control system 1020 provides an electronically controlled module that manages the complete evaporative system for a vehicle.

The evaporative control system 1020 provides a universal design for all regions and all fuels. In this regard, the requirement of unique components needed to satisfy regional regulations may be avoided. Instead, software may be adjusted to satisfy wide ranging applications. In this regard, no unique components need to be revalidated saving time and cost. A common architecture may be used across vehicle lines. Conventional mechanical in-tank valves may be replaced. As discussed herein, the evaporative control system 1020 may also be compatible with pressurized systems including those associated with hybrid powertrain vehicles.

The evaporative emissions control system 1020 includes a vent shut-off assembly 1022, a manifold assembly 1024, a liquid trap 1026, a control module 1030, a purge canister 1032, an energy storage device 1034, a first vapor tube 1040, a second vapor tube 1042, an electrical connector 1044, a fuel delivery module (FDM) flange 1046 and a float level sensor assembly 1048. The first vapor tube 1040 can terminate at a vent opening 1041A that may include a baffle arranged at a top corner of the fuel tank 1012. Similarly, the second vapor tube 1042 can terminate at a vent opening 1041B that may include a baffle arranged at a top corner of the fuel tank 1012.

In one example, the manifold assembly 1024 can include a manifold body 1049 (FIG. 3) that routes venting to an appropriate vent tube 1040 and 1042 (or other vent tubes) based on operating conditions. As will become appreciated from the following discussion, the vent shut-off assembly 1022 can take many forms such as electrical systems including solenoids and mechanical systems including DC motor actuated cam systems.

Figure 2:
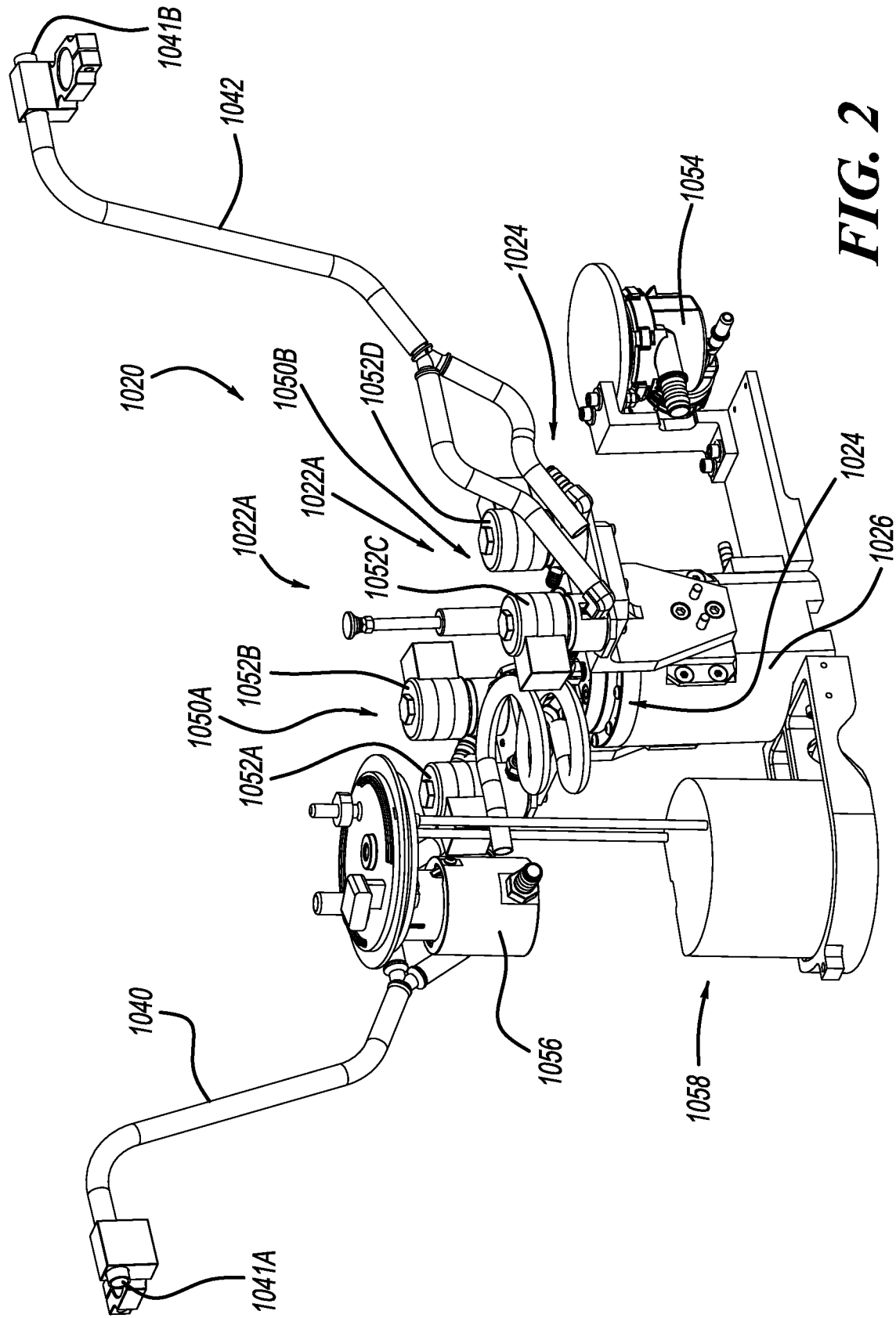
FIG. 2 is a front perspective view of an evaporative emissions control system including a vent shut-off assembly configured with solenoids according to one example of the present disclosure.
Figure 3:
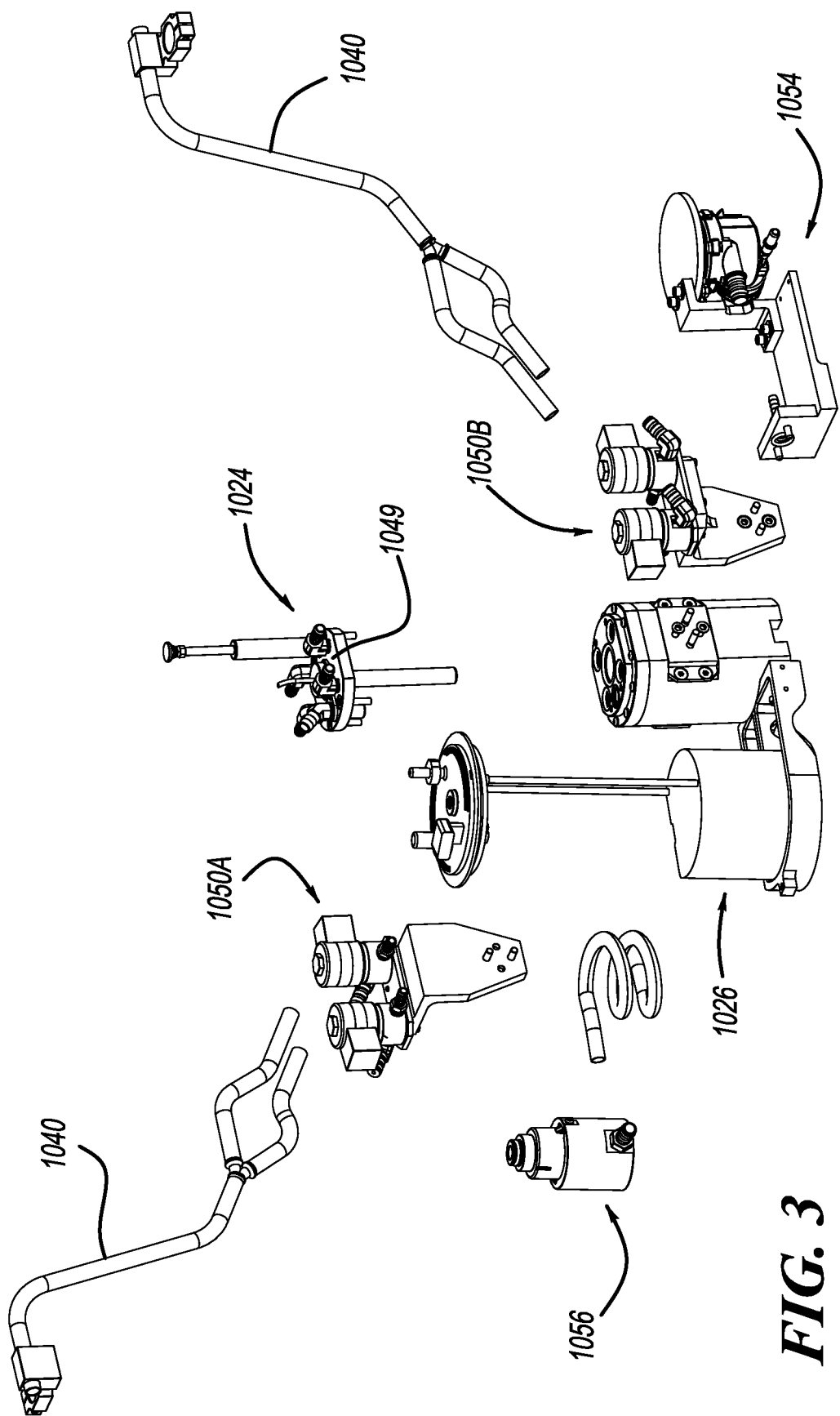
FIG. 3 is an exploded view of the evaporative emissions control system of FIG. 2.

Turning now to FIGS. 2 and 3, a vent shut-off assembly 1022A constructed in accordance to one example of the present disclosure is shown. As can be appreciated, the vent shut-off assembly 1022A can be used as part of an evaporative emissions control system 1020 in the fuel tank system 1010 described above with respect to FIG. 1. The vent shut-off assembly 1022A includes two pair of solenoid banks 1050A and 1050B. The first solenoid bank 1050A includes first and second solenoids 1052A and 1052B. The second solenoid bank 1050B includes third and fourth solenoids 1052C and 1052D.

The first and second solenoids 1052A and 1052B can be fluidly connected to the vapor tube 1040. The third and fourth solenoids 1052C and 1052D can be fluidly connected to the vapor tube 1042. The control module 1030 can be adapted to regulate the operation of the first, second, third and fourth solenoids 1052A, 1052B, 1052C and 1052D to selectively open and close pathways in the manifold assembly 1024, in order to provide over-pressure and vacuum relief for the fuel tank 1012. The evaporative emissions control assembly 1020 can additionally comprise a pump 1054, such as a venturi pump and a safety rollover valve 1056. A conventional sending unit 1058 is also shown.

The control module 1030 can further include or receive inputs from system sensors, collectively referred to at reference 1060. The system sensors 1060 can include a tank pressure sensor 1060A that senses a pressure of the fuel tank 1012, a canister pressure sensor 1060B that senses a pressure of the canister 1032, a temperature sensor 1060C that senses a temperature within the fuel tank 1012, a tank pressure sensor 1060D that senses a pressure in the fuel tank 1012 and a vehicle grade sensor and or vehicle accelerometer 1060E that measures a grade and/or acceleration of the vehicle. It will be appreciated that while the system sensors 1060 are shown as a group, that they may be located all around the fuel tank system 1010.

The control module 1030 can additionally include fill level signal reading processing, fuel pressure driver module functionality and be compatible for two-way communications with a vehicle electronic control module (not specifically shown). The vent shut-off assembly 1022 and manifold assembly 1024 can be configured to control a flow of fuel vapor between the fuel tank 1012 and the purge canister 1032. The purge canister 1032 adapted to collect fuel vapor emitted by the fuel tank 1012 and to subsequently release the fuel vapor to the engine. The control module 1030 can also be configured to regulate the operation of evaporative emissions control system 1020 in order to recapture and recycle the emitted fuel vapor. The float level sensor assembly 1048 can provide fill level indications to the control module 1030.

When the evaporative emissions control system 1020 is configured with the vent shut-off assembly 1022A, the control module 1030 can close individual solenoids 1052A-1052D or any combination of solenoids 1052A-1052D to vent the fuel tank system 1010. For example, the solenoid 1052A can be actuated to close the vent 1040 when the float level sensor assembly 1048 provides a signal indicative of a full fuel level state. While the control module 1030 is shown in the figures generally remotely located relative to the solenoid banks 1050A and 1050B, the control module 1030 may be located elsewhere in the evaporative emissions control system 1020 such as adjacent the canister 1032 for example.

With continued reference to FIGS. 1-3, additional features of the evaporative emissions control system 1020 will be described. In one configuration, the vent tubes 1040 and 1042 can be secured to the fuel tank 1012 with clips. The inner diameter of the vent tubes 1040 and 1042 can be 3-4 mm. The vent tubes 1040 and 1042 can be routed to high points of the fuel tank 1012. In other examples, external lines and tubes may additionally or alternatively be utilized. In such examples, the external lines are connected through the tank wall using suitable connectors such as, but not limited to, welded nipple and push-through connectors.

As identified above, the evaporative emissions control system 1020 can replace conventional fuel tank systems that require mechanical components including in-tank valves with an electronically controlled module that manages the complete evaporative system for a vehicle. In this regard, some components that may be eliminated using the evaporative emissions control system 1020 of the instant disclosure can include in-tank valves such as GVV's and FLVV's, canister vent valve solenoid and associated wiring, tank pressure sensors and associated wiring, fuel pump driver module and associated wiring, fuel pump module electrical connector and associated wiring, and vapor management valve(s) (system dependent). These eliminated components are replaced by the control module 1030, vent shut-off assembly 1022, manifold 1024, solenoid banks 1050A, 1050B and associated electrical connector 1044. Various other components may be modified to accommodate the evaporative emissions control system 1020 including the fuel tank 1012. For example, the fuel tank 1012 may be modified to eliminate valves and internal lines to pick-up points. The flange of the FDM 1046 may be modified to accommodate other components such as the control module 1030 and/or the electrical connector 1044. In other configurations, the fresh air line of the canister 1032 and a dust box may be modified. In one example, the fresh air line of the canister 1032 and the dust box may be connected to the control module 1030.

Figure 4:
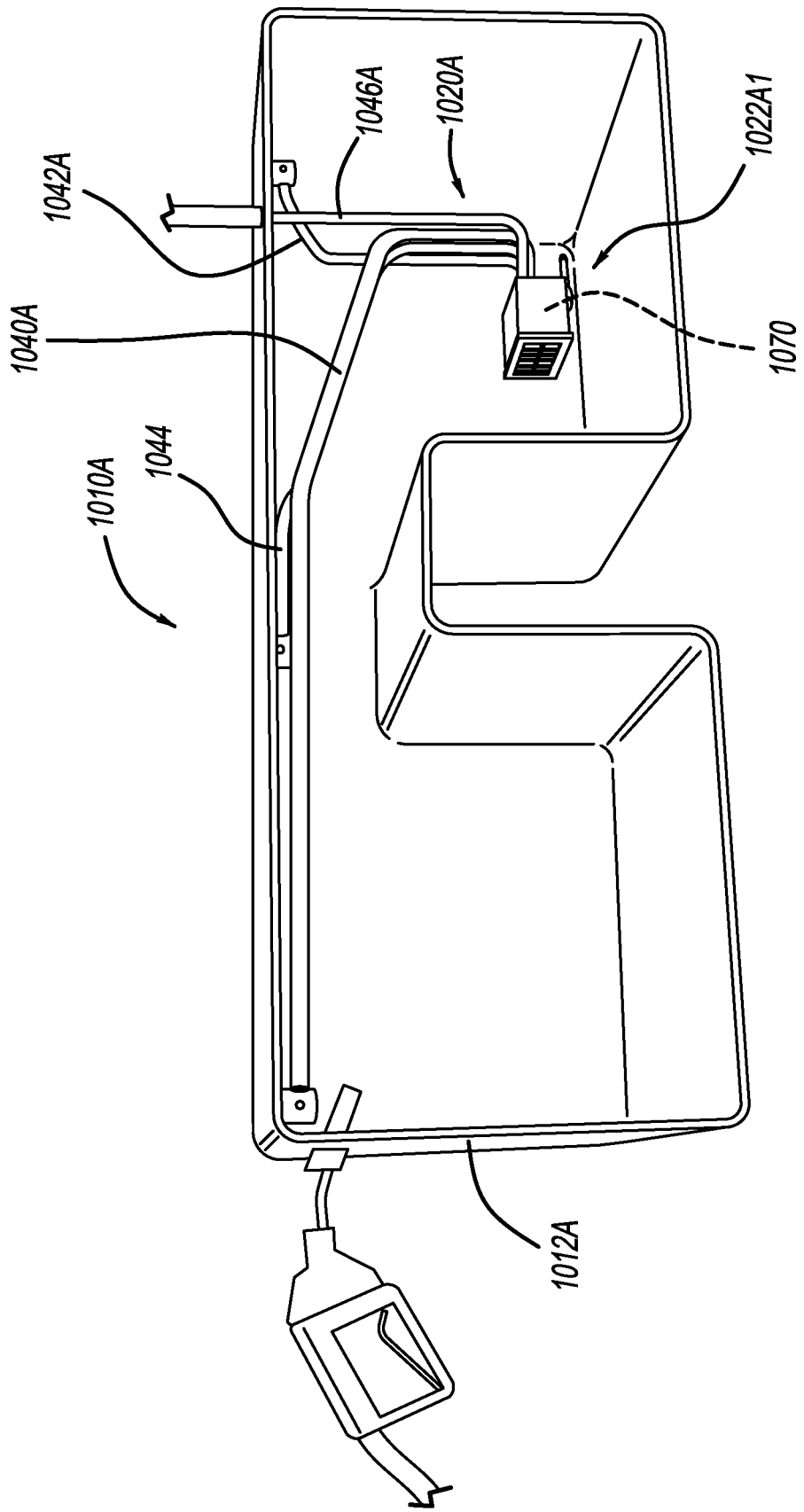
FIG. 4 is a perspective view of a fuel tank system having a vent shut-off assembly and configured for use on a saddle fuel tank according to another example of the present disclosure and shown with the fuel tank in section view.
Figure 5:
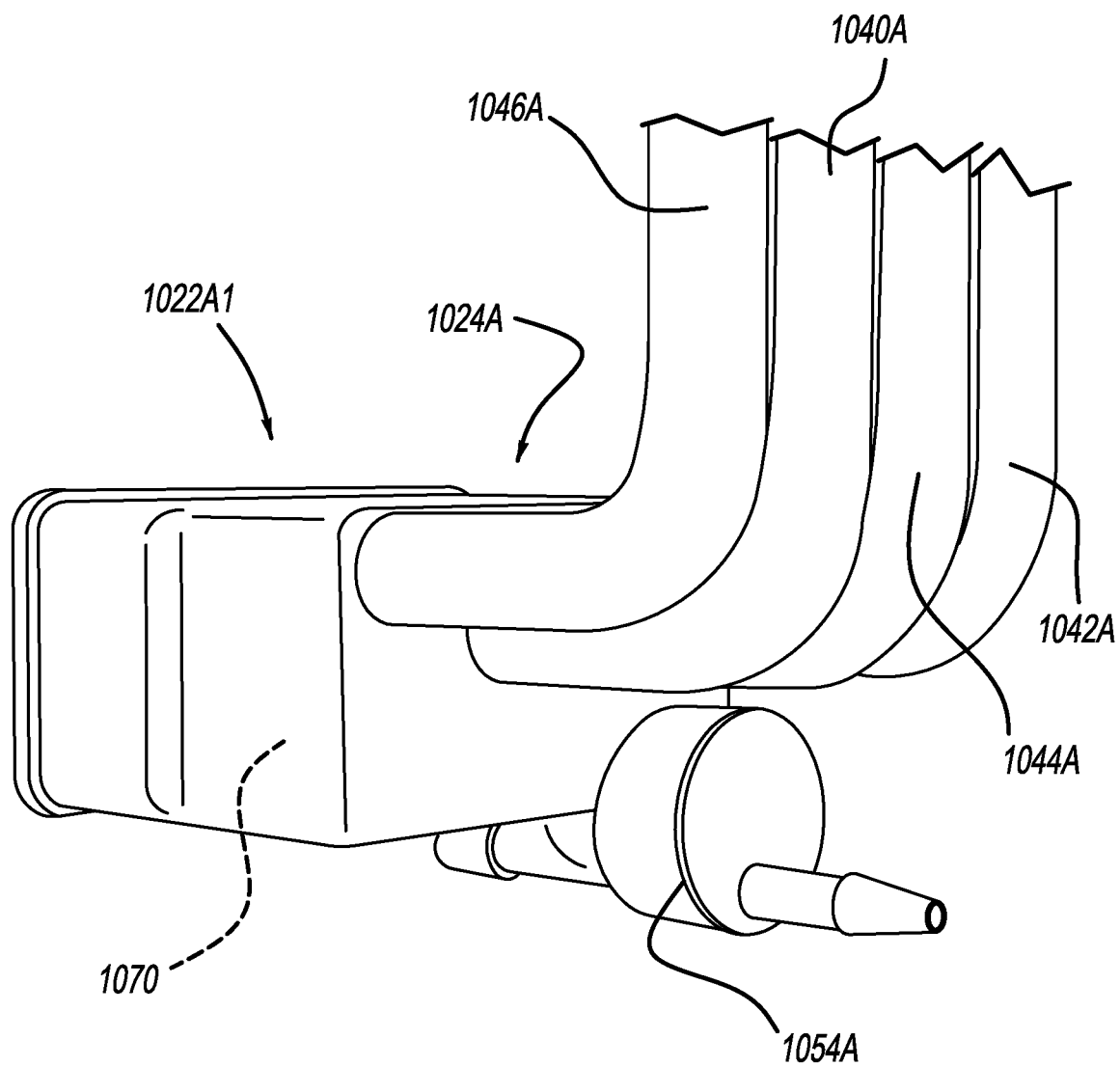
FIG. 5 is a perspective view of the vent shut-off assembly of the fuel tank system of FIG. 4.

Turning now to FIGS. 4 and 5, a fuel tank system 1010A constructed in accordance to another example of the present disclosure will be described. Unless otherwise described, the fuel tank system 1010A can include an evaporative emissions control system 1020A that incorporate features described above with respect to the fuel tank system 1010. The fuel tank system 1010A is incorporated on a saddle type fuel tank 1012A. A vent shut-off assembly 1022A1 can include a single actuator 1070 that communicates with a manifold 1024A to control opening and closing of three or more vent point inlets. In the example shown, the manifold assembly 1024A routs to a first vent 1040A, a second vent line 1042A and a third vent line 1044A. A vent 1046A routs to the canister (see canister 1032, FIG. 1). A liquid trap 1052A and a drain 1054A are incorporated on the manifold assembly 1024A. The fuel tank system 1010A can perform fuel tank isolation for high pressure hybrid applications without requiring a fuel tank isolation valve (FTIV). Further, the evaporative emissions control system 1020A can achieve the highest possible shut-off at the vent points. The system is not inhibited by conventional mechanical valve shut-off or reopening configurations. Vapor space and overall tank height may be reduced.

Figure 6:
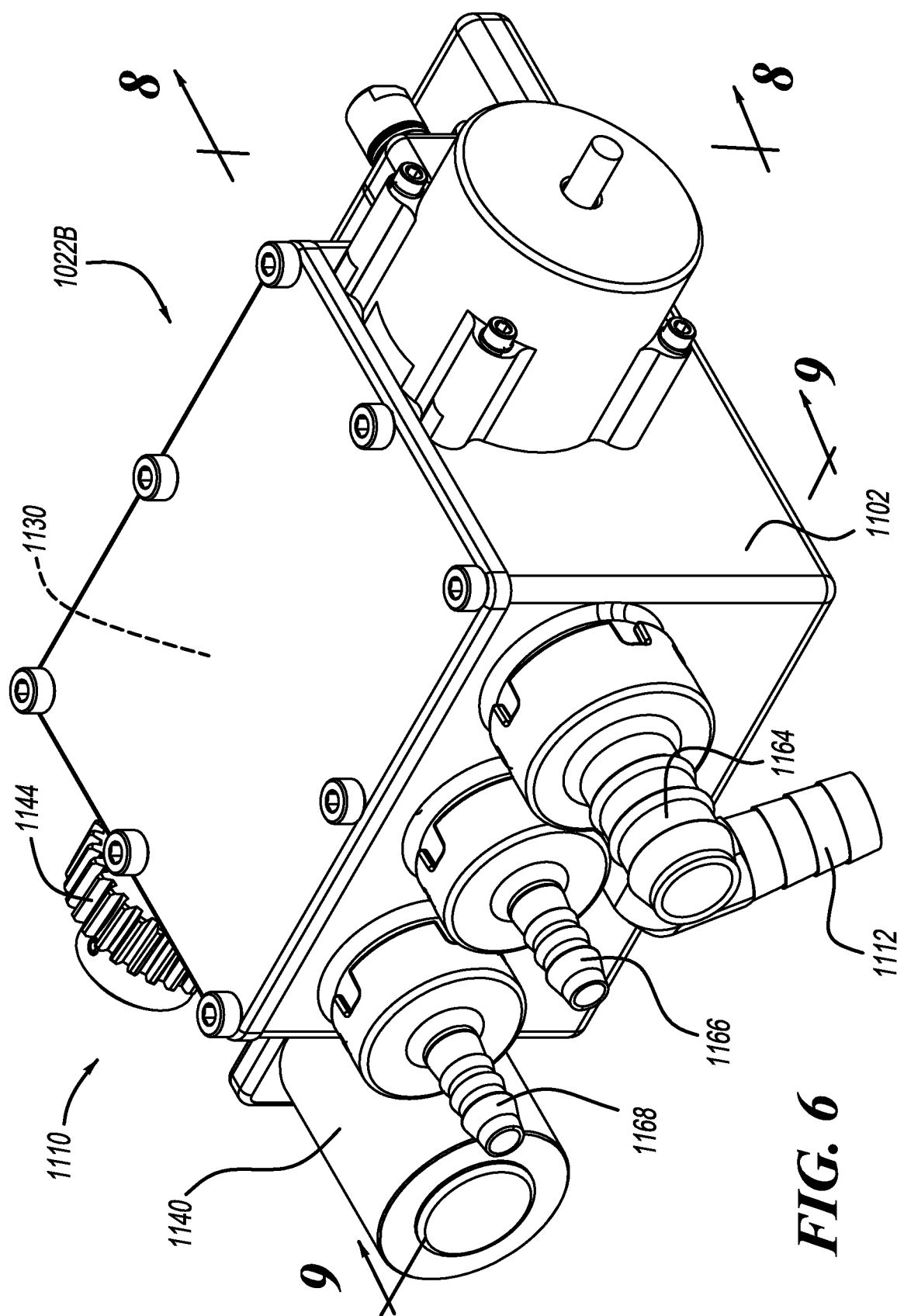
FIG. 6 is a top perspective view of a vent shut-off assembly constructed in accordance to additional features of the present disclosure.
Figure 7:
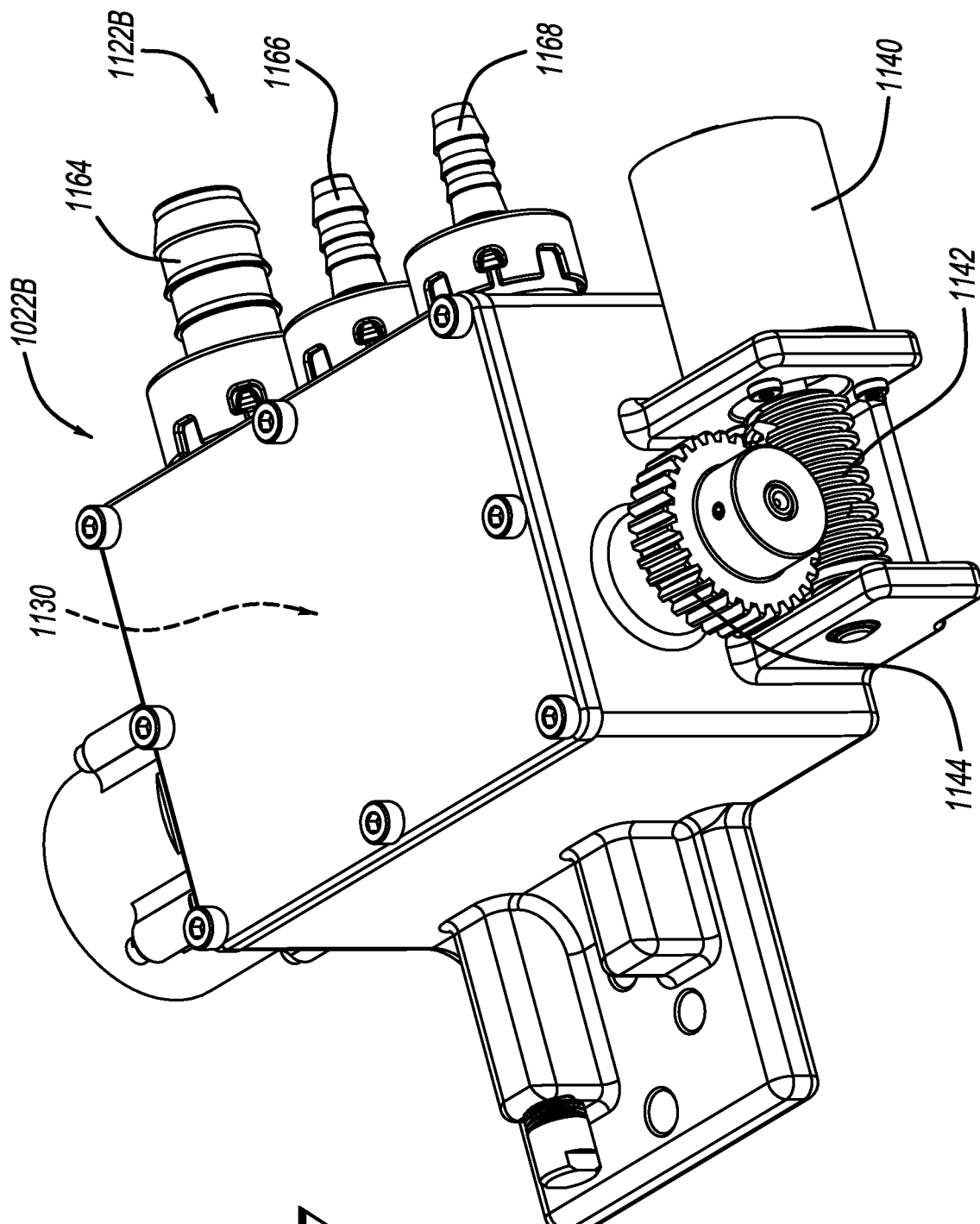
FIG. 7 is a bottom perspective view of the vent shut-off assembly of FIG. 6.

Turning now to FIGS. 6-7, a vent shut-off assembly 1022B constructed in accordance to another example of the present disclosure will be described. The vent shut-off assembly 10226 includes a main housing 1102 that at least partially houses an actuator assembly 1110. A canister vent line 1112 routs to the canister (see canister 1032, FIG. 1). The actuator assembly 1110 can generally be used in place of the solenoids described above to open and close selected vent lines. The vent shut-off assembly 1022B includes a cam assembly 1130. The cam assembly 1130 includes a cam shaft 1132 that includes cams 1134, 1136 and 1138. The cam shaft 1132 is rotatably driven by a motor 1140. In the example shown the motor 1140 is a direct current motor that rotates a worm gear 1142 that in turn drives a drive gear 1144. The motor 1140 is mounted outboard of the main housing 1102. Other configurations are contemplated. The cams 1134, 1136 and 1138 rotate to open and close valves 1154, 1156 and 1158, respectively. The valves 1154, 1156 and 1158 open and close to selectively deliver vapor through ports 1164, 1166 and 1168, respectively. In one example the motor 1140 can alternately be a stepper motor. In other configurations, a dedicated DC motor may be used for each valve. Each DC motor may have a home function. The DC motors can include a stepper motor, a bi-directional motor, a uni-directional motor a brushed motor and a brushless motor. The home function can include a hard stop, electrical or software implementation, trip switches, hard stop (cam shaft), a potentiometer and a rheostat.

In one configuration the ports 1164 and 1166 can be routed to the front and back of the fuel tank 1012. The port 1164 can be configured solely as a refueling port. In operation, if the vehicle is parked on a grade where the port 1166 is routed to a low position in the fuel tank 1012, the cam 1136 is rotated to a position to close the port 1164. During refueling, the valve 1154 associated with port 1164 is opened by the cam 1134. Once the fuel level sensor 1048 reaches a predetermined level corresponding to a "Fill" position, the controller 1030 will close the valve 1154. In other configurations, the cam 1134, valve 1154 and port 1162 can be eliminated leaving two cams 1136 and 1138 that open and close valves 1156 and 1158. In such an example, the two ports 1164 and 1166 can be 7.5 mm orifices. If both ports 1164 and 1166 are open, refueling can occur. If less flow is required, a cam position can be attained where one of the valves 1156 and 1158 are not opened all the way.

Turning now to FIGS. 10-13, a vent shut-off assembly 1022C constructed in accordance to another example of the present disclosure will be described. The vent shut-off assembly 1022C includes a main housing 1202 that at least partially houses an actuator assembly 1210. A canister vent line 1212 routs to the canister (see canister 1032, FIG. 1). The actuator assembly 1210 can generally be used in place of the solenoids described above to open and close selected vent lines. The vent shut-off assembly 1022C includes a cam assembly 1230. The cam assembly 1230 includes a cam shaft 1232 that includes cams 1234, 1236 and 1238. The cam shaft 1232 is rotatably driven by a motor 1240. In the example shown the motor 1240 is received in the housing 1202. The motor 1240 is a direct current motor that rotates a worm gear 1242 that in turn drives a drive gear 1244. Other configurations are contemplated. The cams 1234, 1236 and 1238 rotate to open and close valves 1254, 1256 and 1258, respectively. The valves 1254, 1256 and 1258 open and close to selectively deliver vapor through ports 1264, 1266 and 1268, respectively. In one example the motor 1240 can alternately be a stepper motor. A drain 1270 can be provided on the housing 1202.

In one configuration the ports 1264 and 1266 can be routed to the front and back of the fuel tank 1012. The port 1264 can be configured solely as a refueling port. In operation, if the vehicle is parked on a grade where the port 1266 is routed to a low position in the fuel tank 1012, the cam 1236 is rotated to a position to close the port 1264. During refueling, the valve 1254 associated with port 1264 is opened by the cam 1234. Once the fuel level sensor 1048 reaches a predetermined level corresponding to a "Fill" position, the controller 1030 will close the valve 1254. In other configurations, the cam 1234, valve 1254 and port 1262 can be eliminated leaving two cams 1236 and 1238 that open and close valves 1256 and 1258. In such an example, the two ports 1264 and 1266 can be 7.5 mm orifices. If both ports 1264 and 1266 are open, refueling can occur. If less flow is required, a cam position can be attained where one of the valves 1256 and 1258 are not opened all the way.

Turning now to FIGS. 14-17, a vent shut-off assembly constructed in accordance to another example of the present disclosure is shown and generally identified at reference 1300. The vent shut-off assembly 1300 can be incorporated for use with any of the evaporative emissions control systems described herein. The vent shut-off assembly 1300 generally comprises a first cam shaft 1302 and a second cam shaft 1304. The first and second cam shafts 1302 and 1304 are coaxial and configured for relative rotation. The first cam shaft 1302 includes a first cam 1312 and a second cam 1314. The second cam shaft 1304 includes a third cam 1316. A first vent 1322 is actuated based on rotation of the first cam 1312. A second vent 1324 is actuated based on rotation of the second cam 1314. A third vent 1326 is actuated based on rotation of the third cam 1316. The first cam shaft 1302 has a first tab 1330. The second cam shaft 1304 has a second tab 1332. The first cam shaft 1302 controls the venting of the first and second vents 1322 and 1324. The second cam shaft 1304 rotates on the first cam shaft 1302. The second cam shaft 1304 is driven by the engagement of the first and second tabs 1330, 1332.

In one exemplary configuration, the third vent 1326 can be associated with a refueling vent. Under normal driving conditions, the first cam shaft 1302 may rotate to open and close the first and second vents 1322, 1324. The second cam shaft 1304 may move while the first cam shaft 1302 is moving but insufficiently to cause actuation of the third vent 1326. The third vent 1326 is actuated by rotation of the tab 1332 to an open position. The third vent 1326 is closed by further pushing the tab 1332 past the open position. In this regard, actuation of the first and second vents 1322 and 1324 can be accomplished discretely from actuation of the third vent 1326.

Turning now to FIGS. 18-21, a vent shut-off assembly constructed in accordance to another example of the present disclosure is shown and generally identified at reference 1400. The vent shut-off assembly 1400 can be incorporated for use with any of the evaporative emissions control systems described herein. The vent shut-off assembly 1400 generally provides solenoid controlled linear actuation of two vent points. The vent shut-off assembly 1400 generally includes a solenoid 1402 that actuates a valve member assembly 1404 relative to a valve body 1410. The valve body 1410 generally includes a first inlet 1420, a second inlet 1422 and an outlet 1424. By way of example, the first and second inlets 1420 and 1422 can be fluidly coupled to first and second vent tubes as disclosed herein.

Figure 18:
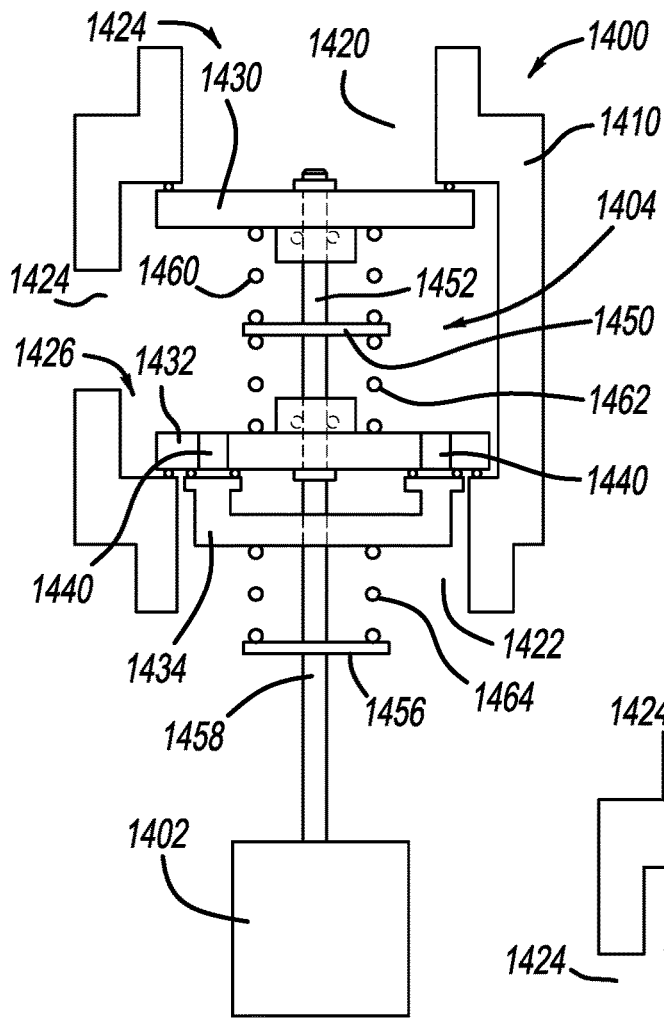
FIG. 18 is a sectional view of a vent shut-off assembly constructed in accordance to additional features of the present disclosure and shown with the valve member assembly in a first position wherein first and second inlets are closed.

The valve member assembly 1404 collectively comprises a first vent valve 1424 and a second vent valve 1426. The first vent valve 1424 includes a first valve closing element or disk 1430. The second vent valve 1426 collectively comprises a second valve closing element or disk 1432 and a third closing element or disk 1434. The second disk 1432 defines apertures 1440 therethrough. A first spring support 1450 is disposed on a distal shaft 1452. A second spring support 1456 is disposed on a proximal shaft 1458. A first biasing member 1460 is arranged between the first spring support 1450 and first disk 1430 for biasing the first disk 1430 toward a closed position (FIG. 18). A second biasing member 1462 is arranged between the first spring support 1450 and the second disk 1432 for biasing the second disk 1432 toward a closed position (FIG. 18). A third biasing member 1464 is arranged between the second spring support 1456 and the third disk 1434 for biasing the third disk 1434 toward the second disk 1432. A first seal member 1470 is disposed on the first disk 1430. A second seal member 1472 and third seal member 1474 is disposed on the second disk 1432.

Operation of the vent shut-off assembly 1400 will now be described. In FIG. 18, the first and second inlets 1420 and 1422 and the outlet 1424 are all closed relative to each other. The first disk 1430 is closed, closing the first inlet 1420. The first disk 1430 is sealingly engaged to the valve body 1410. The second disk 1432 is closed and the third disk 1434 is closed. The second disk 1432 is sealingly engaged to the valve body 1410 closing the outlet 1424. The third disk 1434 is sealingly engaged to the second disk 1432 closing the second inlet 1422.

Figure 19:
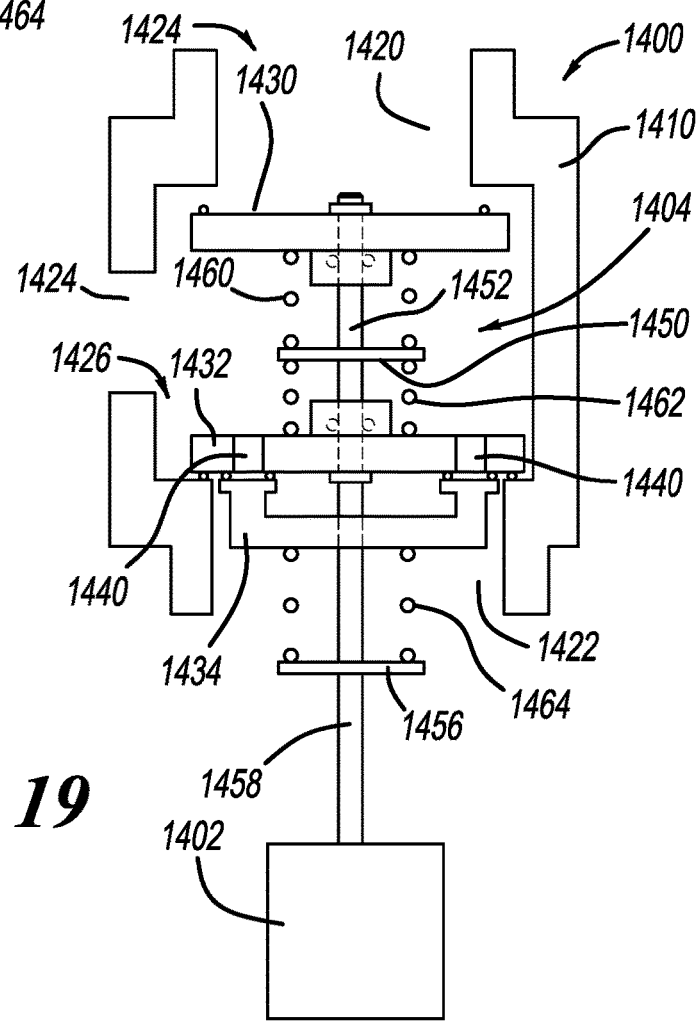
FIG. 19 is a sectional view of the vent shut-off assembly of FIG. 18 and shown with the valve member assembly in a second position wherein the first inlet is open and the second inlet is closed.

In FIG. 19, the first inlet 1420 is open to the outlet 1424. The second inlet 1422 is closed. The solenoid 1402 urges the first disk 1430 away from seating on the valve body 1410. In FIG. 20, the second inlet 1422 is open to the outlet 1424. The first inlet 1420 is closed. The solenoid 1402 urges the third disk 1434 and therefore the second disk 1432 upward. In FIG. 21, the first inlet 1420 is open to the outlet 1424. The second inlet 1422 is also open to the outlet 1424.

With additional reference now to FIGS. 22-26, a vent shut-off or control assembly constructed in accordance to one example of the present disclosure is shown and generally identified at reference 1510. The vent control assembly 1510 can be used in a fuel system such as fuel system 1010 and cooperate with evaporative emissions control system 1020 to open and close identified vents. It will be appreciated that the vent control assembly 1510 can be used in other fuel systems or systems in general to regulate fluid flow.

The vent control assembly 1510 generally includes shaft assembly 1512, a block 1516, actuation assembly 1520 and an input source 1522. The shaft assembly 1512 can include a split shaft having a first shaft portion 1530 and a second shaft portion 1532. The actuation assembly 1520 includes a cam assembly 1534. As will be explained herein, the first and second shaft portions 1530 and 1532 can move relative to each other based on rotation of the cam assembly 1534. The shaft assembly 1512 (split shaft) can have internal and external splines between the respective first and second shaft portions 1530 and 1532. The second shaft portion 1532 can be formed of externally molded rubber. The block 1516 can be formed of metal. The second shaft portion 1532 has a first shaft passage 1536. The block 1516 has first and second block passages 1540, 1542. The cam assembly 1534 generally includes a cam plate 1544 and a plurality of protrusions 1546. The second shaft 1532 can include a spring loaded probe assembly 1550 thereon. The spring loaded probe assembly 1550 generally includes cam followers 1552 that are biased by respective biasing members 1554. The input source 1522 can include a servo motor. Other actuation sources are contemplated.

During operation, the actuation source 1522 rotates the first shaft 1530 causing the protrusions 1546 on the cam plate to urge the cam followers 1546 on the spring loaded probe assembly 1550 to move rightward ultimately causing the second shaft 1532 to translate rightward. In this regard, in the unactuated position (FIG. 22), the first shaft passage 1536 is not aligned with the first and second block passages 1540, 1542. In the actuated position (FIG. 23), the first shaft passage 1536 is aligned with the first and second block passages 1540, 1542. A biasing member 1556 can urge the second shaft 1532 back toward the unactuated position. The biasing members 1554 and 1556 can be used to return the second shaft 1532 to be available for subsequent indexing.

Figure 22:
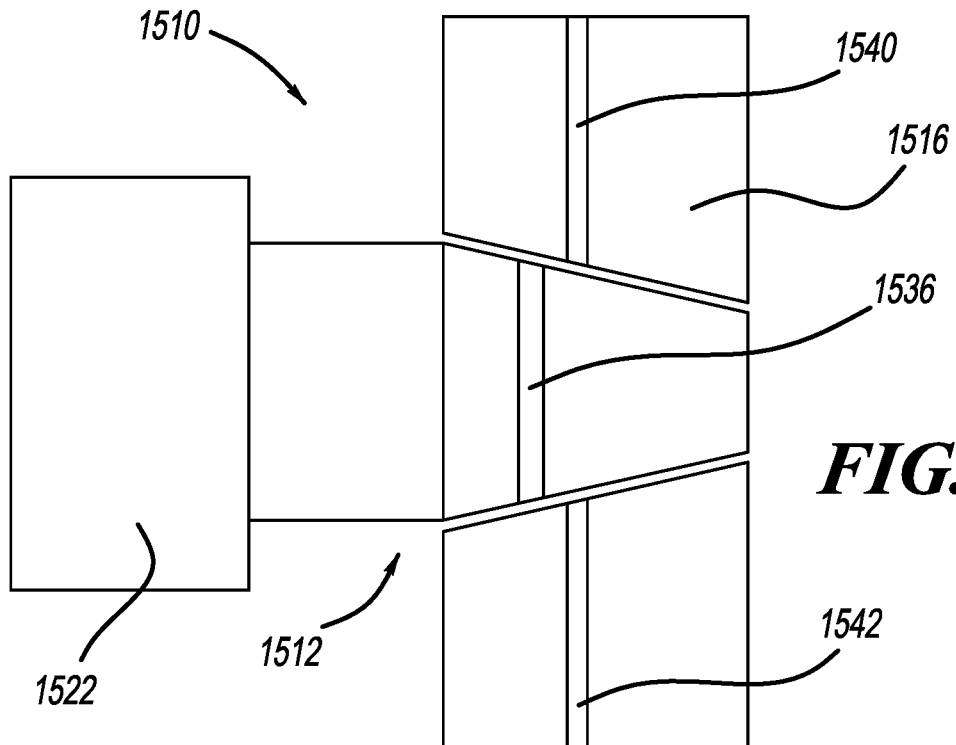
FIG. 22 is a schematic illustration of a valve control assembly for use on a fuel tank system having an evaporative emissions control system in accordance to one example of the present disclosure and show prior to actuation.
Figure 23:
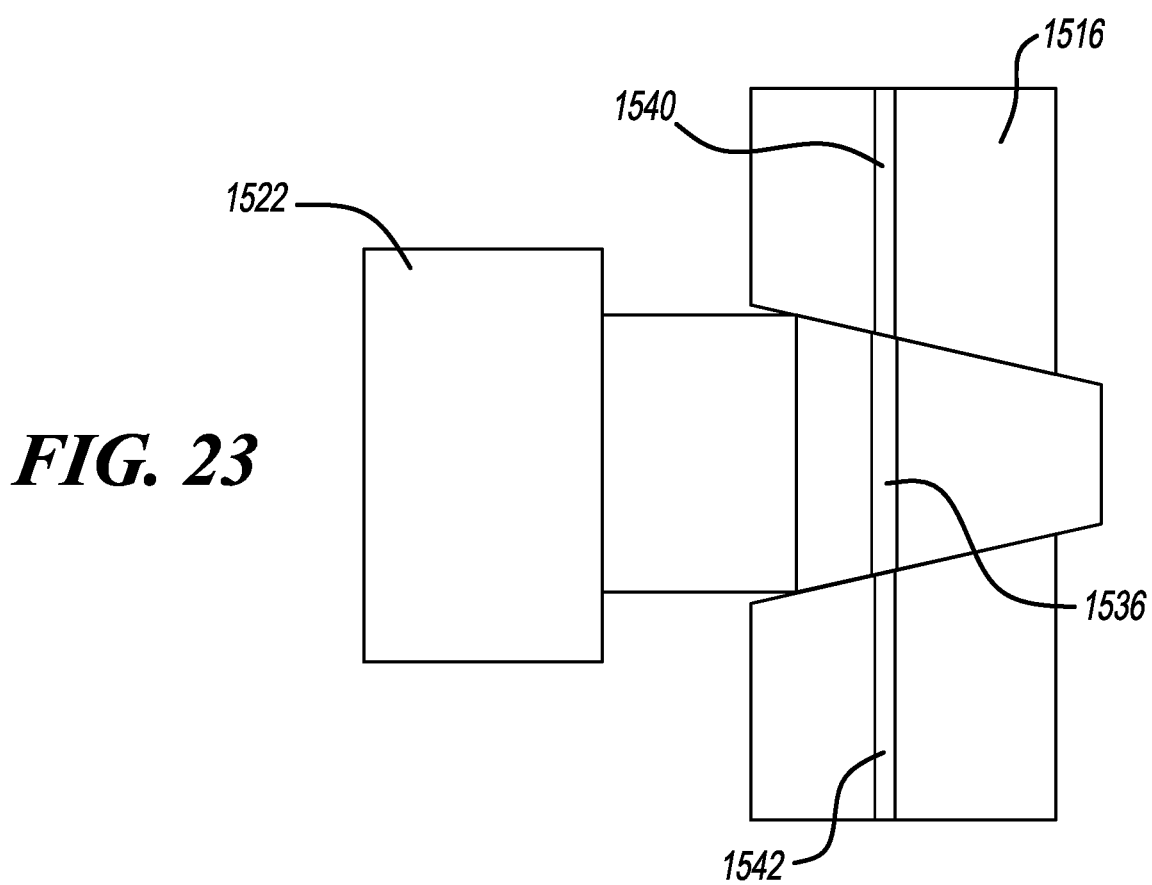
FIG. 23 is a schematic illustration of the valve control assembly of FIG. 22 and shown subsequent to valve actuation.
Figure 24:
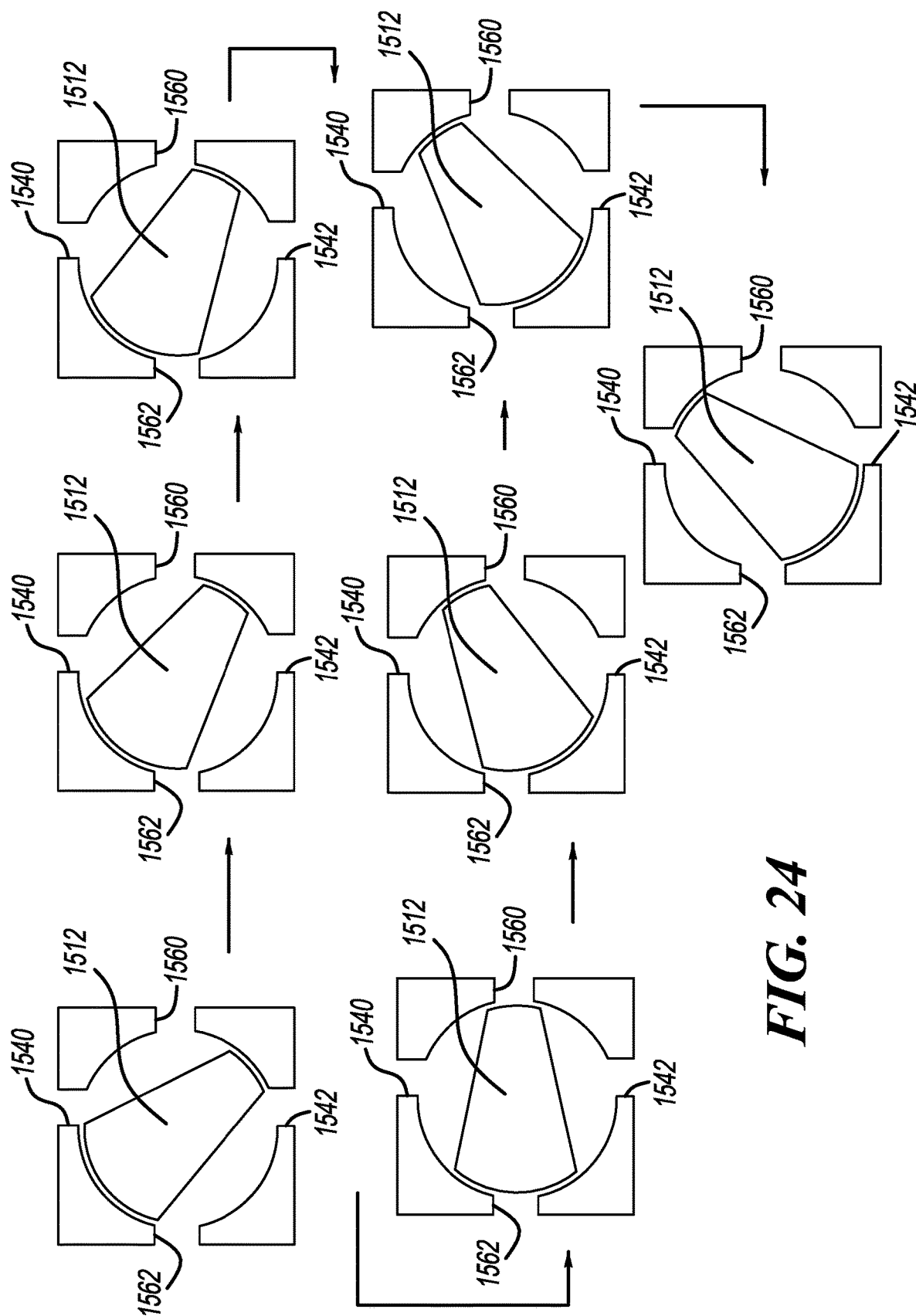
FIG. 24 is a sectional sequential view of the valve control assembly of FIG. 22.
Figure 25:
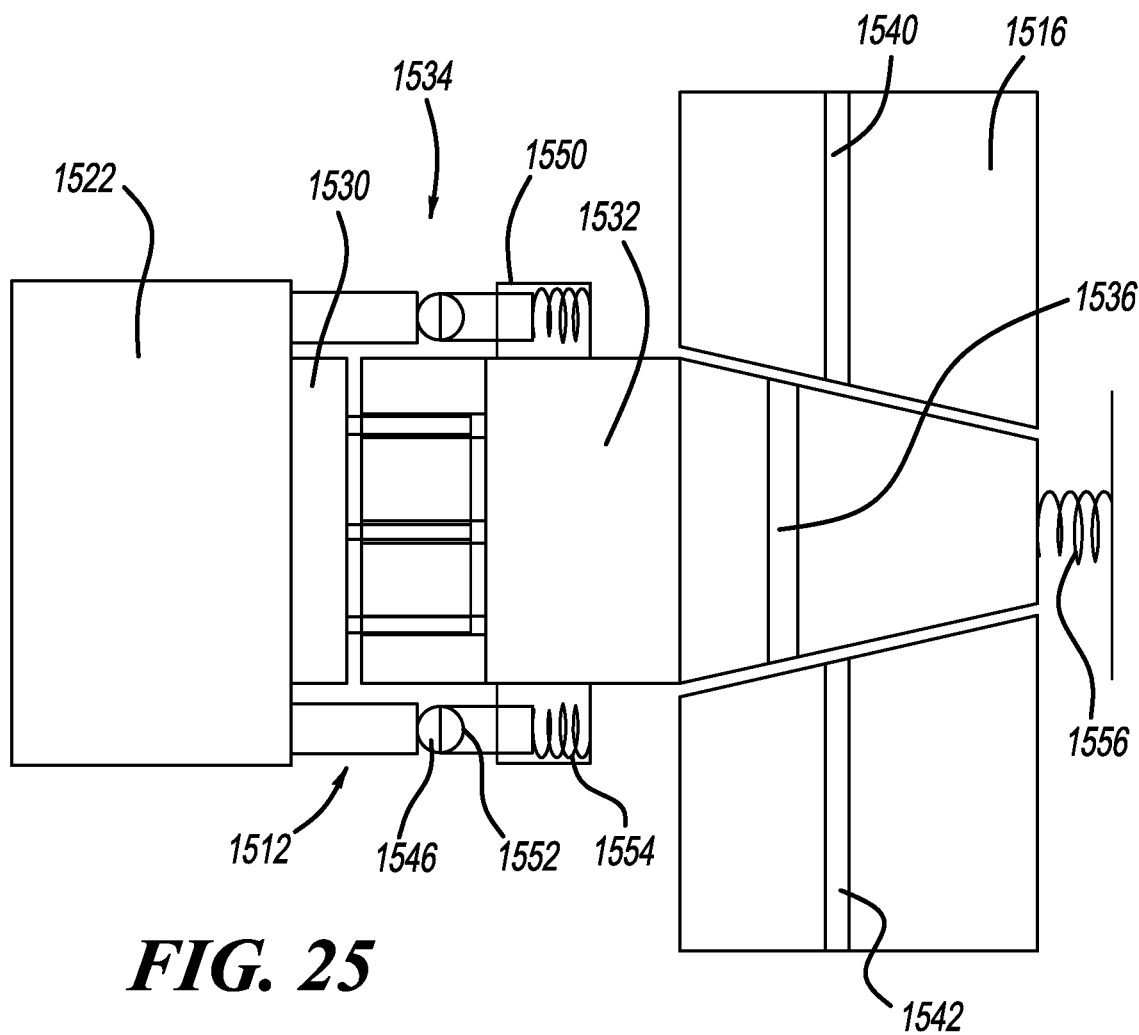
FIG. 25 is another schematic illustration of the valve control assembly of FIGS. 22 and 23.
Figure 26:
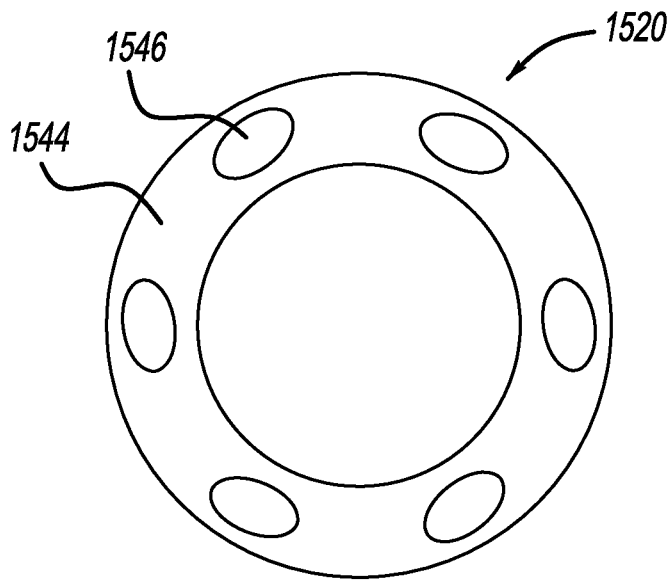
FIG. 26 is a top view of a cam mechanism of the valve control assembly of FIG. 25.
Figure 28:
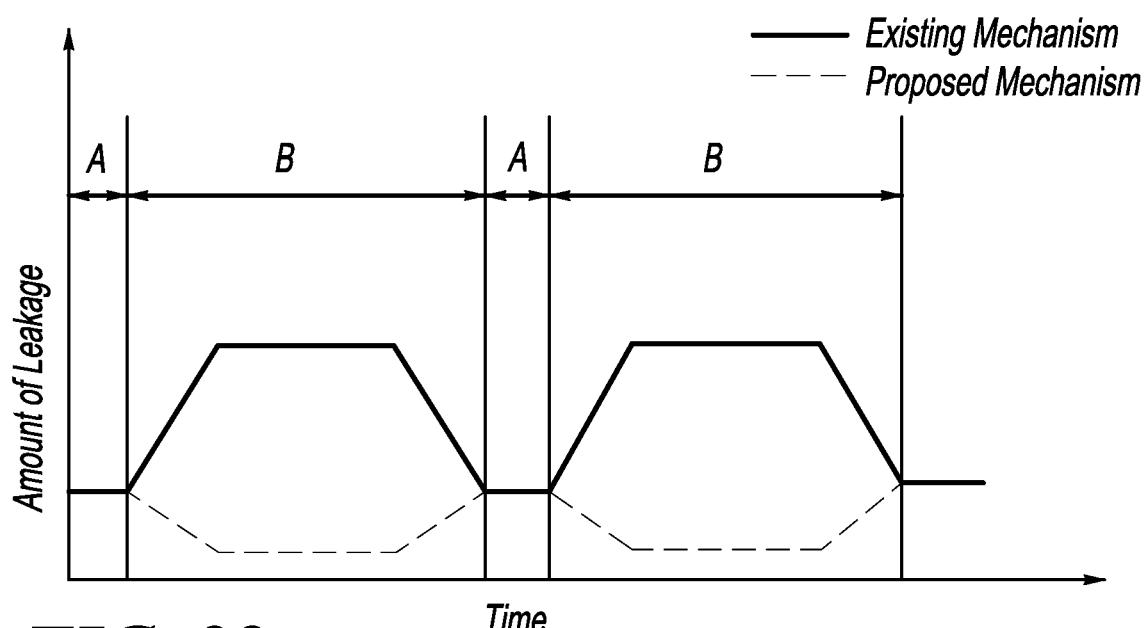
FIG. 28 is a plot of leakage versus time for the valve control assemblies of the present disclosure.

In the example shown in FIGS. 22 and 23, the block 1516 has first and second block passages 1540, 1542. As shown in FIG. 24 however the block 1516 may incorporate additional passages such as third and fourth block passages 1560, 1562. In one example it is contemplated that the passages 1540, 1542, 1560, 1562 can be fluidly connected to vent lines in the fuel tank. The second shaft portion 1532 is generally wedge shaped. The valve control assembly 1510 can be used for a dynamic state and a steady state, as shown in FIG. 28. In the dynamic state, the second shaft 1532 is in dynamic state. Leakage is not critical and will not be significant due to low fluid pressure and short transition times. In steady state, the second shaft 1532 is in steady state for significant operation time. Leakage is not desired. During steady state, the proposed leakage control is most effective.

Figure 27:
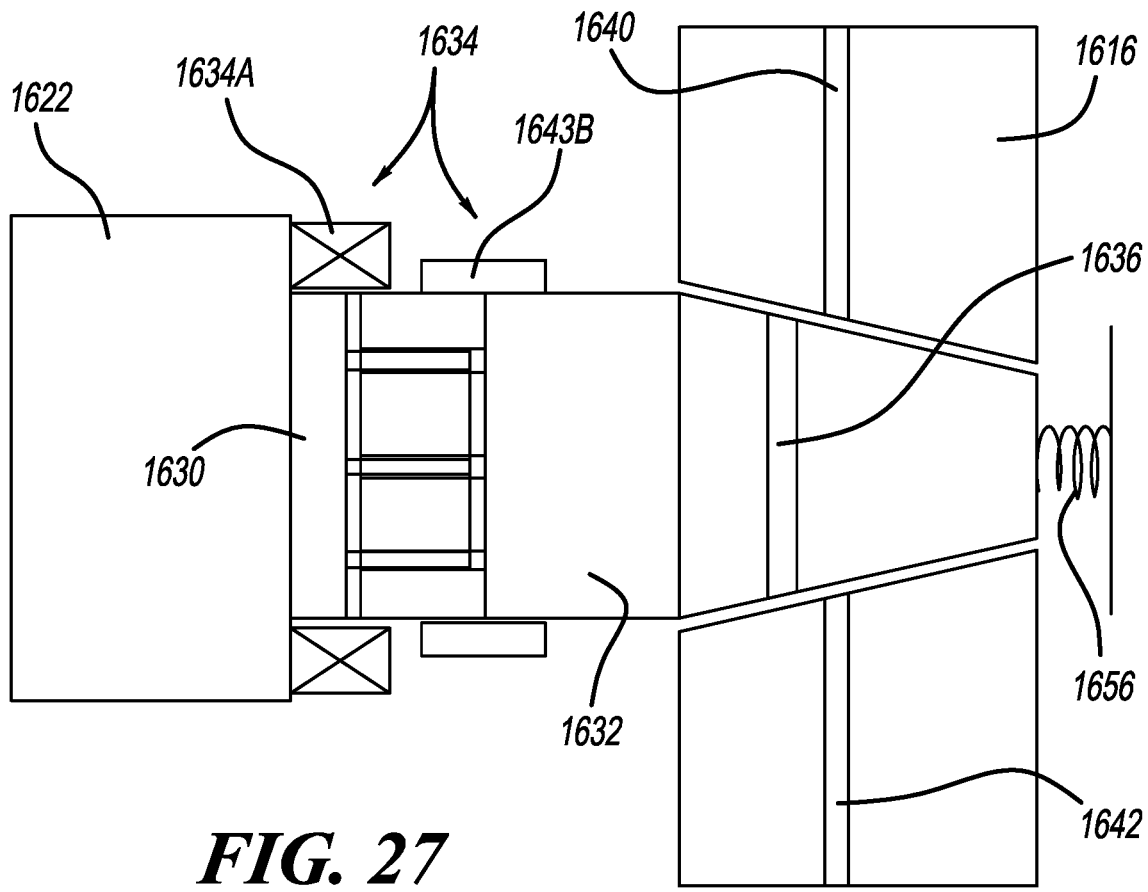
FIG. 27 is a schematic illustration of a valve control assembly constructed in accordance to another example of the present disclosure.

With additional reference now to FIG. 27, a vent control assembly constructed in accordance to one example of the present disclosure is shown and generally identified at reference 1610. The vent control assembly 1610 can be used in a fuel system such as fuel system 1010 and cooperate with evaporative emissions control system 1020 to open and close identified vents. It will be appreciated that the vent control assembly 1610 can be used in other fuel systems or systems in general to regulate fluid flow.

The vent control assembly 1610 generally includes shaft assembly 1612, a block 1616, actuation assembly 1620 and an input source 1622. The shaft assembly 1612 can include a split shaft having a first shaft portion 1630 and a second shaft portion 1632. The actuation assembly 1620 includes an electromagnetic assembly 1634. The electromagnetic assembly 1634 includes electromagnetic coils 1634A and a magnet portion 1634B. As will be explained herein, the first and second shaft portions 1630 and 1632 can move relative to each other when the electromagnetic assembly 1634 is energized. When the electromagnetic coils 1634A are energized, the magnet portion 1634B moves toward the electromagnetic coils 1634A.

The second shaft portion 1632 can be formed of externally molded rubber. The block 1616 can be formed of metal. The second shaft portion 1632 has a first shaft passage 1636. The block 1616 has first and second block passages 1640, 1642. The input source 1622 can include a servo motor. Other actuation sources are contemplated.

During operation, the second shaft 1632 occupies a first position where the first shaft passage 1636 is not aligned with the first and second block passages 1640, 1642. In a second position, the first shaft passage 1636 is aligned with the first and second block passages 1640, 1642. A biasing member 1656 can urge the second shaft 1632 back toward the unactuated position to be available for subsequent indexing.

Figure 29:
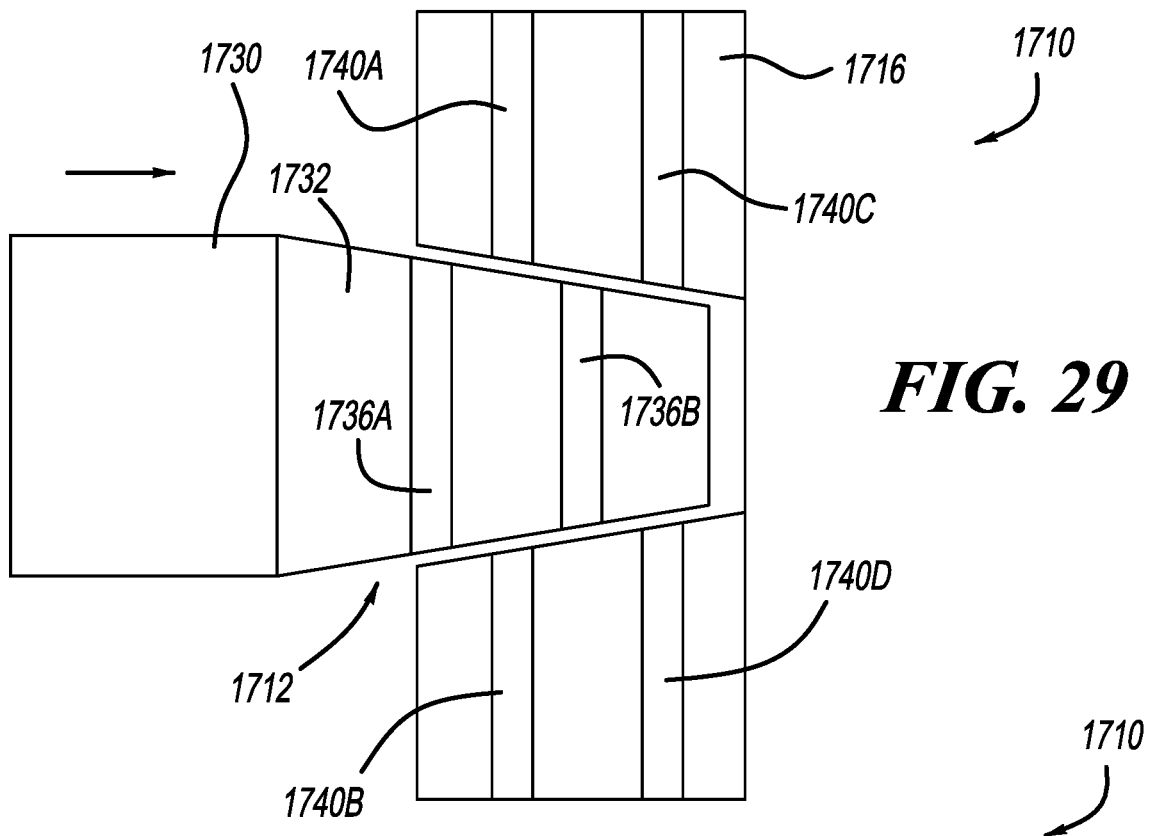
FIG. 29 is a schematic illustration of a valve control assembly constructed in accordance to another example of the present disclosure and shown prior to actuation.
Figure 30:
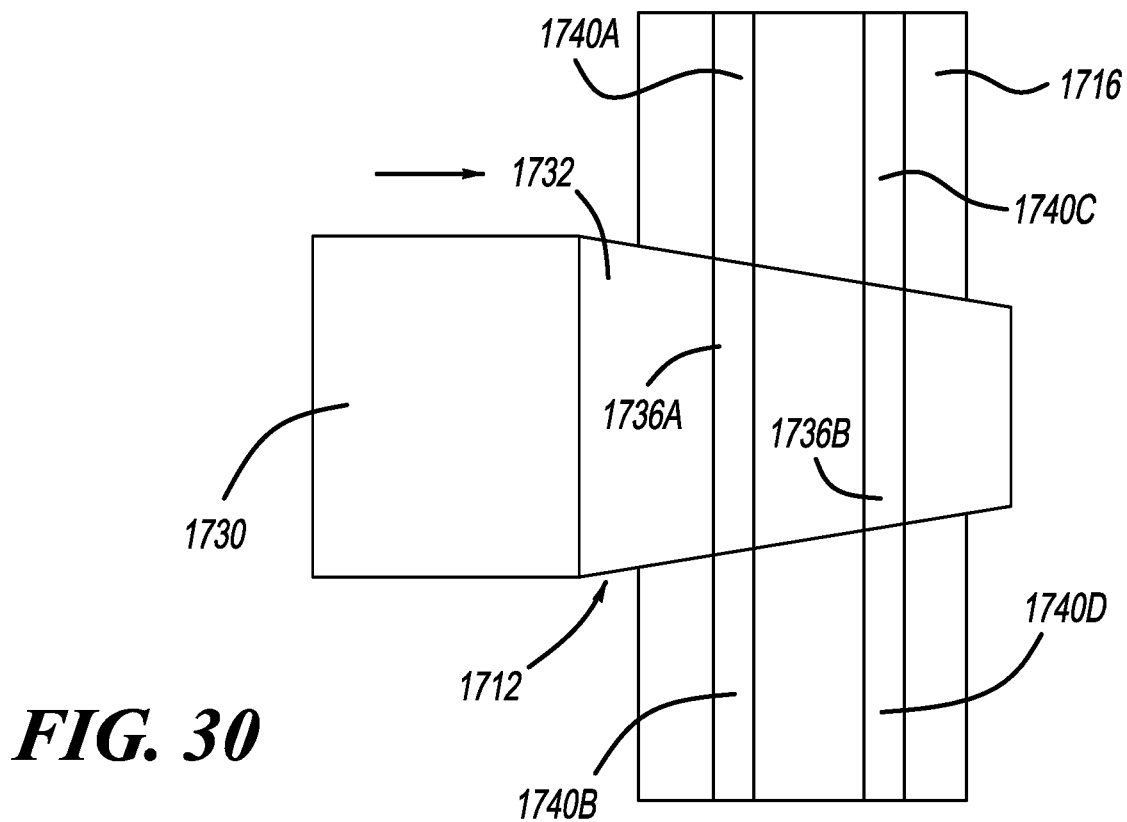
FIG. 30 is a schematic illustration of the valve control assembly of FIG. 29 and shown subsequent to actuation.

Turning now to FIGS. 29 and 30, a vent shut-off or control assembly constructed in accordance to one example of the present disclosure is shown and generally identified at reference 1710. The vent control assembly 1710 can be used in a fuel system such as fuel system 1010 and cooperate with evaporative emissions control system 1020 to open and close identified vents. It will be appreciated that the vent control assembly 1710 can be used in other fuel systems or systems in general to regulate fluid flow.

The vent control assembly 1710 generally includes shaft assembly 1712 and a block 1716. The vent control assembly 1710 can be configured for use with any of the actuation assemblies described above. The shaft assembly 1712 can include a split shaft having a first shaft portion 1730 and a second shaft portion 1732. In this example, the second shaft has first and second shaft passages 1736A, 1736B. The block has first, second, third and fourth block passages 1740A, 1740B, 1740C and 1740D. Based on this configuration, the second shaft 1732 can be translated from the position shown in FIG. 29 to a position shown in FIG. 30. As can be appreciated, multiple passages may be connected at a time. In the example shown in FIG. 30, the first shaft passage 1736A is aligned with the first and second block passages 1740A, 1740B. The second shaft passage 1736B is also aligned with third and fourth block passages 1740C, 1740D.

Figure 31:
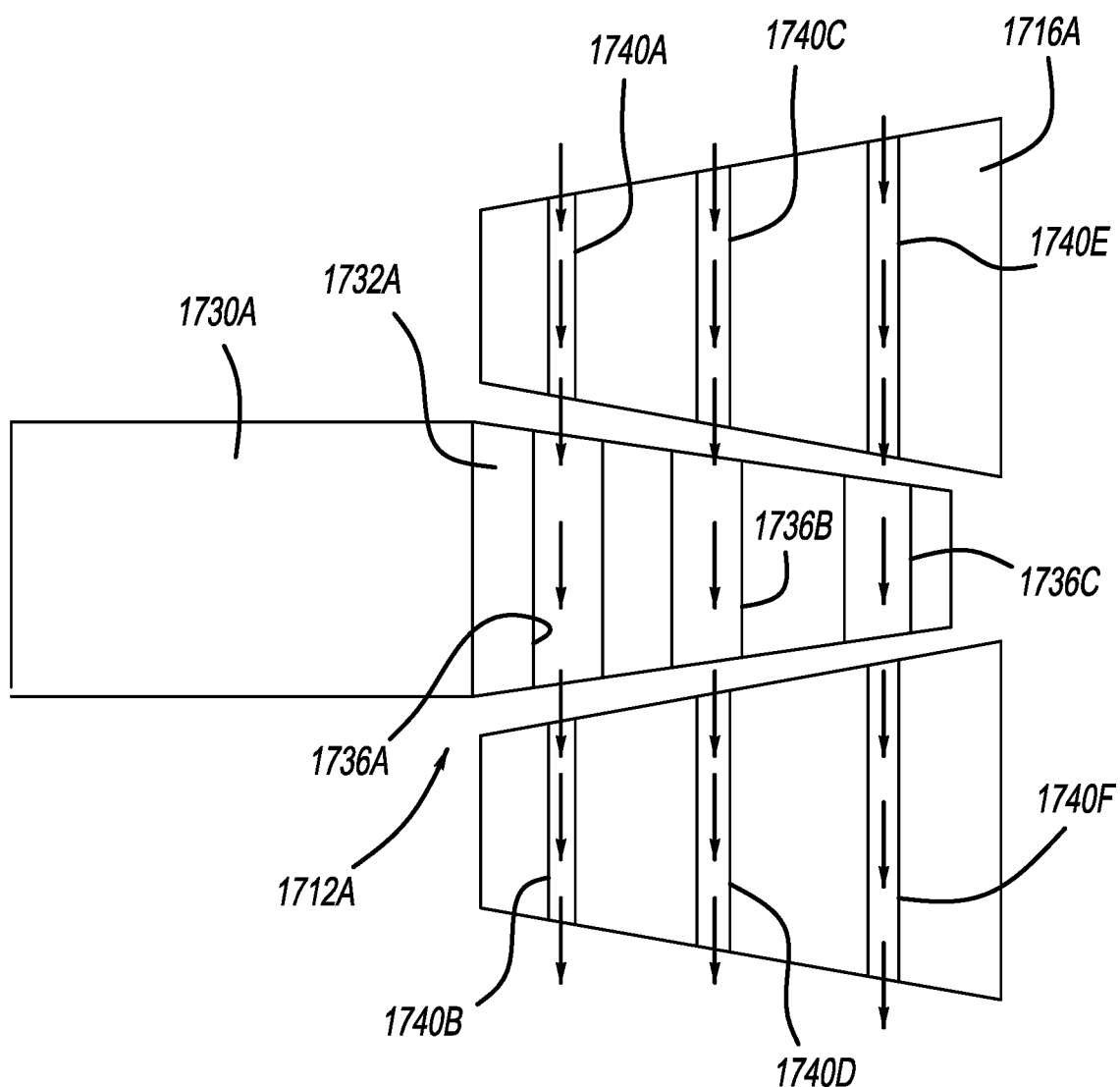
FIG. 31 is a schematic illustration of a valve control assembly constructed in accordance to another example.

FIG. 31 illustrates a shaft assembly 1712A having a first shaft 1730A and a second shaft 1732A. In this example, the second shaft 1732A has a third shaft passage 1736C. The block 1716A includes a fifth and sixth block passage 1740E and 1740F.

With reference now to FIGS. 32-35, a vent shut-off assembly 1822 constructed in accordance to additional features of the present disclosure will be described. The vent shut-off assembly 1822 can be used with any of the actuator assemblies described herein for actuating two vent points (such as a front tank vent and a rear tank vent) with a single cam. The vent shut-off assembly 1822 generally includes a cam 1830 having a first cam lobe 1832 and a second cam lobe 1834. Rotation of the cam 1830 causes selective actuation of a first vent poppet valve 1840 and a second vent poppet valve 1842. In one example, the first vent poppet valve 1840 has a first roller 1850 disposed at a distal end for engaging the cam 1830. The first vent poppet valve 1840 actuates to open and close a first port 1852. The second vent poppet valve 1842 has a second roller 1860 disposed at a distal end for engaging the cam 1830. The second vent poppet valve 1842 actuates to open and close a second port 1862. A first venting state is shown in FIG. 32 where the first and second vent poppet valves 1840 and 1842 are closed. A second venting state is shown in FIG. 33 where first poppet valve 1840 is open and the second poppet valve 1842 is closed. A third venting state is shown in FIG. 34 where the first and second poppet valves 1840 and 1842 are open. A fourth venting state is shown in FIG. 35 where the first poppet valve 1840 is closed and the second poppet valve 1842 is open.

Figure 36:
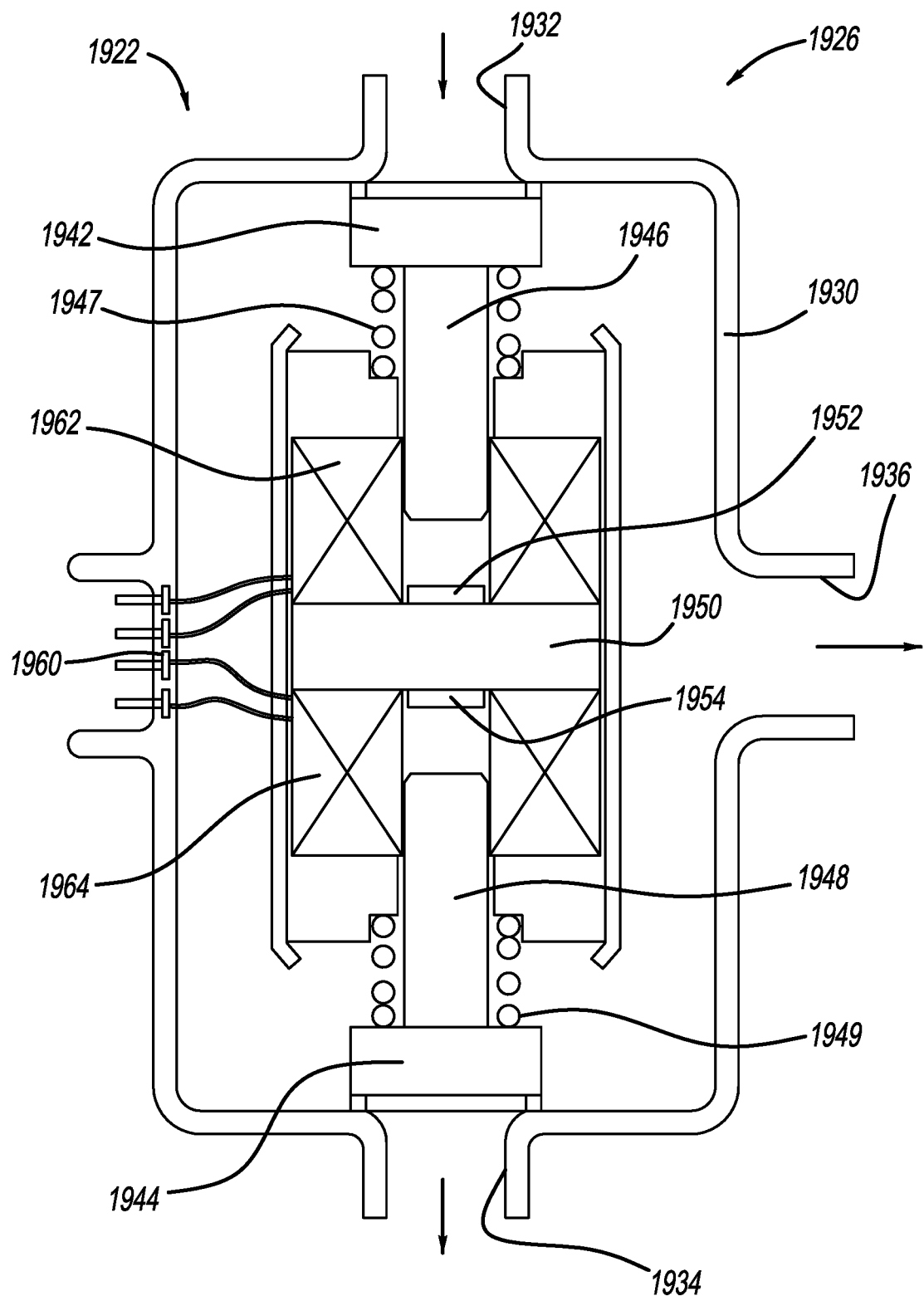
FIG. 36 is a sectional view of a vent shut-off assembly constructed in accordance to another example of the present disclosure.

Turning now to FIG. 36, a vent shut-off assembly 1922 constructed in accordance to another example of the present disclosure will be described. The vent shut-off assembly 1922 can be used with any of the actuator assemblies described herein for opening and closing various vent ports. In the example shown, the vent shut-off assembly 1922 includes a three port, four position latching fuel vapor solenoid valve 1926. The solenoid valve 1926 generally includes a valve body 1930 that defines a first port 1932, a second port 1934 and a third port 1936. A first seal assembly 1942 selectively opens and closes the first port 1932. A second seal assembly 1944 selectively opens and closes the second port 1934. A first armature 1946 extends from the first seal assembly 1942. A first biasing member 1947 biases the first seal assembly 1942 to a closed position. A second armature 1948 extends from the second seal assembly 1944. A second biasing member 1949 biases the second seal assembly 1944 to a closed position.

A pole piece 1950 can be centrally arranged in the solenoid valve 1926. A first and second permanent magnet 1952 and 1954 are disposed on opposite sides of the pole piece 1950. An electrical connector 1960 is electrically coupled to a first encapsulated coil 1962 and a second encapsulated coil 1964. The solenoid valve 1926 can have an electrical termination or connector that plugs into a valve body electrical breakout connector instead of using a pig tail connection. A seal assembly can be assembled to an armature using a variety of retention methods such as, but not limited to over-mold configurations and snap-fit arrangements. The permanent magnets 1952 and 1954 can be overmolded into the first and second coils 1962 and 1964 or assembled into small detents on the pole piece 1950. The first and/or second coils 1962 and 1964 can be energized to move the first and/or second seal assemblies 1942 and 1944 thereby opening or closing the first and second ports 1932, 1934.

Figure 37:
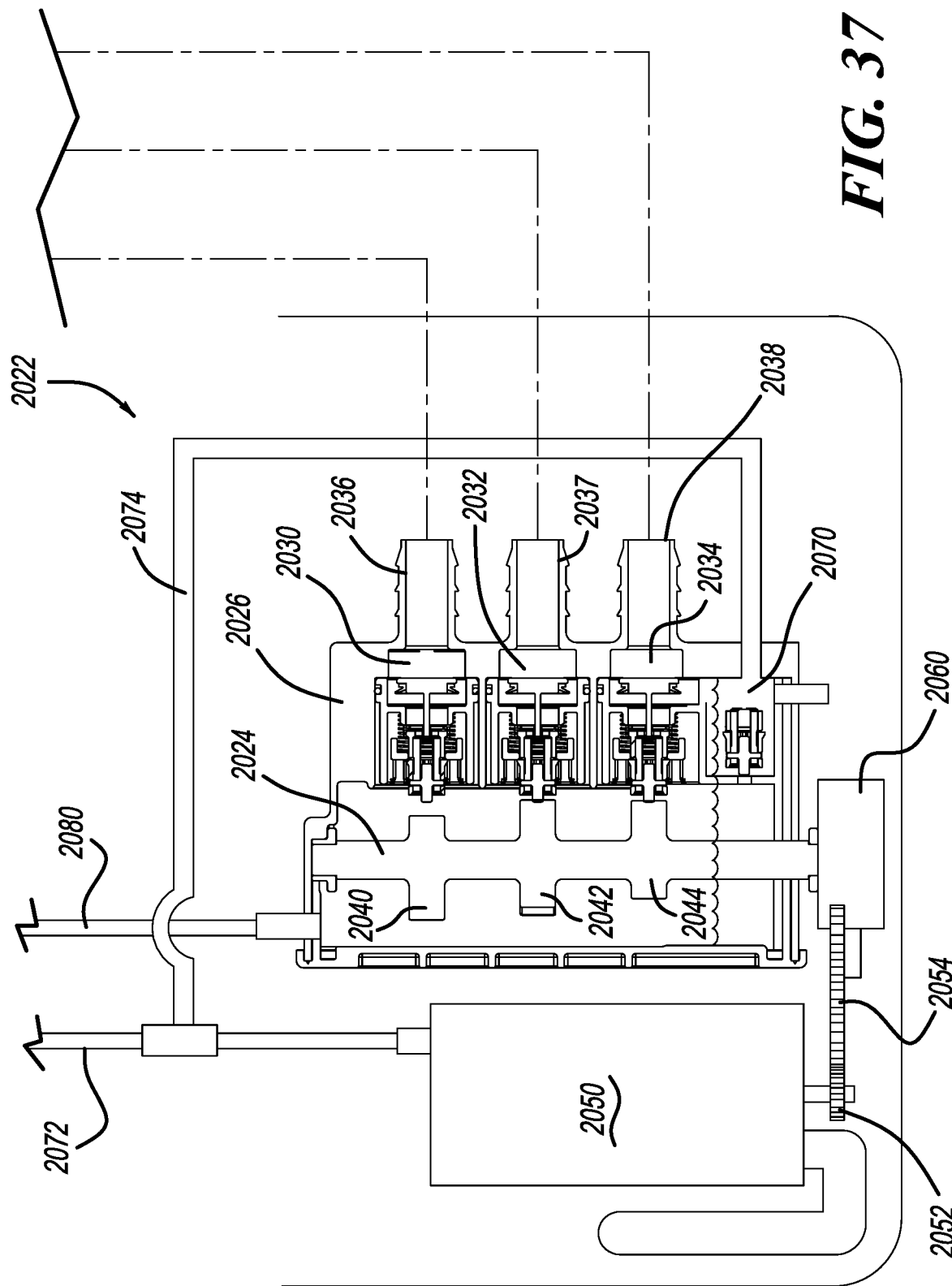
FIG. 37 is a partial sectional view of a vent shut-off assembly constructed in accordance to another example of the present disclosure.

Turning now to FIG. 37, a vent shut-off assembly 2022 constructed in accordance to another example of the present disclosure will be described. The vent shut-off assembly 2022 generally includes a vent box cam 2024 rotatably disposed in a vent box 2026 and that actuates respective first, second and third valves 2030, 2032 and 2034. The first valve 2030 opens and closes a first vapor port 2036. The second valve 2032 opens and closes a second vapor port 2037. The third valve 2034 opens and closes a third vapor port 2038. The first, second and third vapor ports 2036, 2037 and 2038 can be routed to various locations on the fuel tank as disclosed herein. The vent box cam 2024 includes a first cam 2040 that actuates the first valve 2030, a second cam 2042 that actuates the second valve 2032 and a third cam 2044 that actuates the third valve 2034.

The vent box cam 2024 is driven by a fuel pump 2050. Specifically, the fuel pump 2050 drives a first gear 2052 that drives a reduction gear 2054 that in turn drives a clutch mechanism 2060 that rotates the vent box cam 2024. An active drain liquid trap 2070 can be fluidly connected to a fuel feed line 2072 by a connection tube 2074. A vapor vent line 2080 is fluidly connected to the canister (see canister 1032, FIG. 1). A fuel pick up sock 2084 is arranged adjacent to the fuel pump 2050.

Figure 38:
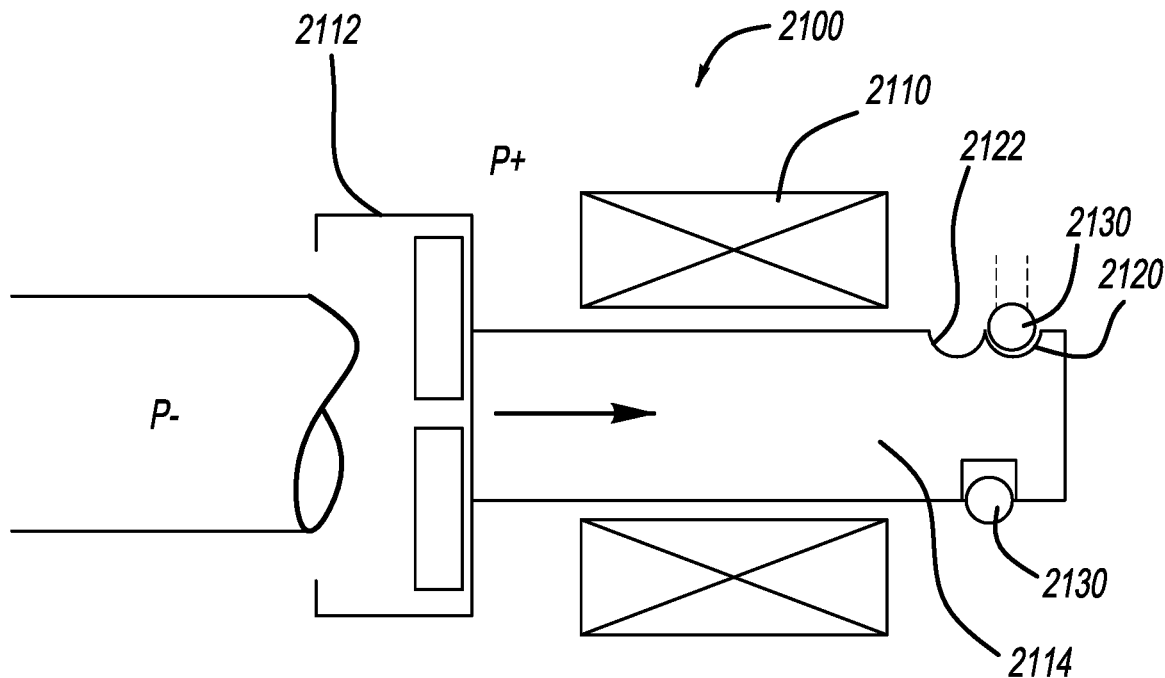
FIG. 38 is a partial sectional view of a valve arrangement configured for use with two-stage actuation, the valve arrangement shown in a first position.
Figure 39:
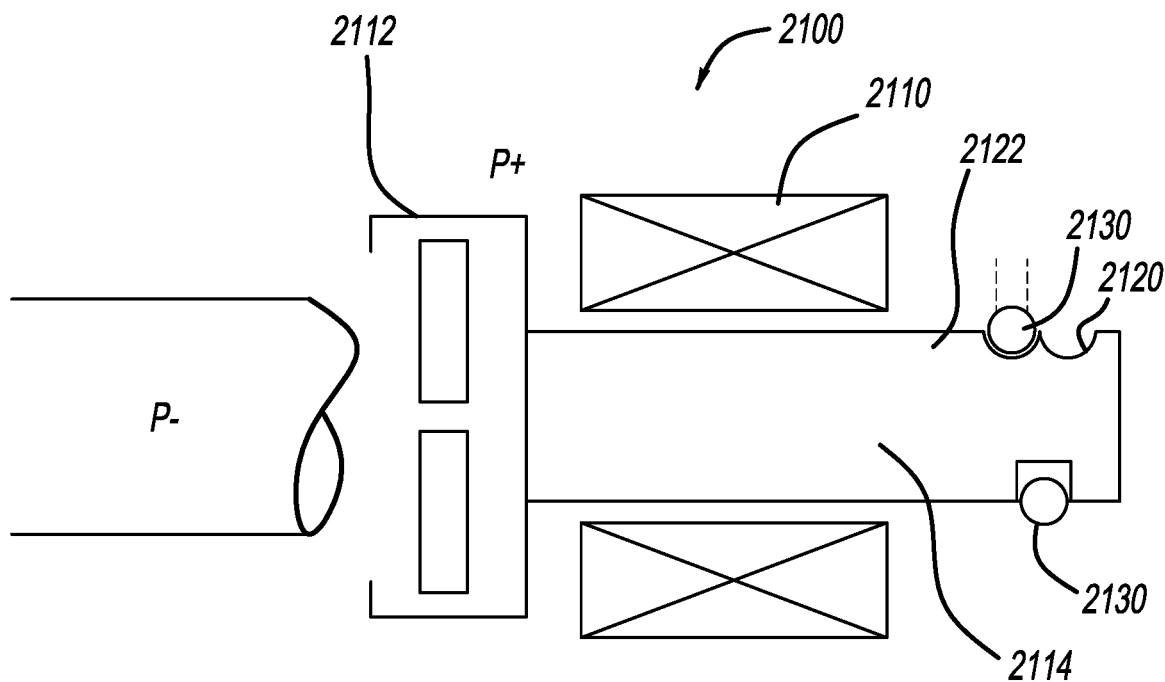
FIG. 39 is a partial sectional view of the valve arrangement of FIG. 38 and shown in a second position.

FIGS. 38 and 39 illustrate a valve arrangement 2100 that can be used in any of the valves disclosed herein. The valve arrangement 2100 is two-staged such that a smaller orifice is first opened to relieve pressure and then less force is required to subsequently open a larger orifice. The valve arrangement 2100 includes a coil 2110 and armature 2112. A shaft 2114 has a first groove 2120 and a second groove 2122. A locating member 2130 locates first into the first groove 2120 and subsequently into the second groove 2122 for sequential, staged opening of the valve.

Figure 40:
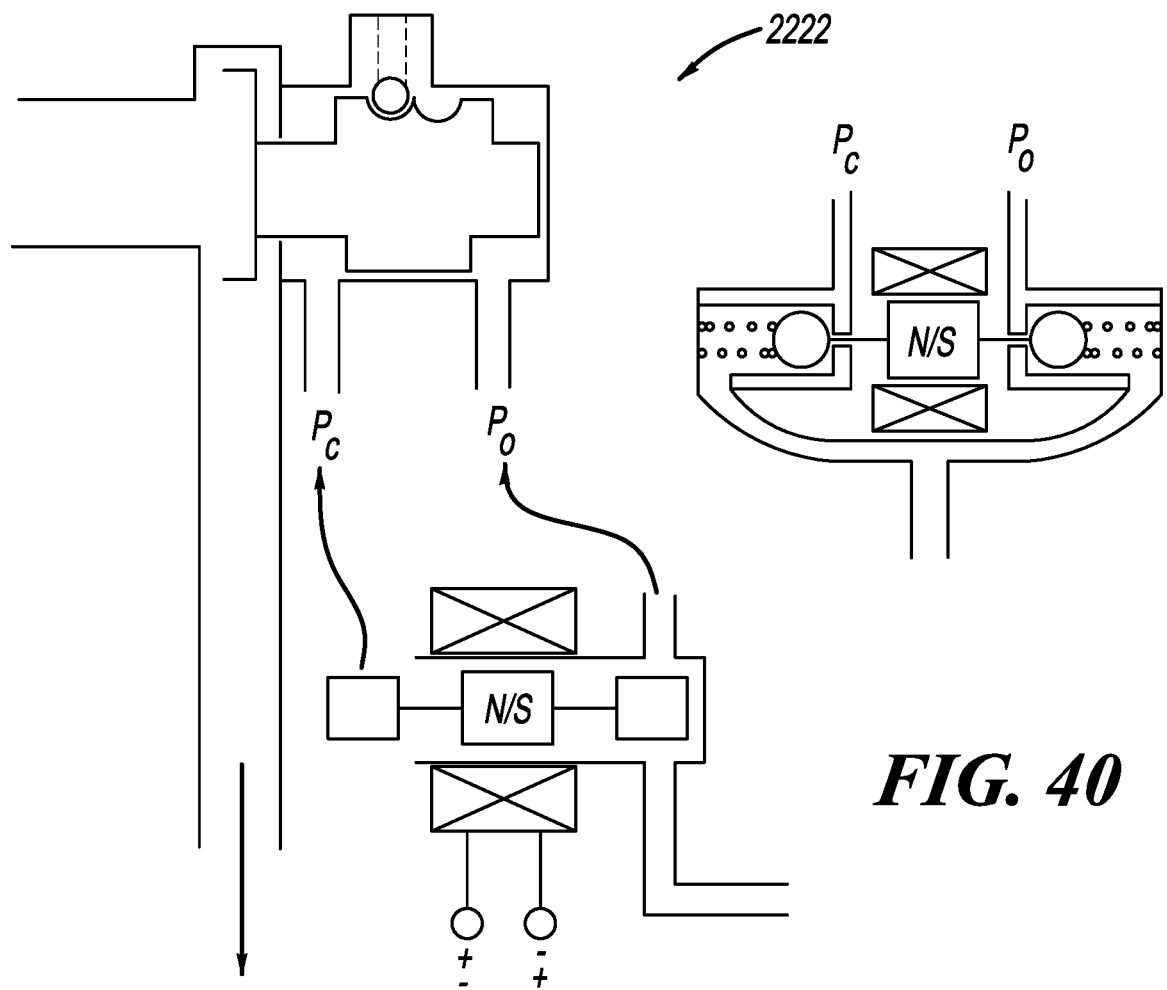
FIG. 40 is a schematic illustration of a vent shut-off assembly constructed in accordance to additional features of the present disclosure.
Figure 41:
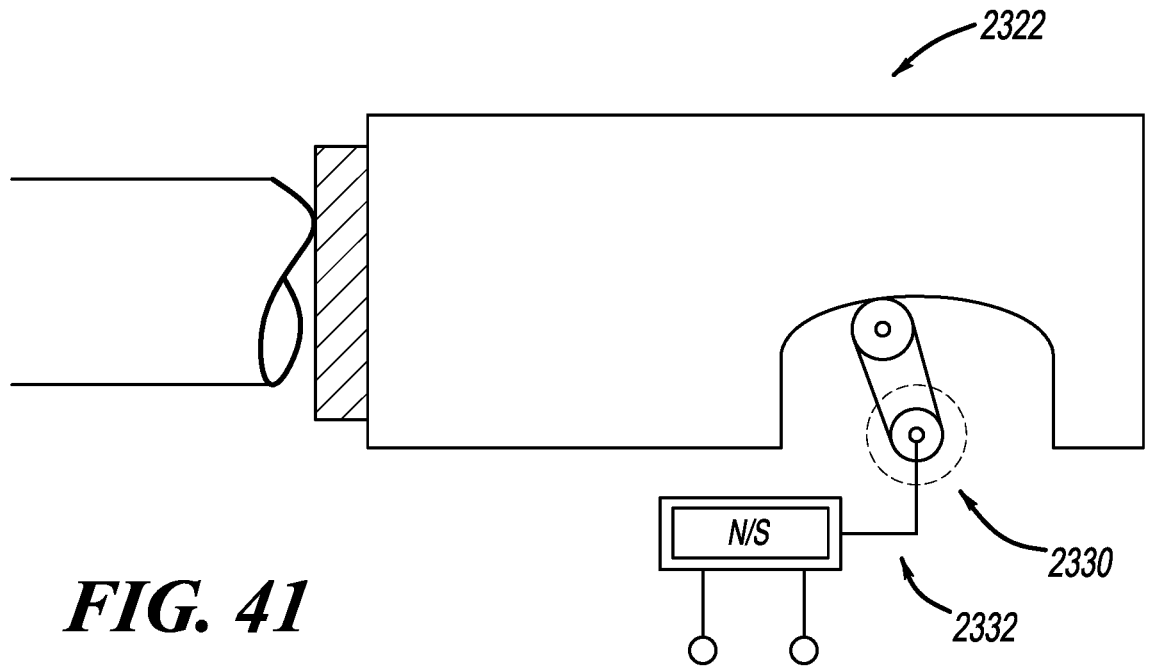
FIG. 41 is a schematic illustration of a vent shut-off assembly constructed in accordance to additional features of the present disclosure.

FIG. 40 illustrates a vent shut-off assembly 2222 constructed in accordance to additional features of the present disclosure. The vent shut-off assembly 2222 can be used in conjunction with any of the systems described herein. The vent shut-off assembly 2222 uses hydraulic force to drive the vent lines open and closed. FIG. 41 illustrates a vent shut-off assembly 2322. The vent shut-off assembly 2322 can be used in conjunction with any of the systems described herein. The vent shut-off assembly 2322 includes a motor 2330 that sends a switch 2332 back and forth to shuttle the vent points open and closed.

Figure 42:
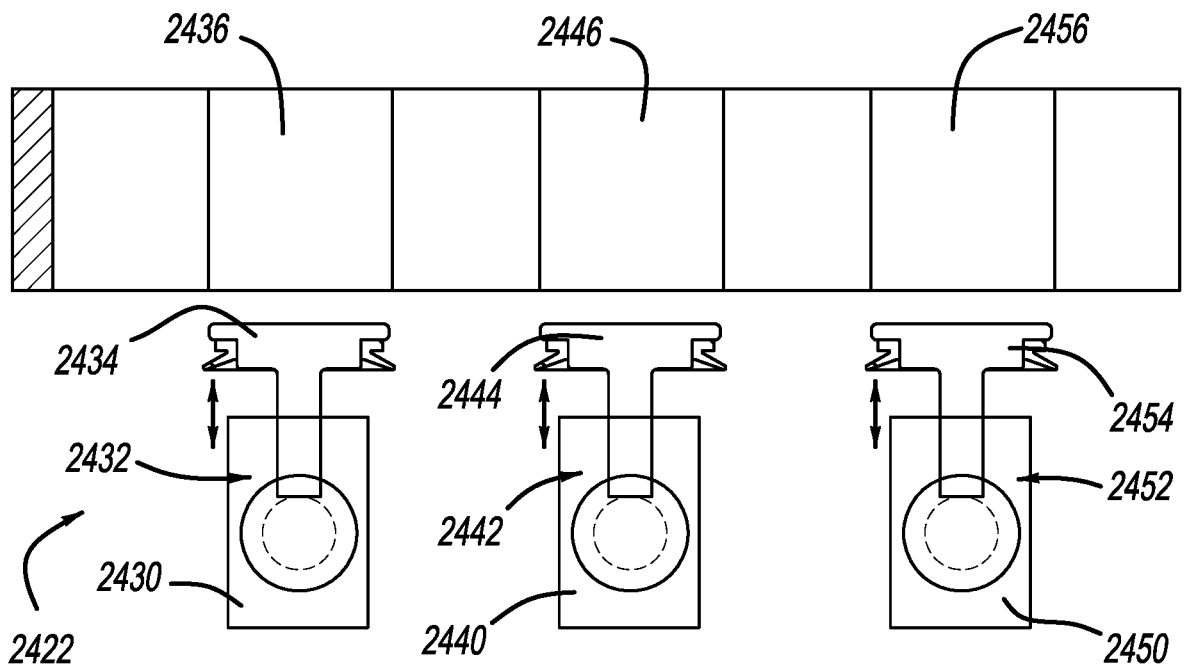
FIG. 42 is a schematic illustration of a vent shut-off assembly constructed in accordance to additional features of the present disclosure and shown having valves in an open position.
Figure 43:
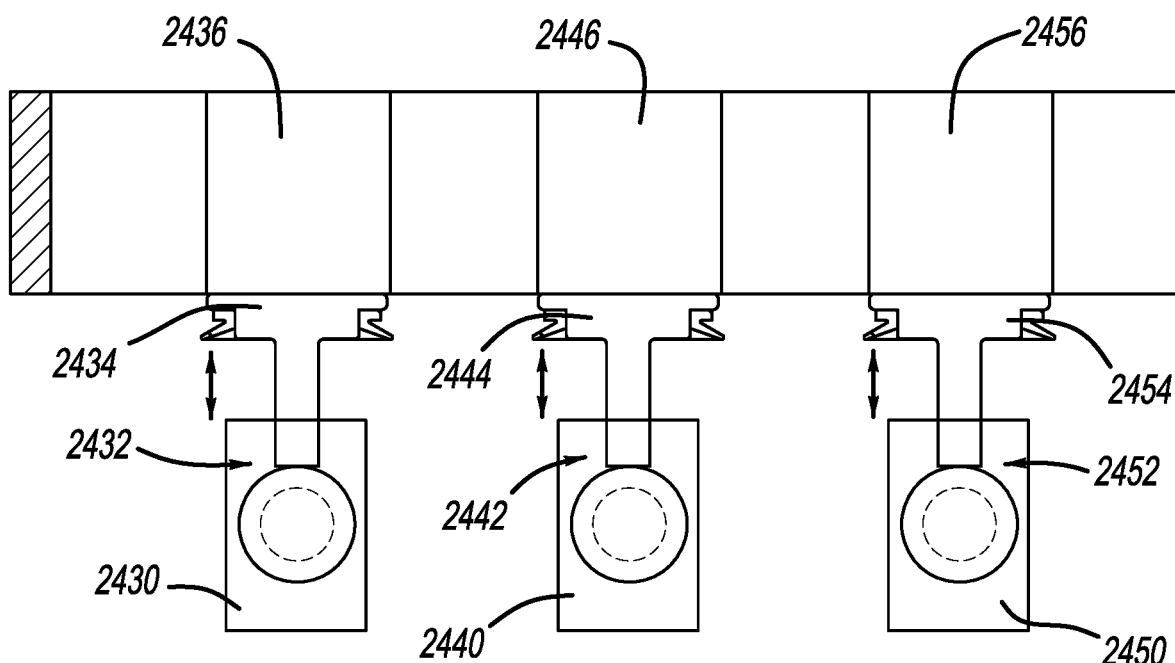
FIG. 43 is a schematic illustration of the vent shut-off assembly of FIG. 42 and shown with the valves in a closed position.
Figure 44:
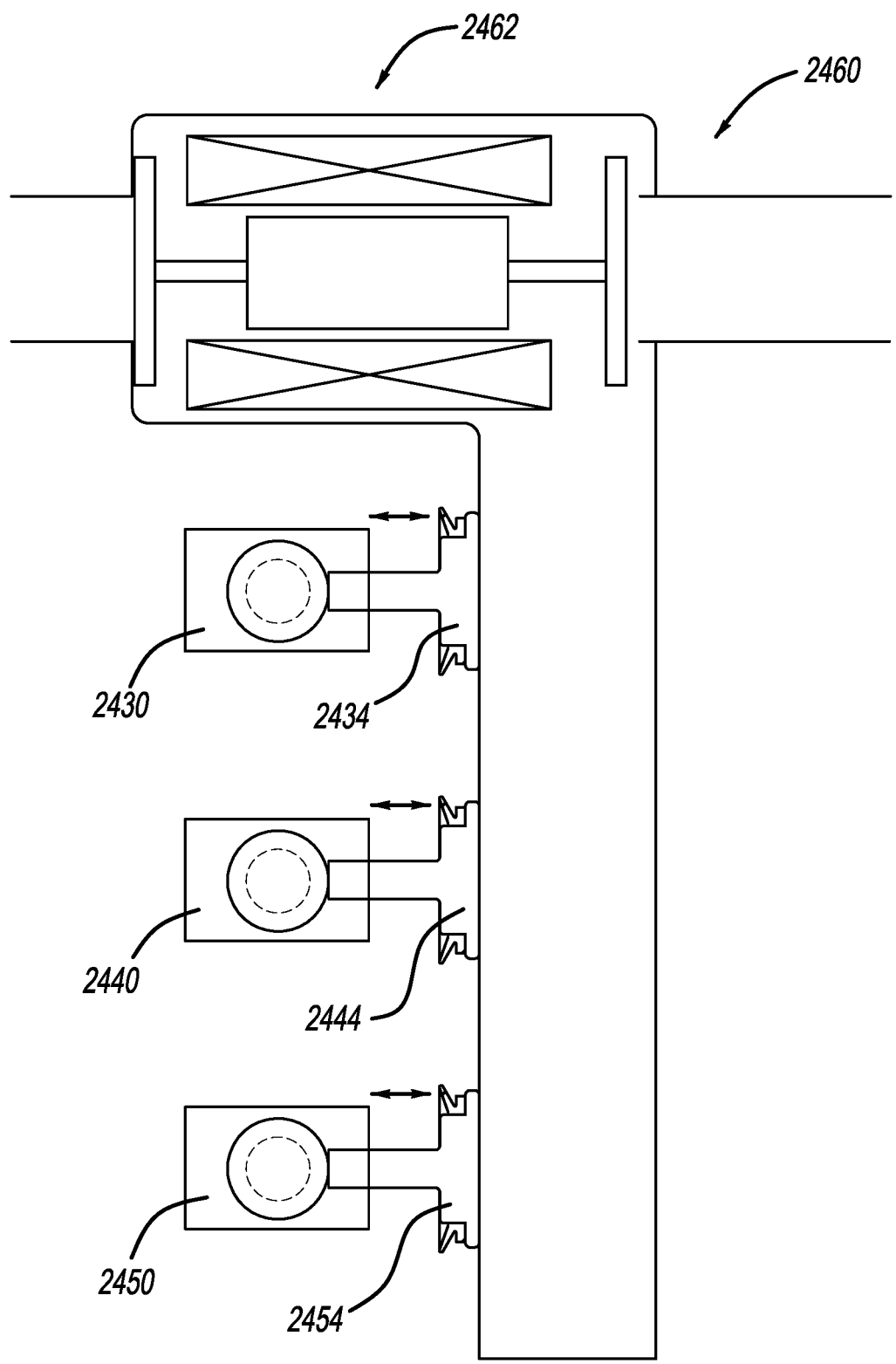
FIG. 44 is a schematic illustration of a vent shut-off assembly constructed in accordance to additional features of the present disclosure.

FIGS. 42-44 illustrate a vent shut-off assembly 2422 constructed in accordance to other features of the present disclosure. The vent shut-off assembly 2422 can be used in conjunction with any of the systems described herein. The vent shut-off assembly 2422 includes a first motor 2430 having a first linear screw drive 2432 that opens (FIG. 42) and closes (FIG. 43) a first vent 2434 associated with a first port 2436. A second motor 2440 has a second linear screw drive 2442 that opens (FIG. 68) and closes (FIG. 43) a second vent 2444 associated with a second port 2446. A third motor 2450 has a third linear screw drive 2452 that opens (FIG. 42) and closes (FIG. 43) a third valve 2454 associated with a third port 2456. FIG. 44 shows a manifold 2460 that can be associated with the vent shut-off assembly 2422. A solenoid 2462 can further open and close vent pathways in the manifold 2460.

Figure 45:
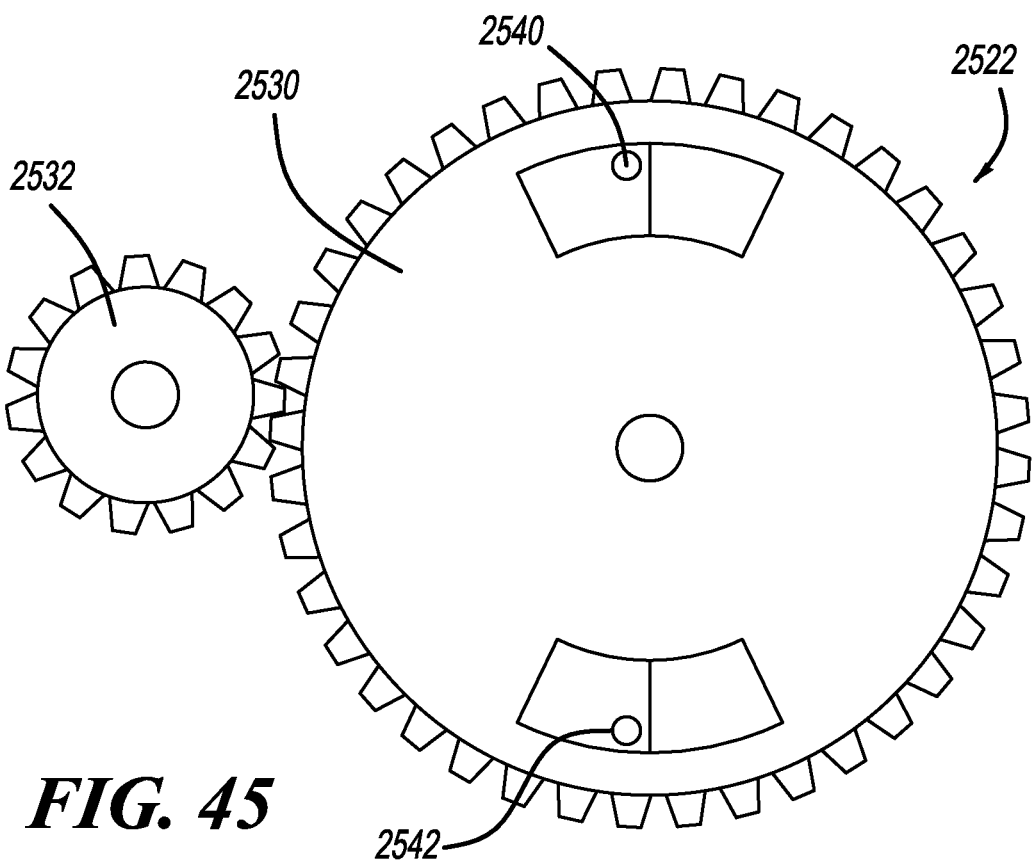
FIG. 45 is a schematic illustration of a vent shut-off assembly constructed in accordance to additional features of the present disclosure and shown with a central disc in a first position.
Figure 46:
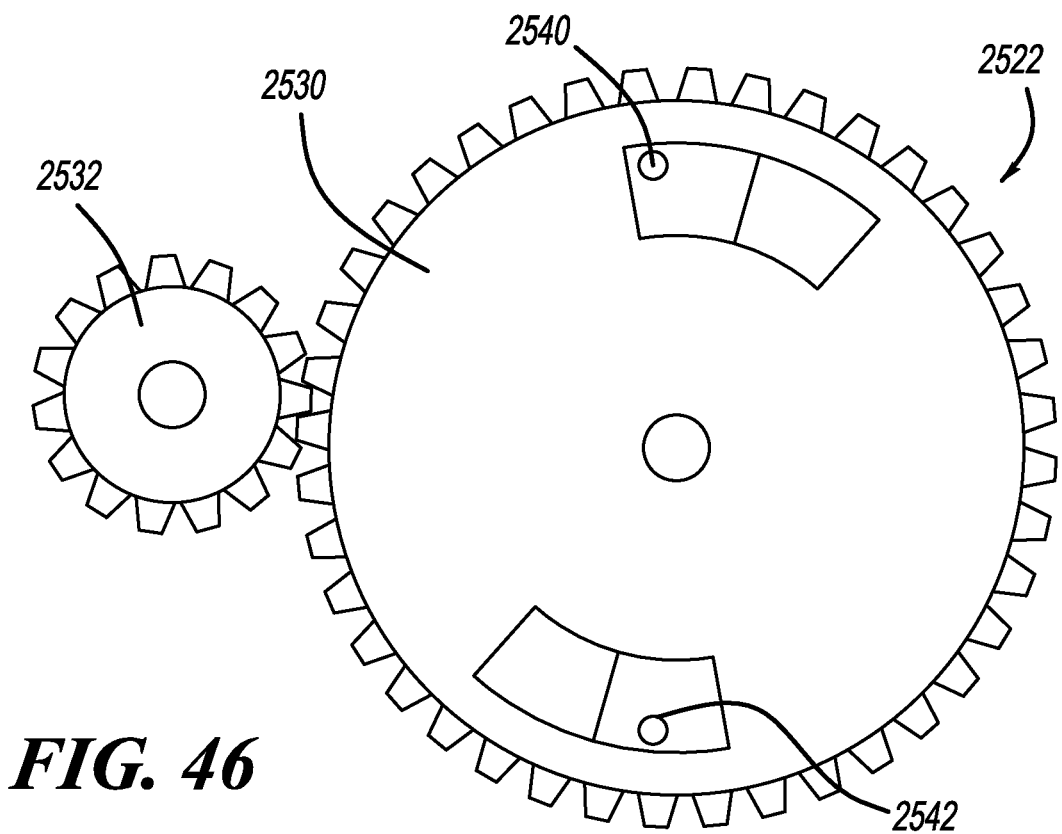
FIG. 46 is a schematic illustration of the vent shut-off assembly of FIG. 45 and shown with the central disc in a second position.
Figure 47:
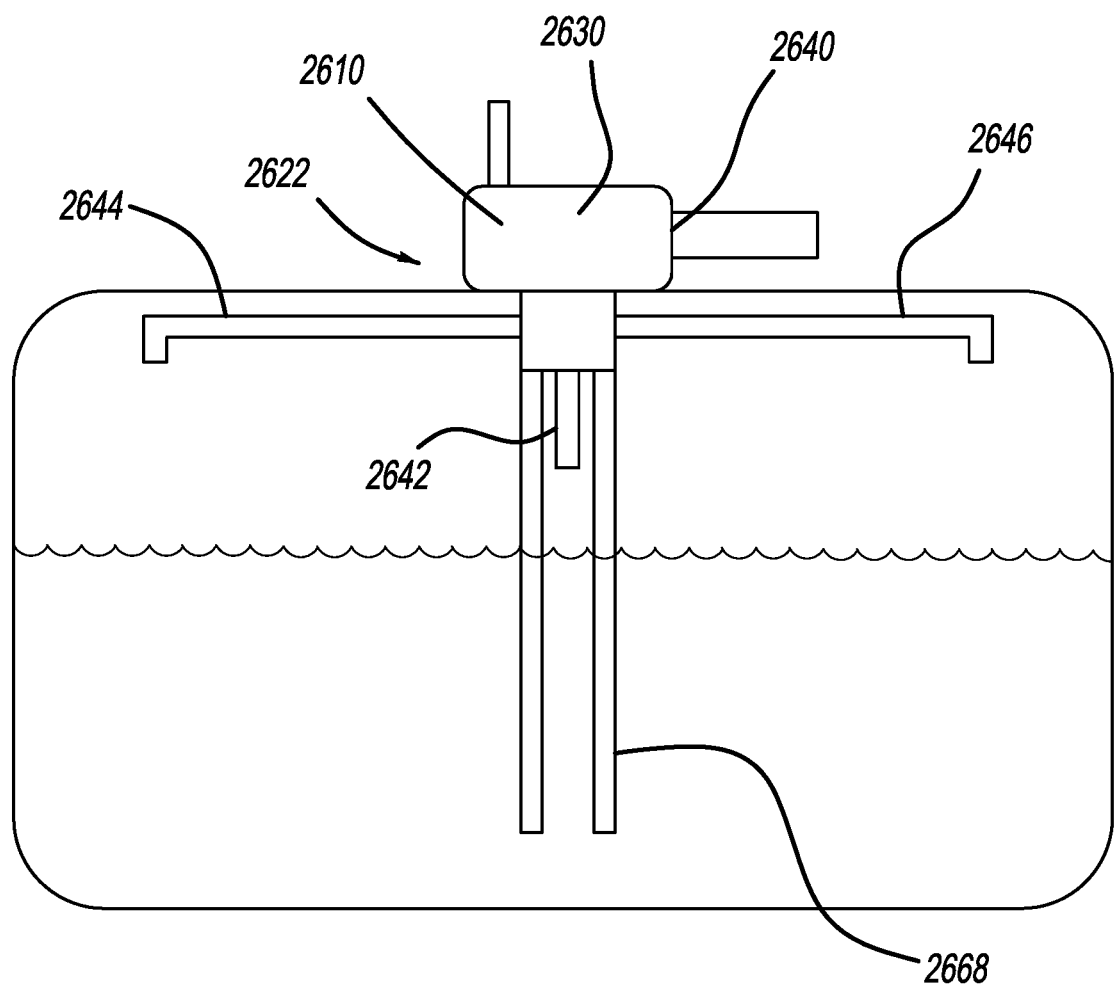
FIG. 47 is a schematic illustration of a valve control assembly constructed in accordance to one example of the present disclosure.
Figure 49:
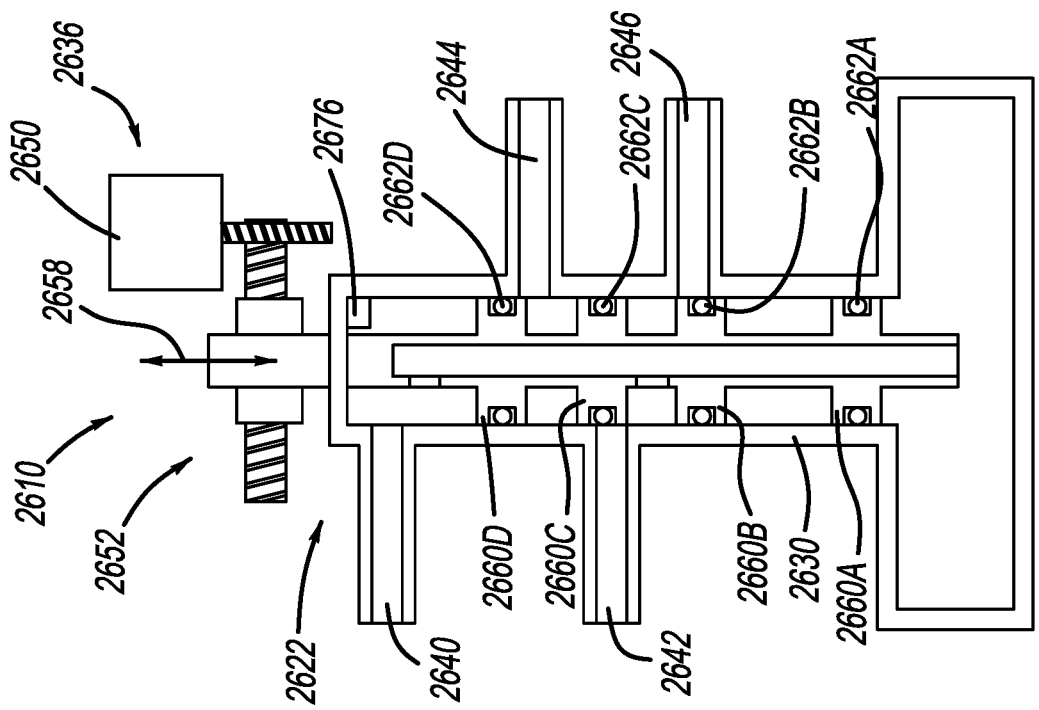
FIG. 49 is a sectional view of the valve shuttle and main housing of FIG. 48 and shown with the valve shuttle in a second position.
Figure 48:
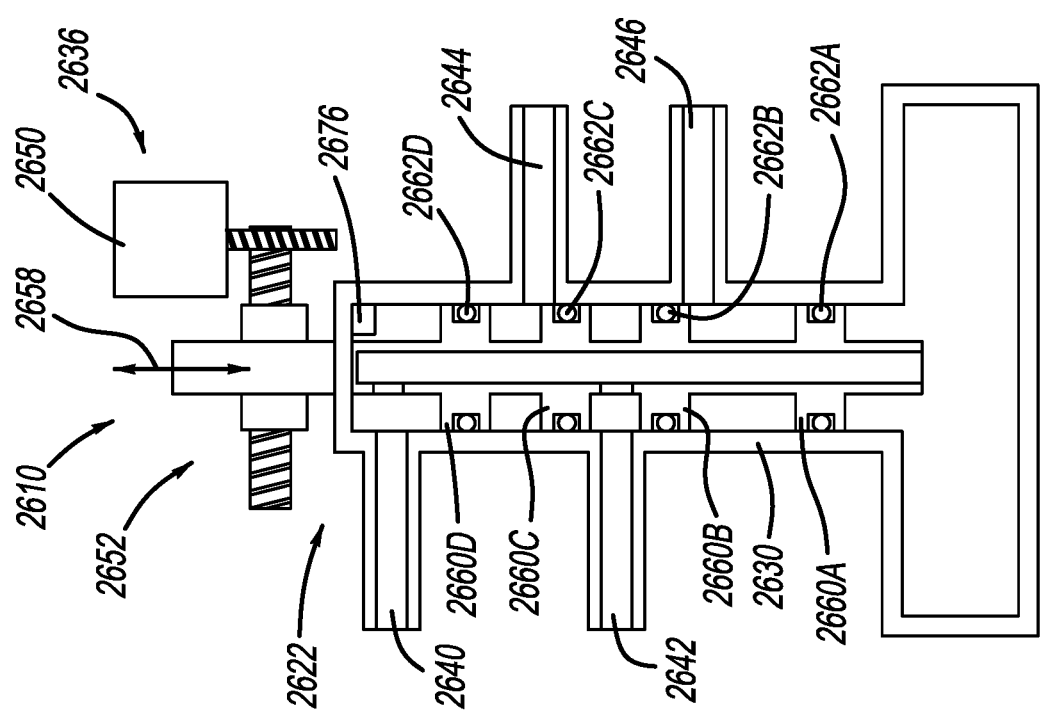
FIG. 48 is a sectional view of a valve shuttle and main housing shown with the valve shuttle in a first position.

FIGS. 45 and 46 illustrate a vent shut-off assembly 2522 constructed in accordance to additional features of the present disclosure. The vent shut-off assembly 2522 can be used in conjunction with any of the systems described herein. The vent shut-off assembly 2522 can includes a central disc 2530 that is rotated by a motor 2532. Push pins 2540 and 2542 are actuated open and closed as the central disc 2530 is rotated. The actuation can also be done linearly.

With reference now to FIGS. 47-59, a valve control assembly constructed in accordance to yet another example of the present disclosure is shown and generally identified at reference 2610. The valve control assembly 2610 includes a vent shut-off assembly 2622. The vent shut-off assembly 2622 can be used as part of an evaporative emissions control system in a fuel tank system. The vent shut-off assembly 2622 includes a main housing 2630, a valve shuttle 2632 that translates within the main housing 2630, and an actuator assembly 2636. The main housing 2630 can have a first vent port 2640 that is fluidly connected to the canister 1032, a second port 2642 that is fluidly connected to an FLVV, a third port 2644 that is fluidly connected to a first grade vent valve (GVV) and a fourth port 2646 that is fluidly connected to a second grade vent valve (GVV).

The actuator assembly 2636 can include a motor 2650, such as a DC motor that actuates a ball screw mechanism 2652. Actuation of the ball screw mechanism 2652 translates the valve shuttle 2632 in the direction of arrows 2658. In the example shown, the valve shuttle 2632 includes radially extending collars 2660A, 2660B, 2660C and 2660D that receive respective seal members or O-rings 2662A, 2662B, 2662C and 2662D therearound. A capacitor level sensor 2668 is shown in FIG. 46 that senses fuel level.

During driving mode, a first grade vent valve and FLVV can be partially opened in a saddle tank arrangement. During refueling mode, only the FLVV will be opened. The actuator assembly 2636 including ball screw mechanism 2652 can cooperate with a position sensor 2676 to provide precise linear movement response of the valve shuttle 2632. The capacitor 2668 level sensor can be a two capacitor level sensor that is fitted to measure level an also to evaluate pitch and roll angle. Based on fuel level and angle (roll/pitch) sensing, the electronic control unit will give signal to the actuator assembly 2636 to open one of the ports 2640, 2642, 2644 and 2646 through directional control valves. During electric mode on a hybrid vehicle, all ports 2640, 2642, 2644 and 2646 are closed. A liquid trap can be included to trap the fuel which can be drained back through a directional control valve opening.

Figure 50:
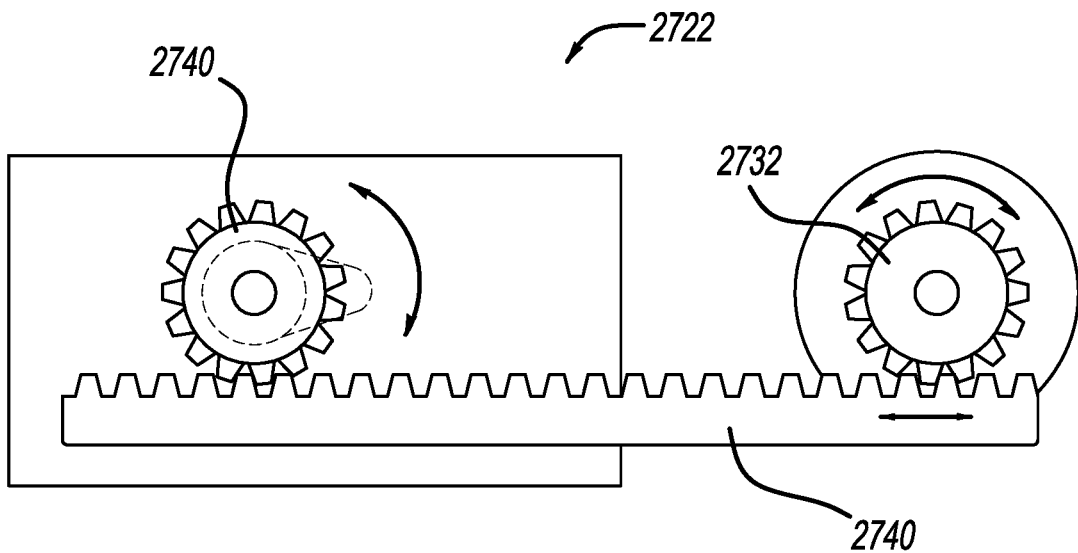
FIG. 50 is a sectional view of a vent shut-off assembly constructed in accordance to another example of the present disclosure and shown with a rack and driven gear in a first position.
Figure 51:
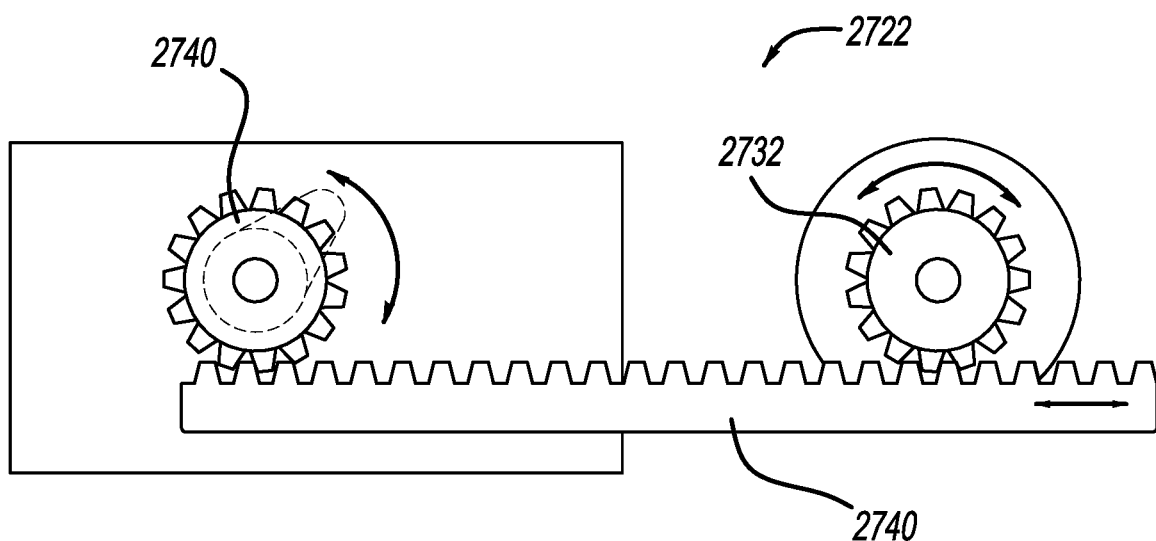
FIG. 51 is a sectional view of the vent shut-off assembly of FIG. 50 and shown with the rack and driven gear in a second position.

FIGS. 50 and 51 illustrate a vent shut-off assembly 2722 constructed in accordance to additional features of the present disclosure. The vent shut-off assembly 2722 can be used in conjunction with any of the systems described herein. In particular, the vent shut-off assembly 2722 may be used in place of the valve actuation assembly 1110 described above with respect to FIG. 6. In this regard, instead of a central rotating camshaft, the vent shut-off assembly 2722 includes a rack and pinion assembly 2730 having a drive gear 2732 driven by a motor 2734 and a driven gear 2740. A rack 2740 is meshingly engaged to both of the drive gear 2732 and the driven gear 2740. Rotation of the drive gear 2732 causes translation of the rack 2740 and consequently rotation of the driven gear 2740. The driven gear 2740 can rotate a single cam or a collection of cams such as described above with respect to FIG. 6.

Figure 52:
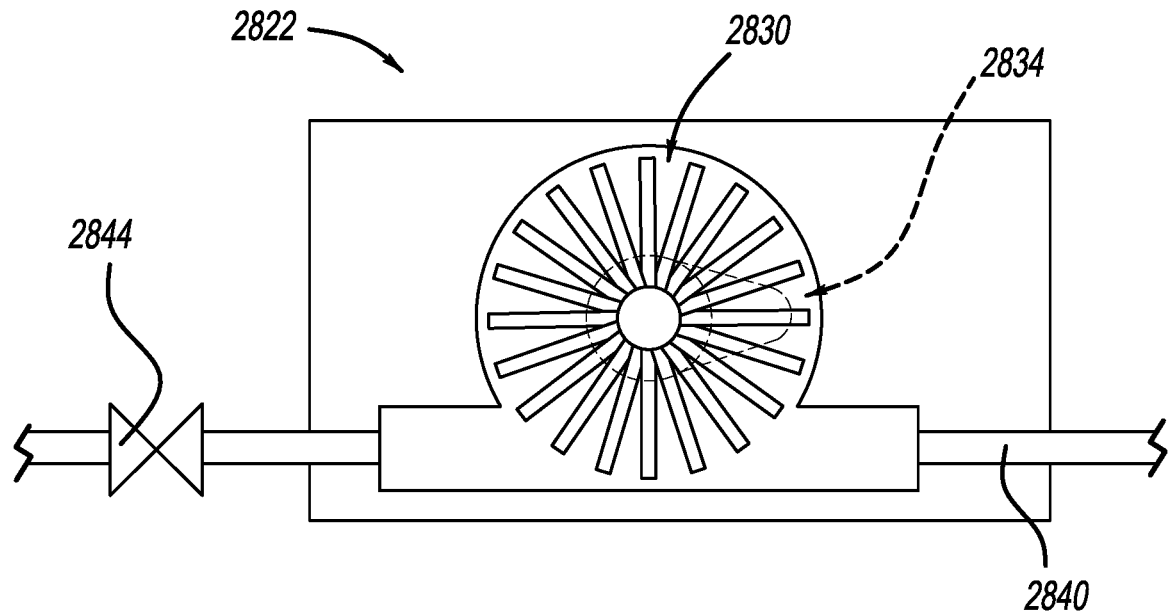
FIG. 52 is a schematic illustration of a hydraulically driven vent shut-off assembly constructed in accordance to another example of the present disclosure and shown with a cam assembly in a first position.
Figure 53:
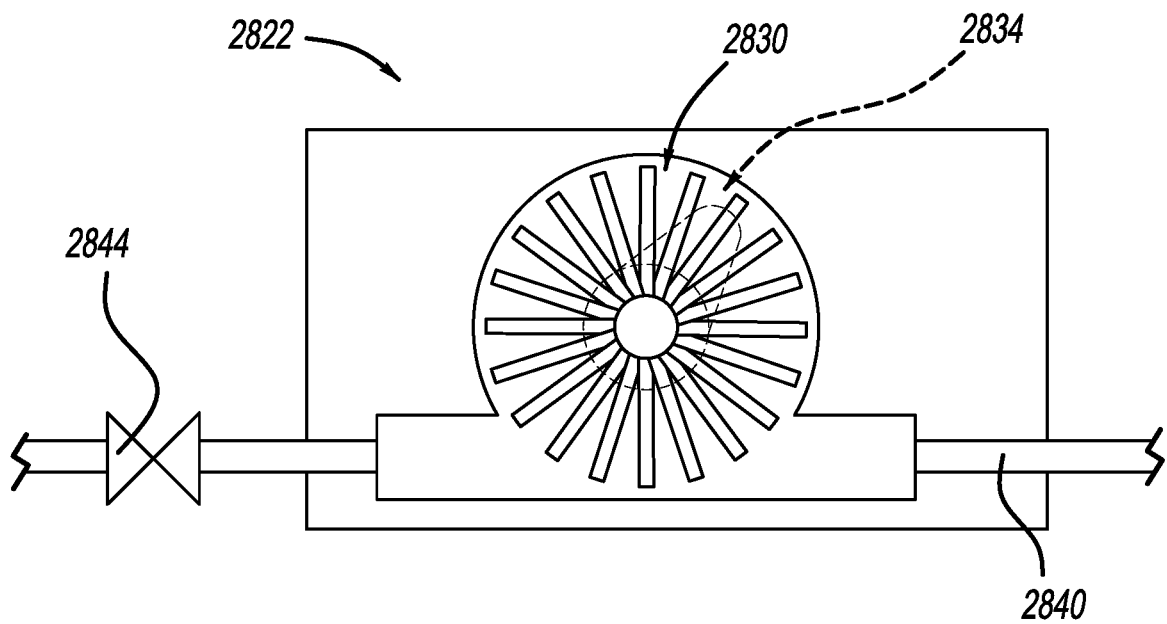
FIG. 53 is a schematic illustration of the vent shut-off assembly of FIG. 52 and shown with the cam assembly in a second position.

FIGS. 52 and 53 illustrate a vent shut-off assembly 2822 constructed in accordance to another example of the present disclosure. The vent shut-off assembly 2822 can be used in conjunction with any of the systems described herein. The vent shut-off assembly 2822 can be pneumatically driven. In this regard, a motor 2830 can drive a cam assembly 2834, such as described in any of the above configurations. An air or vacuum source 2840 can drive the cam assembly 2834. A control valve 2844 can be fluidly connected to the vacuum source 2840. A braking mechanism and/or a position sensing mechanism can further be included.

Figure 54:
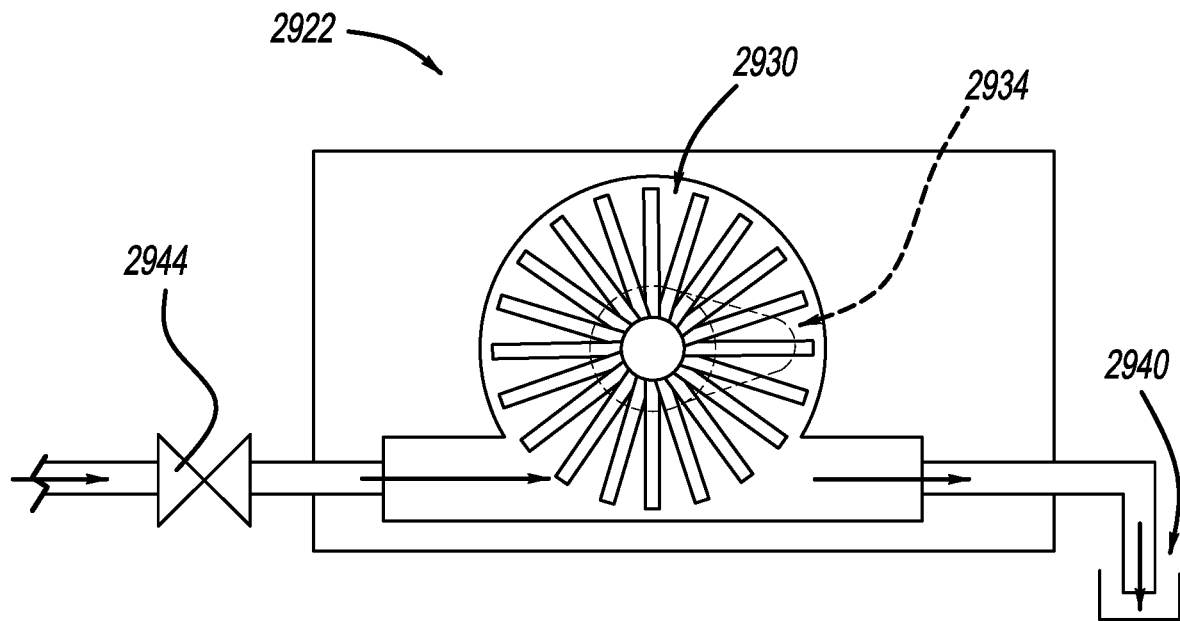
FIG. 54 is a schematic illustration of a pneumatically driven vent shut-off assembly constructed in accordance to another example of the present disclosure and shown with a cam assembly in a first position.
Figure 55:
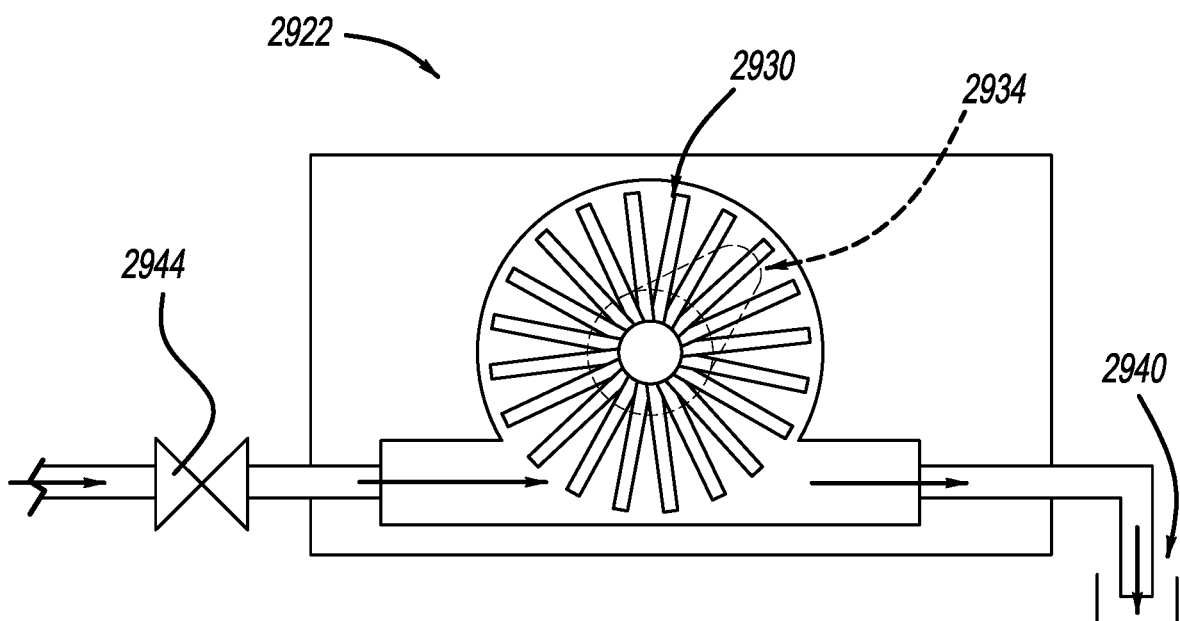
FIG. 55 is a schematic illustration of the vent shut-off assembly of FIG. 54 and shown with the cam assembly in a second position.

FIGS. 54 and 55 illustrate a vent shut-off assembly 2922 constructed in accordance to another example of the present disclosure. The vent shut-off assembly 2922 can be used in conjunction with any of the systems described herein. The vent shut-off assembly 2922 can be hydraulically driven. In this regard, a motor 2930 can drive a cam assembly 2934, such as described in any of the above configurations. A hydraulic source 2940 can drive the cam assembly 2934. A control valve 2944 can be fluidly connected to the hydraulic source 2940. A braking mechanism and/or a position sensing mechanism can further be included.

Figure 56:
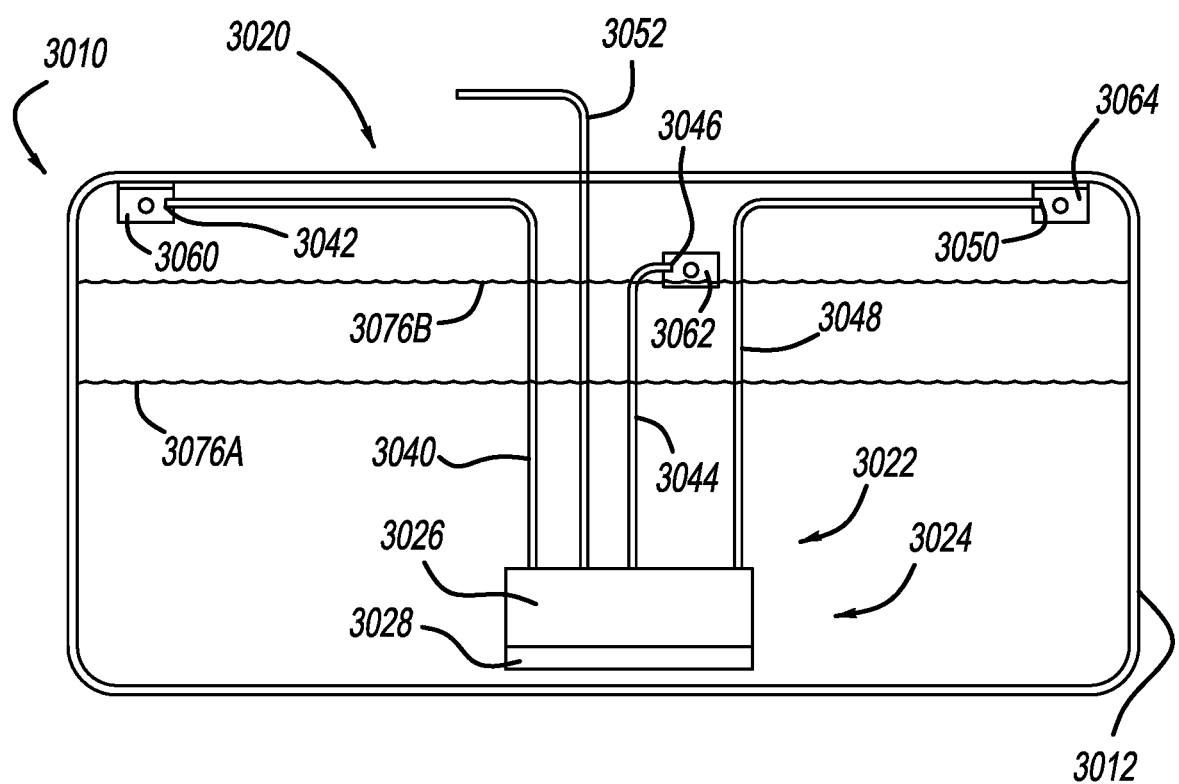
FIG. 56 is a schematic illustration of a fuel tank system constructed in accordance to additional features of the present disclosure and incorporating a refueling baffle.
Figure 57:
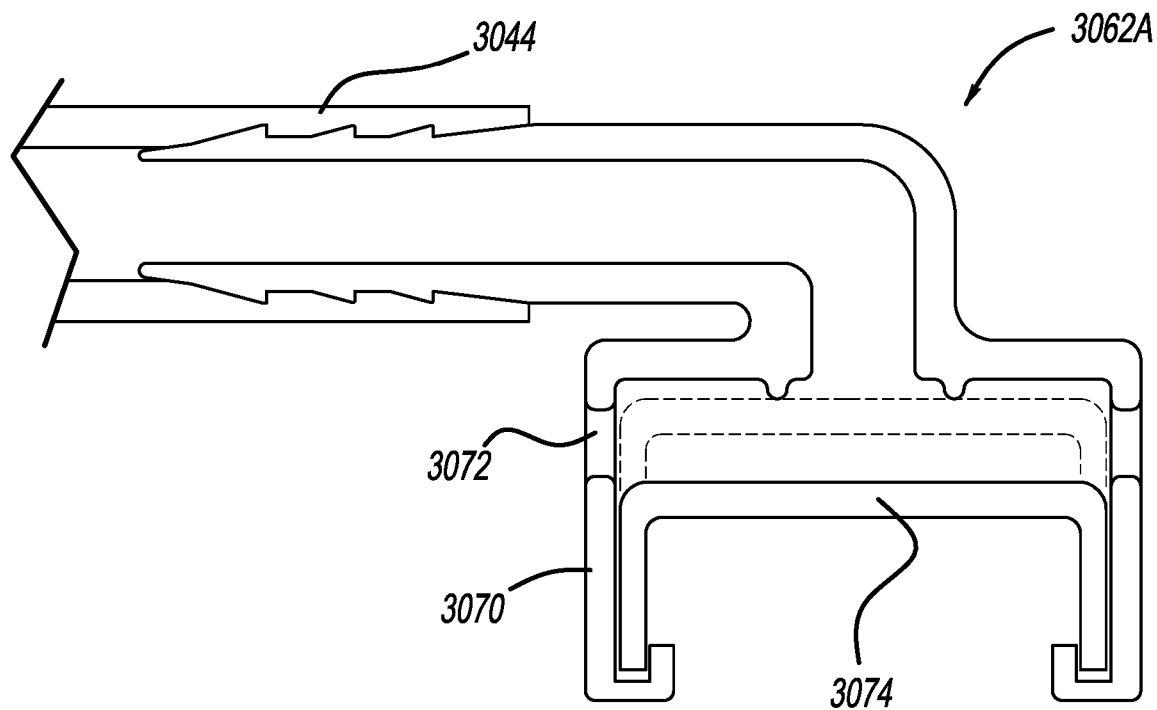
FIG. 57 is a sectional view of a refueling baffle constructed in accordance to one example of the present disclosure and shown with a cut in a first open position (solid line) and a second closed position (phantom line)
Figure 58:
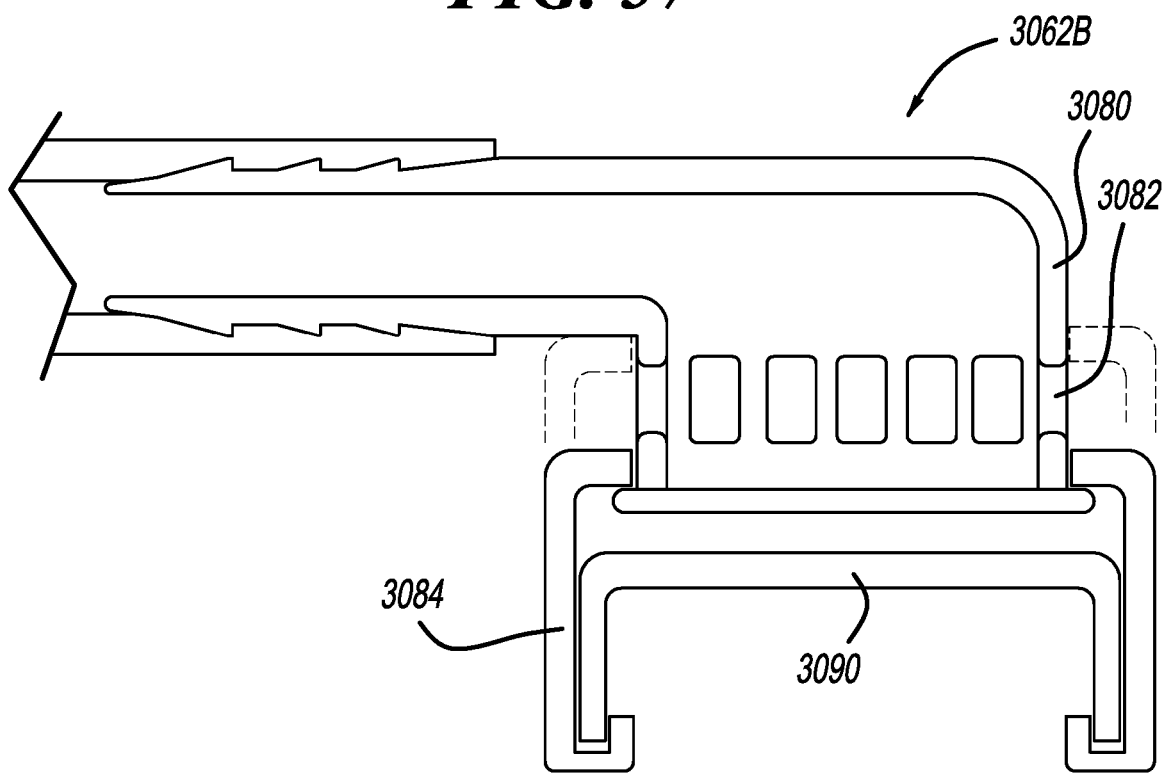
FIG. 58 is a sectional view of a refueling baffle constructed in accordance to another example of the present disclosure and shown with a cut in a first open position (solid line) and a second closed position (phantom line)
Figure 59A:
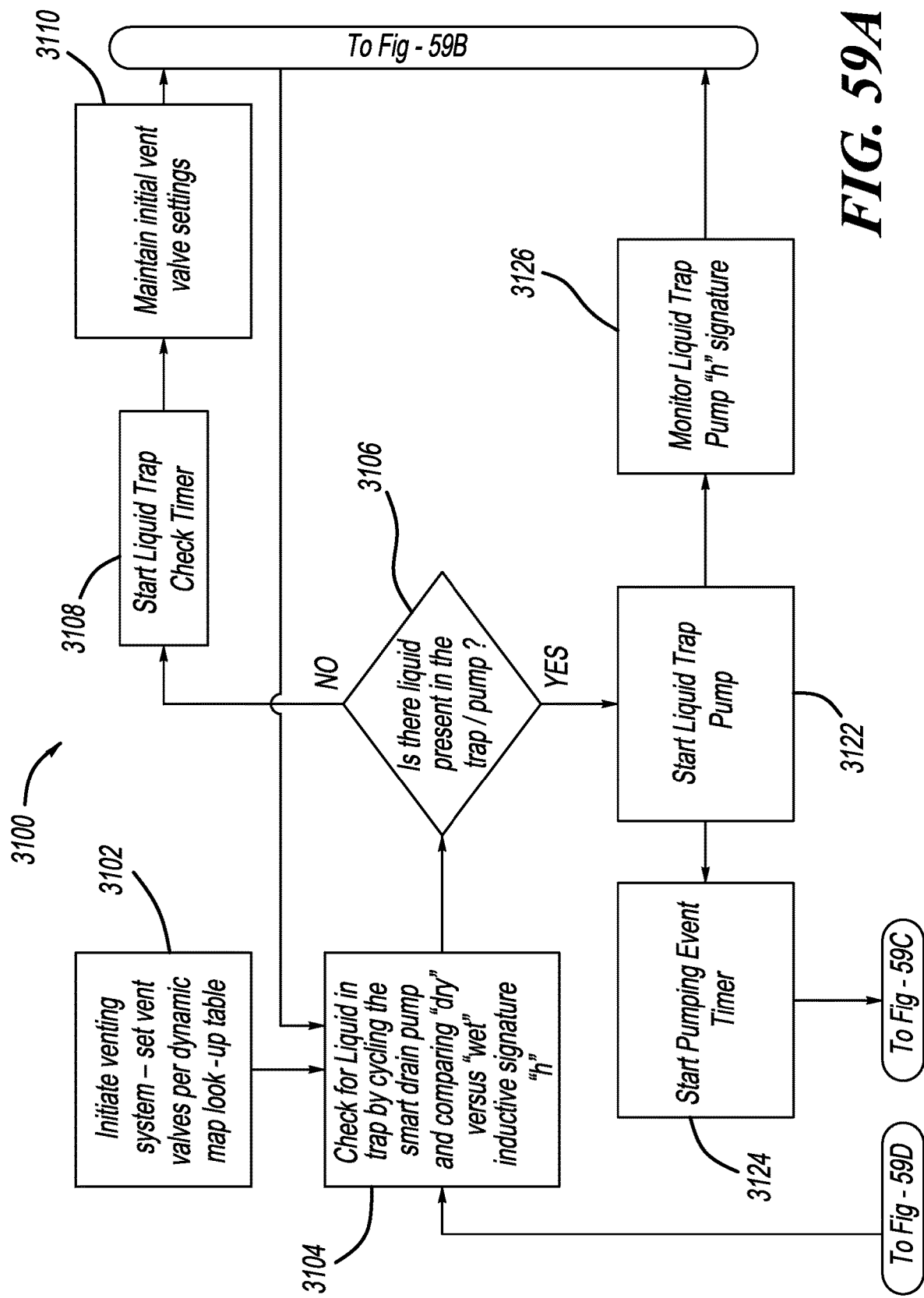
FIGS. 59A-59D illustrate an exemplary method of controlling a fuel tank system according to one example of the present disclosure.
Figure 59B:
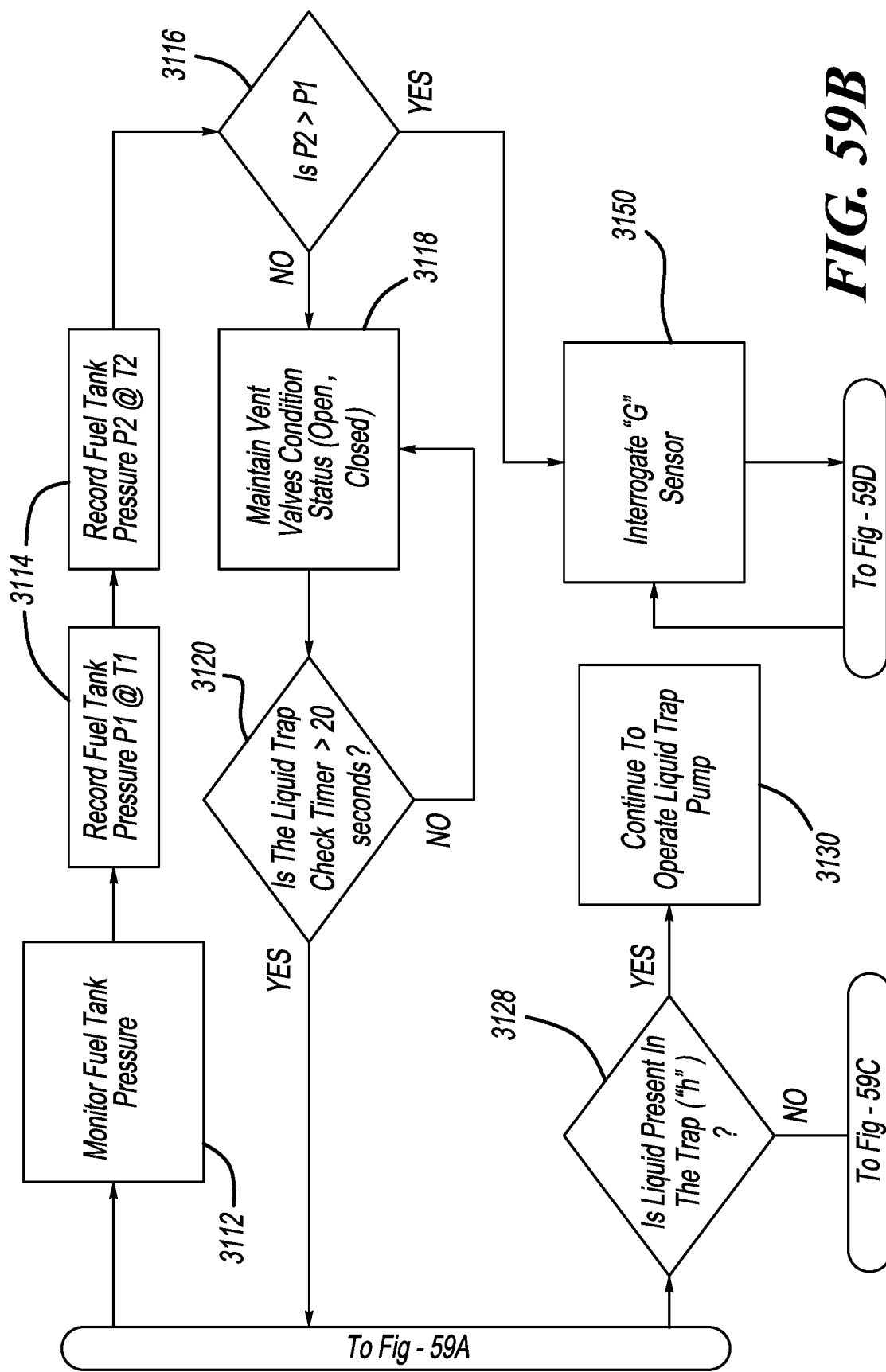
Figure 59C:
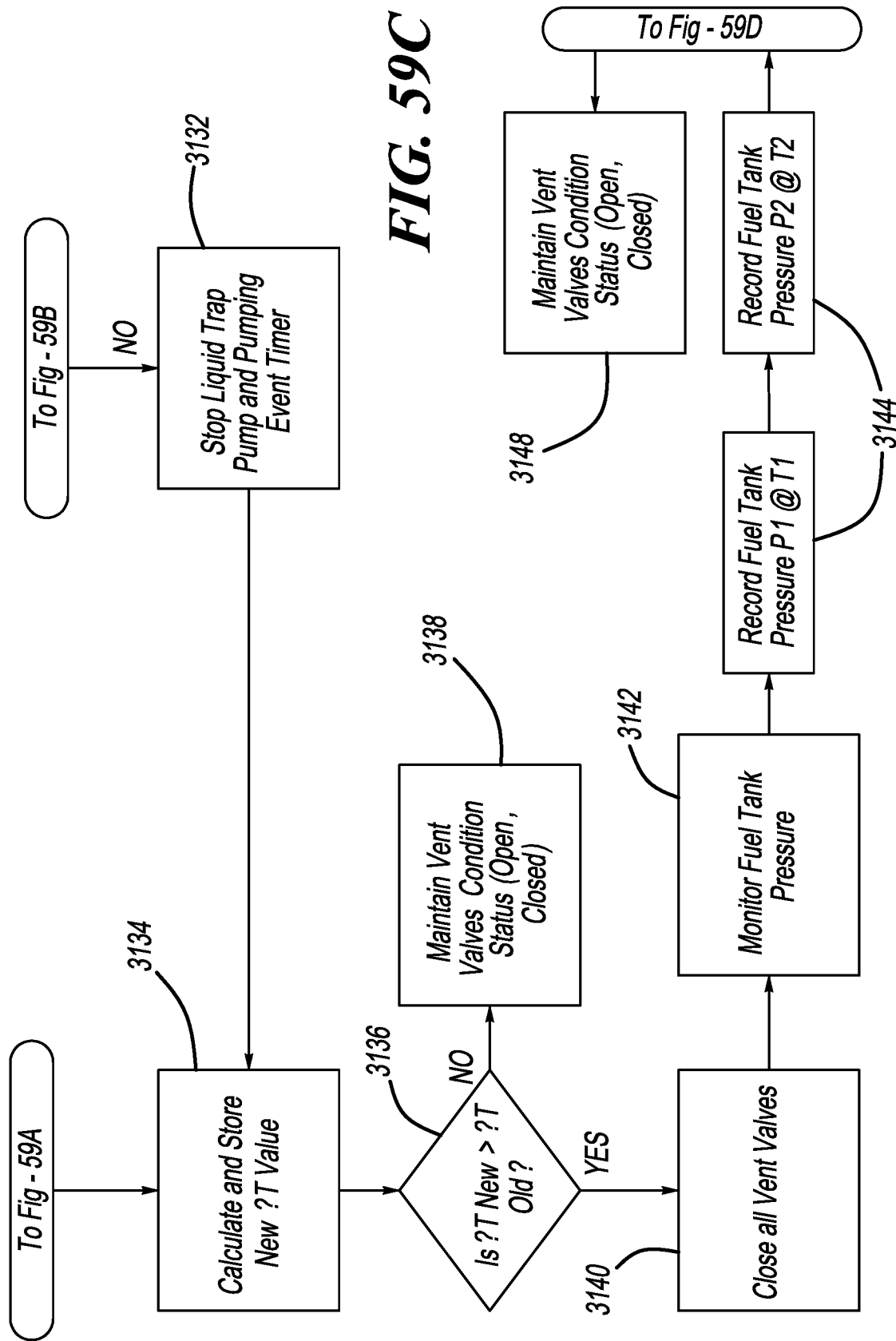
Figure 59D:
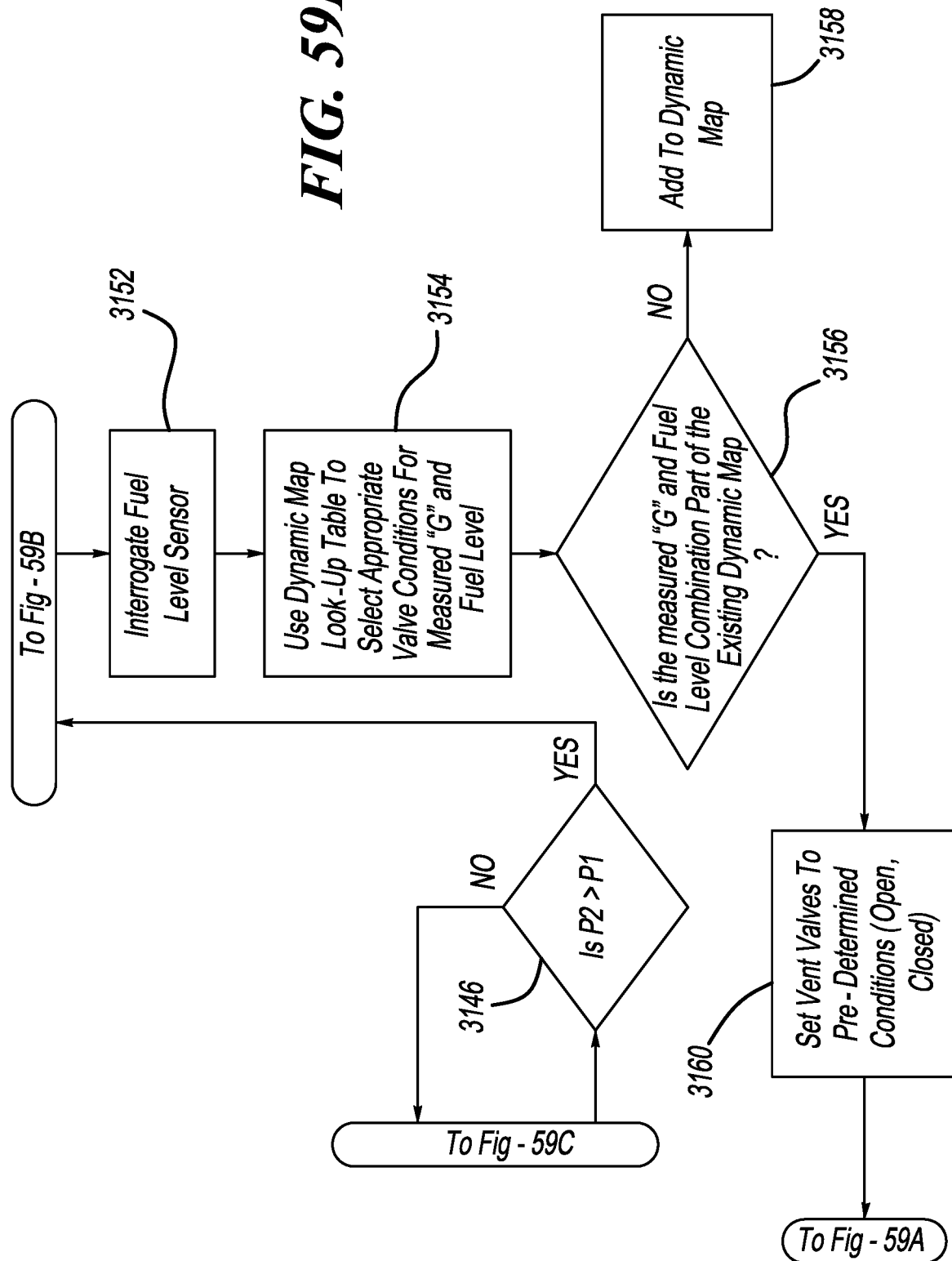
Figure 60:
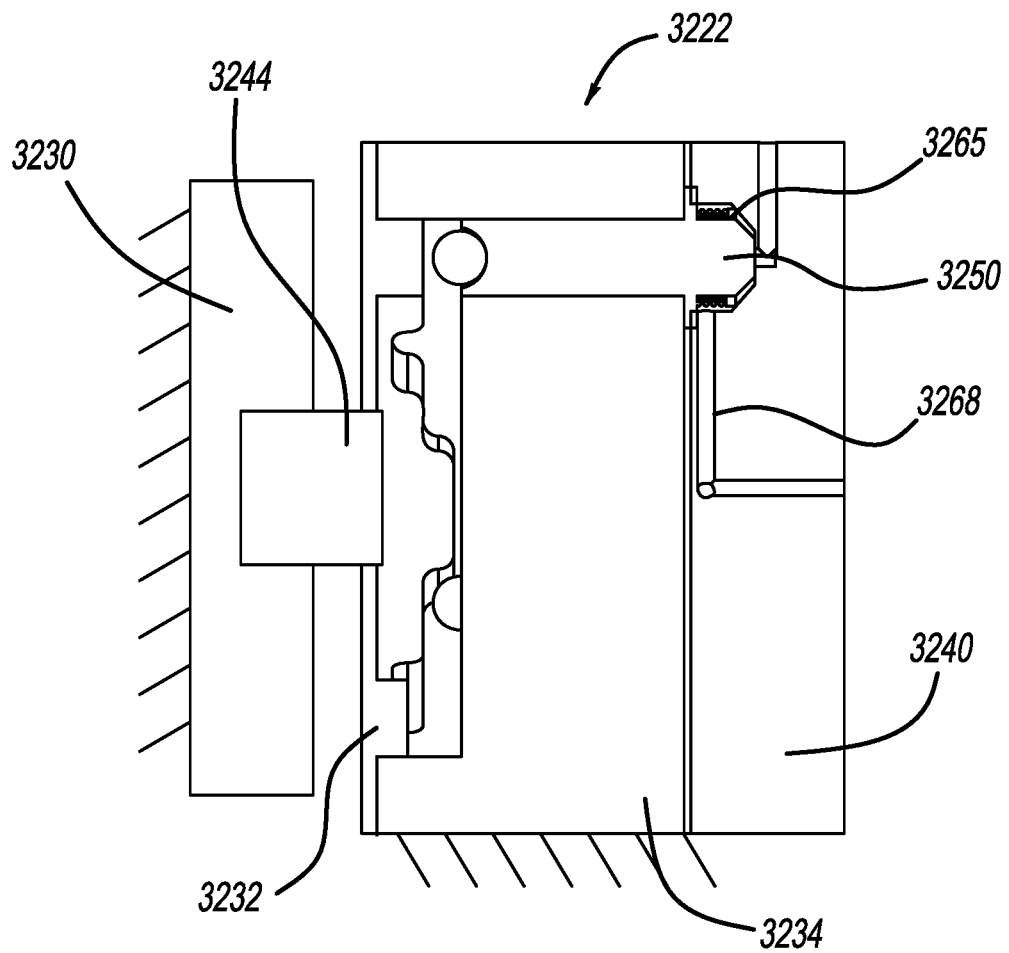
FIG. 60 is a sectional view of a vent shut-off assembly constructed in accordance to another example of the present disclosure.
Figure 63:
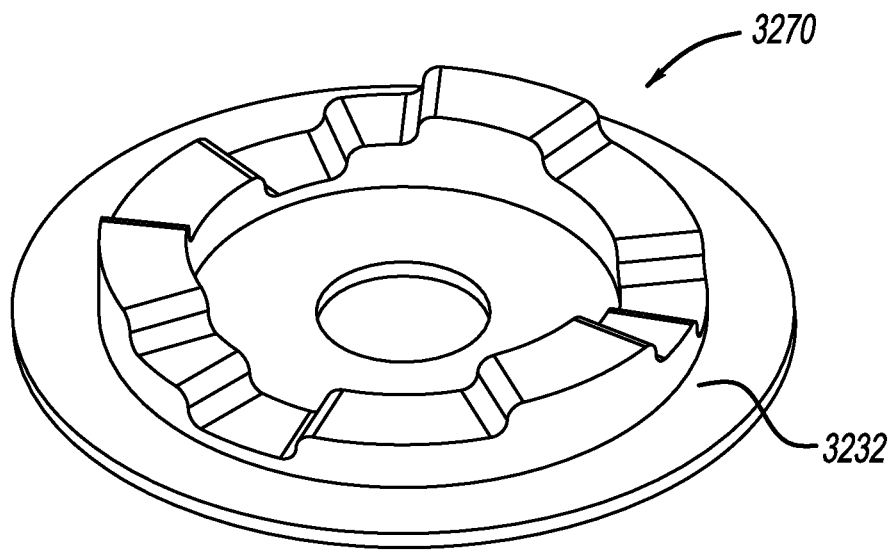
FIG. 63 is a top perspective view of the disk of FIG. 62.
Figure 61:
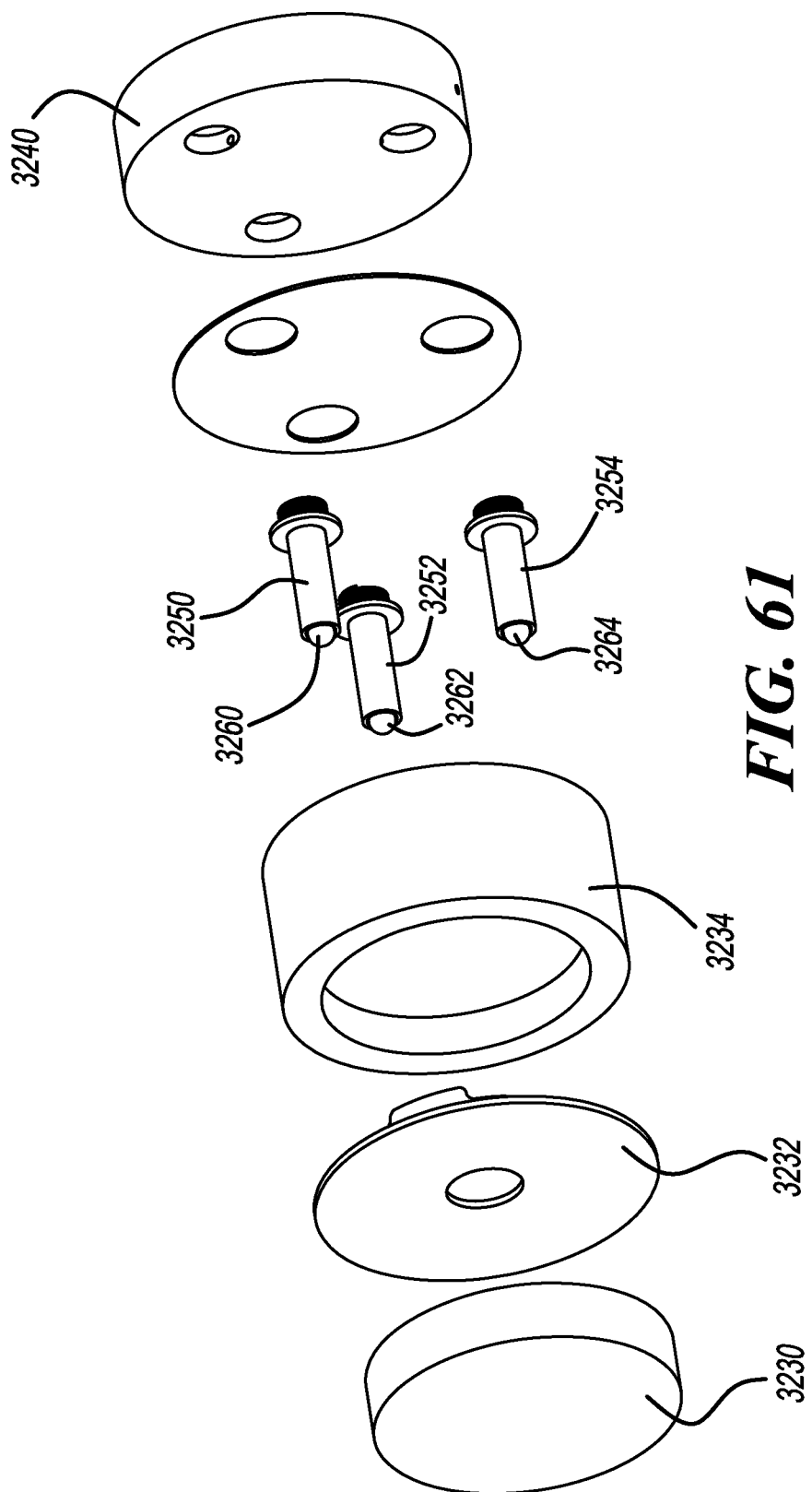
FIG. 61 is an exploded view of the vent shut-off assembly of FIG. 60.
Figure 62:
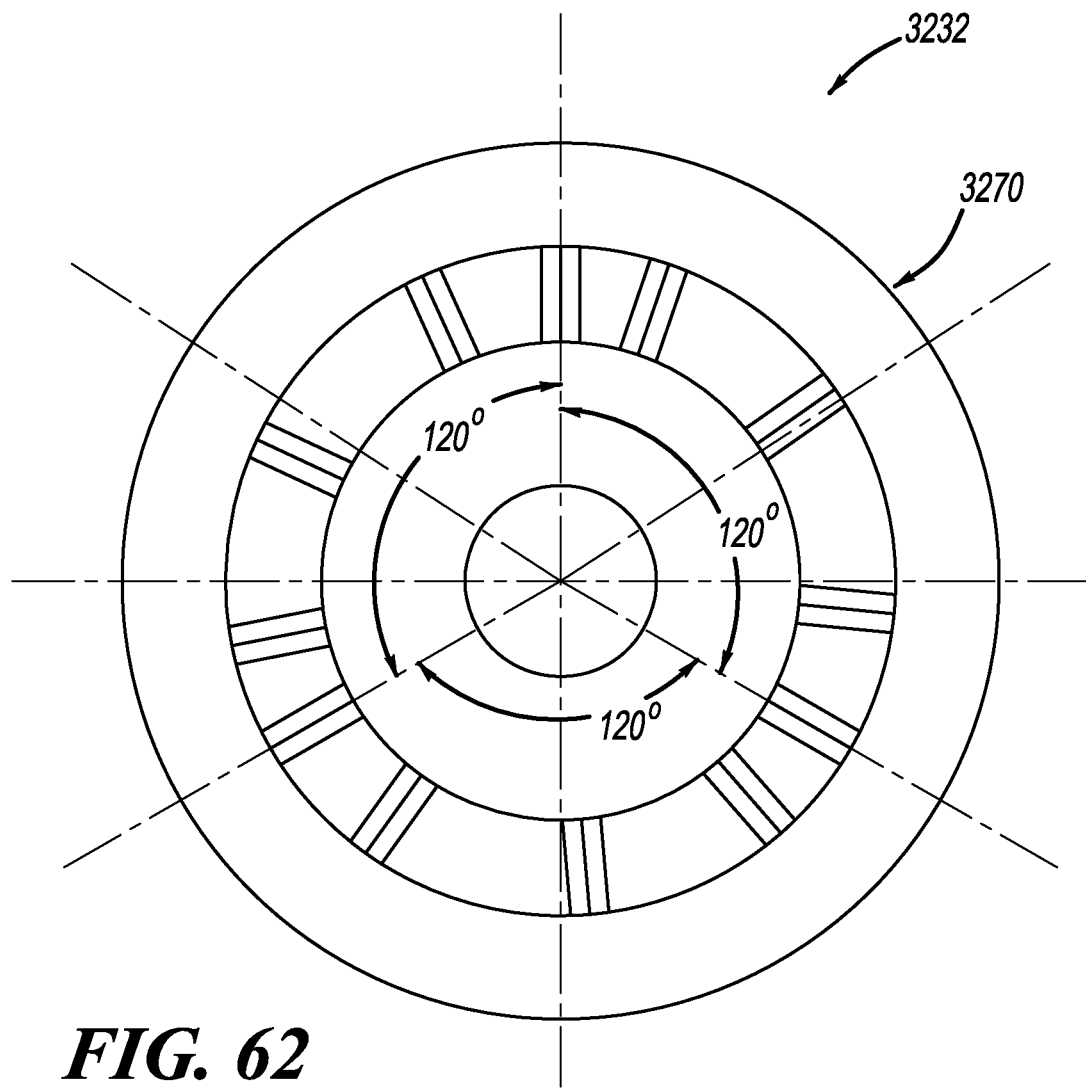
FIG. 62 is a top view of a disk of the vent shut-off assembly of FIG. 60.
Figure 64:
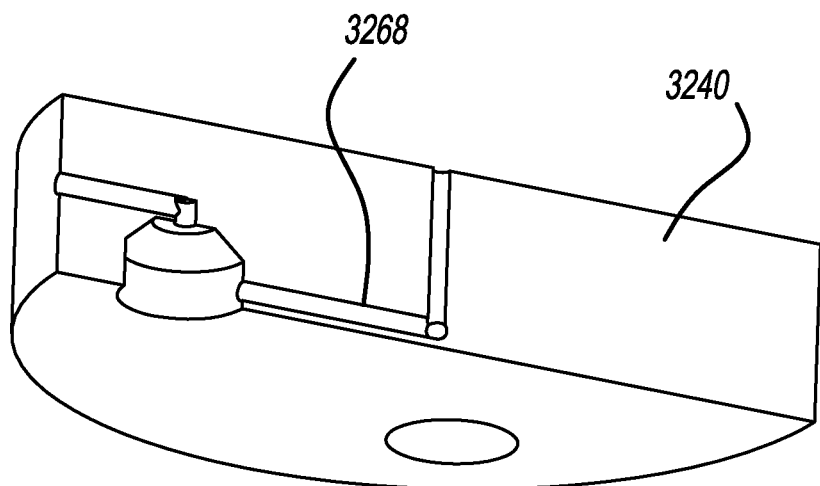
FIG. 64 is a partial sectional view of a manifold of the vent shut-off assembly of FIG. 60.

With reference now to FIGS. 56-58, a fuel tank system 3010 arranged on a fuel tank 3012 having an evaporative emissions control system 3020 constructed in accordance to additional features of the present disclosure will be described. Unless otherwise described, the fuel system 3010 and evaporative emissions control system 3020 can be constructed similarly to the evaporative emissions control system 1020 discussed above. The fuel tank system 3010 provides a mechanical shut-off that will prevent fuel tank overfilling in the case of power loss.

The evaporative emissions control system 3020 generally includes a vent shut-off assembly 3022 having a manifold assembly 3024. A liquid trap 3026 and pump 3028 can be arranged in the manifold assembly 3024. that routs to a first line 3040 having a first outlet 3042, a second vent line 3044 having a second outlet 3046, a third vent line 3048 having a third outlet 3050 and a fourth vent line 3052 that routs to a canister (see canister 1032). Baffles 3060, 3062 and 3064 can be arranged at the first, second and third outlets 3042, 3046 and 3050.

The baffle 3062 is a refueling baffle arranged in elevation lower than the first and third outlets 3042 and 3050. The refueling baffle 3062 includes a flow shut-off mechanism 3066 that moves from an open position to a closed position based on liquid fuel rising.

A baffle 3062A constructed in accordance to one example of the present disclosure is shown in FIG. 57. The baffle 3062A includes a baffle housing 3070 that defines windows 3072 therein. A cup 3074 is slidably received by the baffle housing 3070 and is configured to rise from the solid position shown in FIG. 57 to the phantom position shown in FIG. 57. In the solid position, vapor flow is permitted through the windows 3072 and through the second vent line 3044 to the liquid trap 3026. When fuel rises beyond a desired fuel fill level 3076A to a higher fuel fill level 3076B, the cup 3074 rises to the closed position shown in phantom where vapor flow is inhibited from passing through the windows 3072 and to the second vent line 3044 to the liquid trap 3026.

A baffle 3062B constructed in accordance to another example of the present disclosure is shown in FIG. 58. The baffle 3062B includes a baffle housing 3080 that defines windows 3082 therein. A cup 3084 is slidably mounted to the baffle housing 3080 and is configured to rise from the solid position shown in FIG. 58 to the phantom position shown in FIG. 58. In the solid position, vapor flow is permitted through the windows 3082 and through the second vent line 3044 to the liquid trap 3026. When fuel rises beyond a desired fuel fill level 3076A to a higher fuel fill level 3076B, the cup 3084 rises to the closed position shown in phantom where vapor flow is inhibited from passing through the windows 3082 and to the second vent line 3044 to the liquid trap 3026. A disk 3090 coupled to the cup 3084 can also rise to cover the opening of the baffle housing 3080 in the closed position.

With reference to FIG. 59A-59D, an example method 3100 of controlling a fuel tank system is described in reference to fuel tank system 1010. Method 3100 can enable the control module to learn and adapt from monitored conditions to optimize venting of the fuel tank system and maintain the fuel tank pressure and/or the trap liquid level at acceptable levels.

Method 3100 includes, at step 3102, initiating a venting system or evaporative emissions control 1020 and setting vent valves 1040, 1042 based on a dynamic map look-up table (e.g., a dynamic map holding conditions such as vent solenoid states, G-peak, G-avg., fuel tank pressure, bulk fuel tank temperature, and fuel level). At step 3104, control module 1030 checks for liquid in the liquid trap 1026, for example, by cycling the smart drain pump and comparing a "dry" and "wet" inducting signature "h". At step 3106, control module 1030 subsequently determines if liquid is present in the liquid trap 1026 and/or the jet pump. If liquid is not present, at step 3108, control module 1030 starts a liquid trap check timer.

At step 3110, control module 1030 maintains the initial settings of the vent valves 1040, 1042. At step 3112, control module 1030 monitors fuel tank pressure and, at step 3114, subsequently records fuel tank pressures P1 . . . Pn at a predetermined time intervals T1 . . . Tn. At step 3116, control module 1030 determines if a monitored pressure (e.g., P2) is greater than a previously monitored pressure (e.g., P1). If yes, control proceeds to step 3150 described below. If no, at step 3118, control module 1030 maintains the vent valves 1040, 1042 in the current position. At step 3120, control module 1030 determines if the liquid trap check time has exceeded a predetermined time (e.g., 20 seconds). If not, control returns to step 3118. If yes, control returns to step 3104.

If liquid is detected at step 3106, control moves to step 3122 or step 3124. At step 3122, control module 1030 activates the liquid trap jet pump and proceeds to step 3124 or 3126. At step 3126, control module 1030 monitors the inductive signature "h" of the jet pump. At step 3128, control module determines if liquid is present in the liquid trap based on the inductive signature "h". If liquid is present, control module 1030 continues to operate the jet pump at step 3130. Control then returns to step 3128. If liquid is not present, control proceeds to step 3132.

At step 3132, control module 1030 deactivates jet pump and the pumping event timer. At step 3134, control module 1030 calculates and stores a new ΔT indicative of how long the pump was operated. At step 3136, control module 1030 determines if the new ΔT is greater than a previous ΔT (e.g., "old ΔT"). If no, at step 3138, control module 1030 maintains the vent valves 1040, 1042 in the current position and may subsequently return to step 3104. If yes, at step 3140, control module 1030 closes all vent valves.

At step 3142, control module 1030 monitors pressure in the fuel tank 1012 and proceeds to step 3144, subsequently records fuel tank pressures P1 . . . Pn at a predetermined time intervals T1 . . . Tn. At step 3146, control module 1030 determines if a monitored pressure (e.g., P2) is greater than a previously monitored pressure (e.g., P1). If no, at step 3148, control module 1030 maintains the vent valves 1040, 1042 in the current position. If yes, control proceeds to step 3150.

Returning to step 3150, control module 1030 monitors G-sensor 1060E and determined G-peak and G-avg over a predetermined time (e.g., five seconds). In step 3150, the control module 1030 determines the average "G" force applied to the system and records the G-peak. At step 3152, control module 1030 interrogates the fuel level sensor 1048.

At step 3154, control module 1030 uses a dynamic map look-up table to select appropriate valve conditions for the measured "G" and fuel level. At step 3156, control module 1030 determines if the captured system states are within predetermined limits. If no, control proceeds to step 3158. If yes, at step 3160, control module 1030 sets the vent valves to predetermined conditions at step 3160. If not, the control module 1030 adds to a dynamic map.

Figure 8:
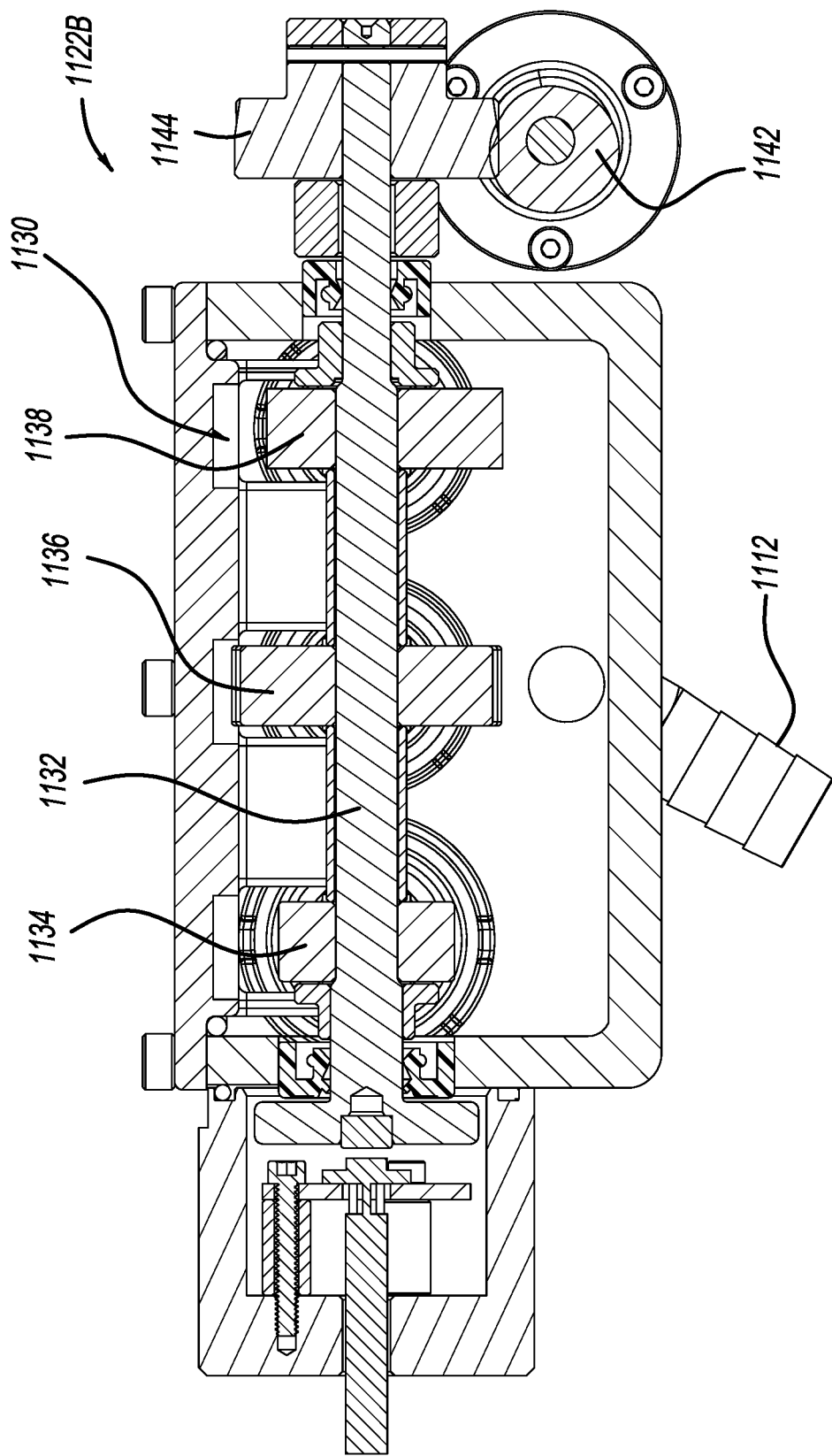
FIG. 8 is a sectional view of the vent shut-off assembly of FIG. 6 taken along lines 8-8.
Figure 9:
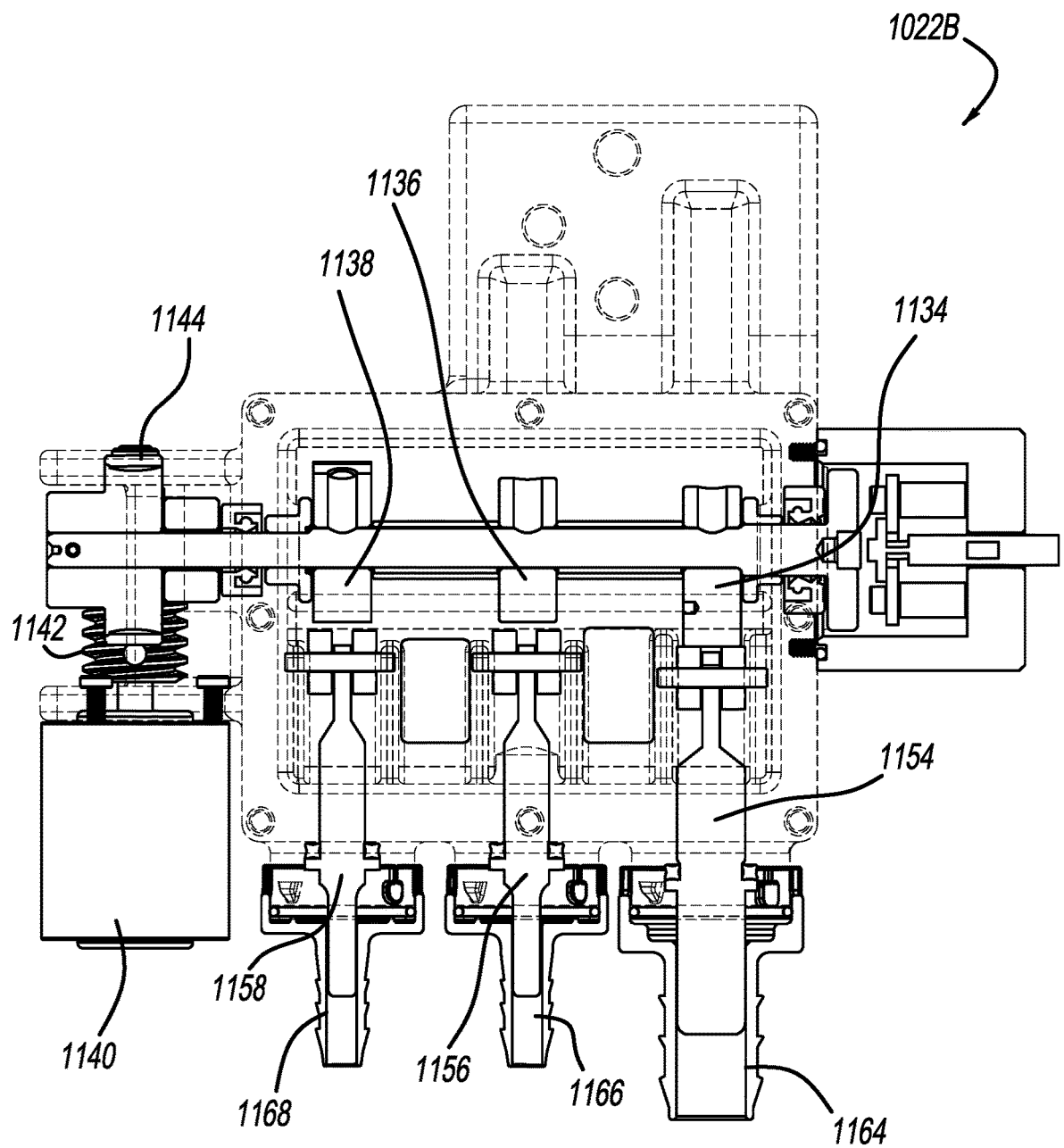
FIG. 9 is a sectional view of the vent shut-off assembly of FIG. 6 taken along lines 9-9.
Figure 10:
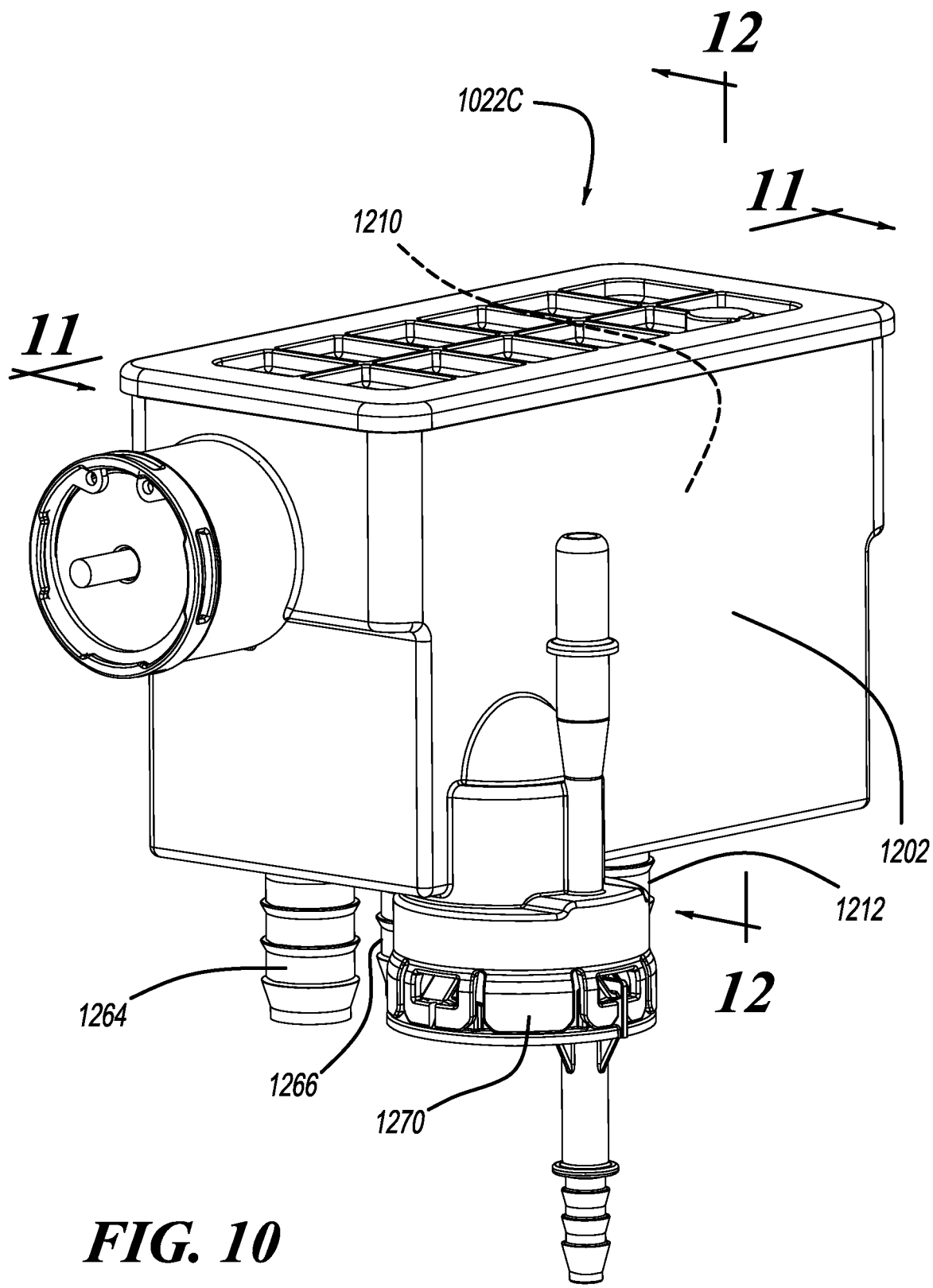
FIG. 10 is a front perspective view of a vent shut-off assembly constructed in accordance to another example of the present disclosure.
Figure 11:
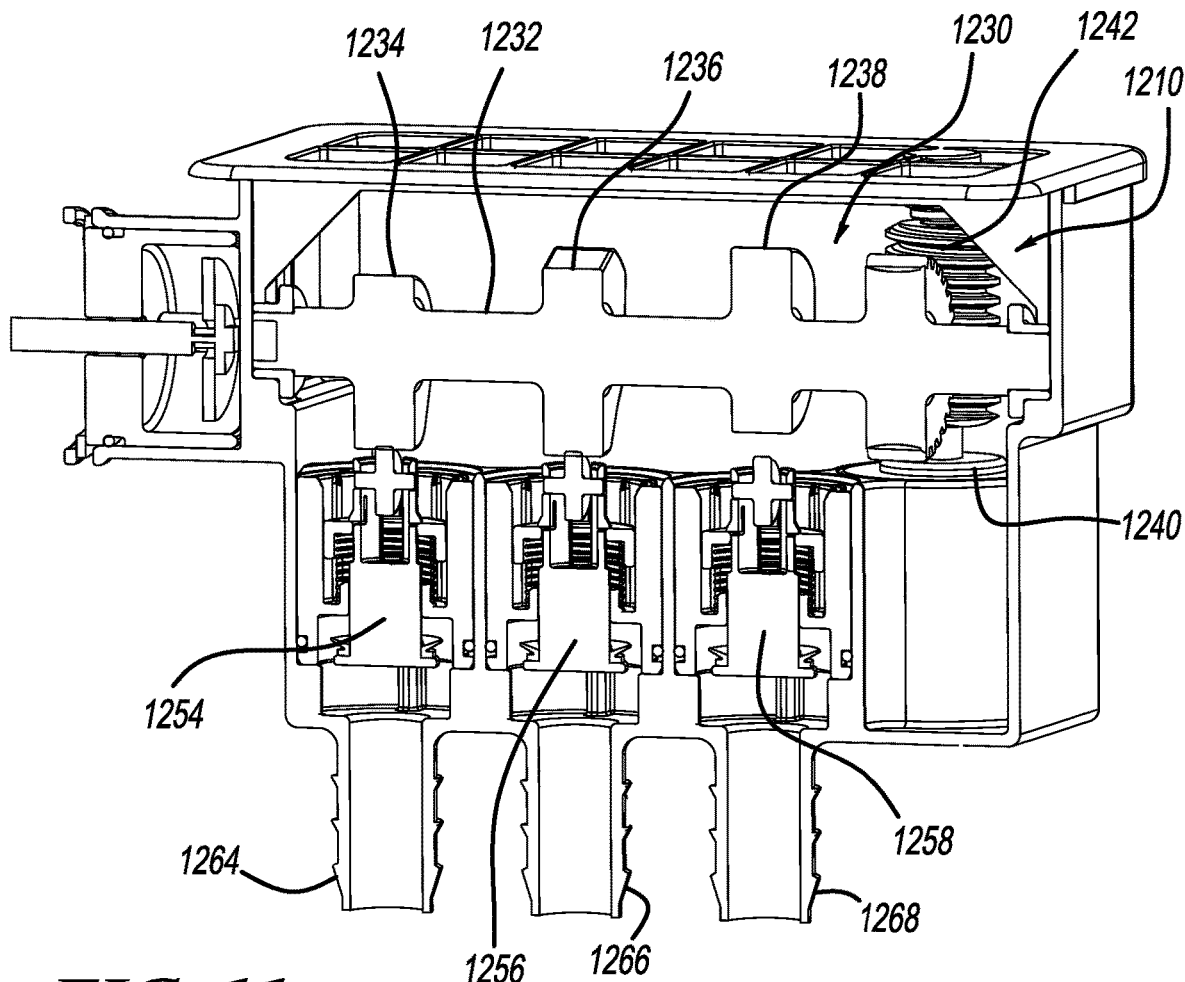
FIG. 11 is a sectional view of the vent shut-off assembly of FIG. 10 taken along lines 11-11.
Figure 12:
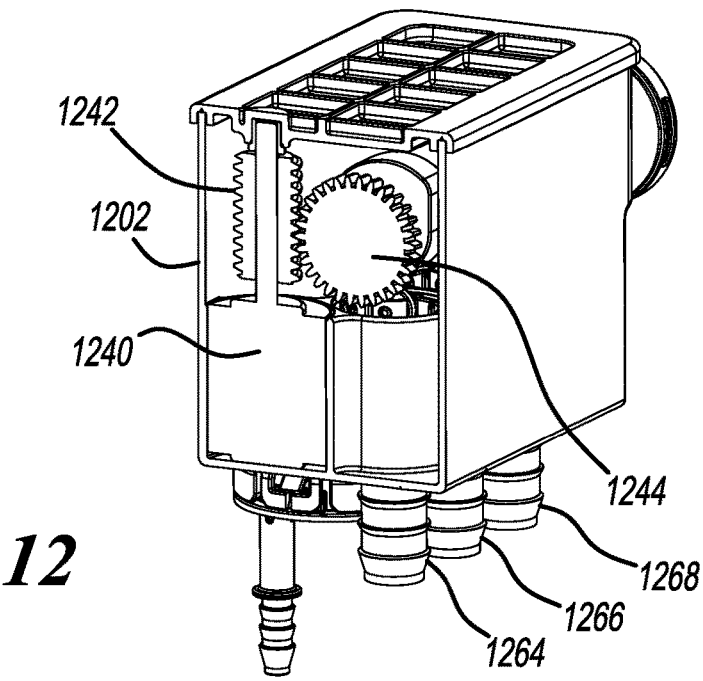
FIG. 12 is a sectional view of the vent shut-off assembly of FIG. 10 taken along lines 12-12.
Figure 13:
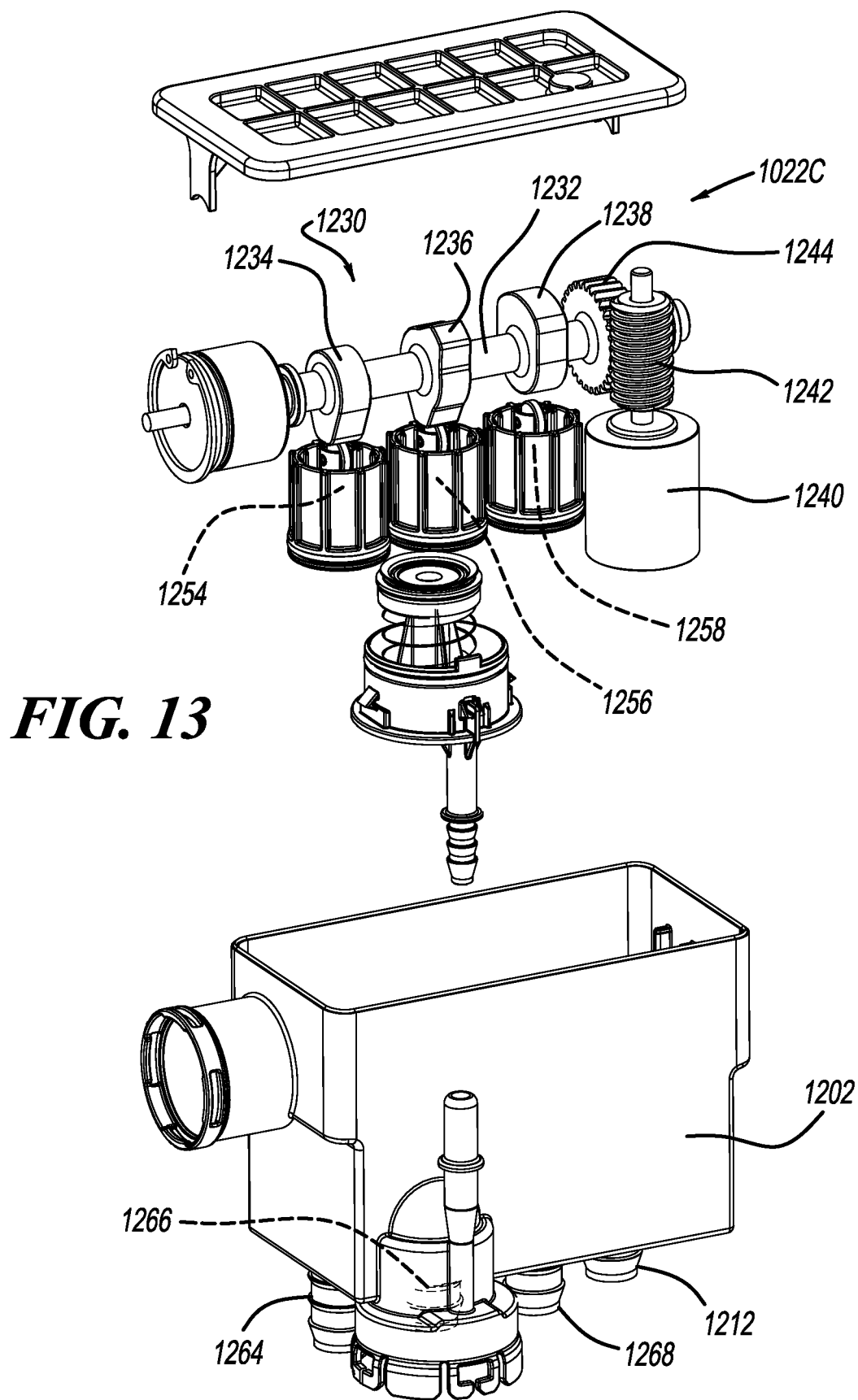
FIG. 13 is an exploded view of the vent shut-off assembly of FIG. 10.
Figure 14:
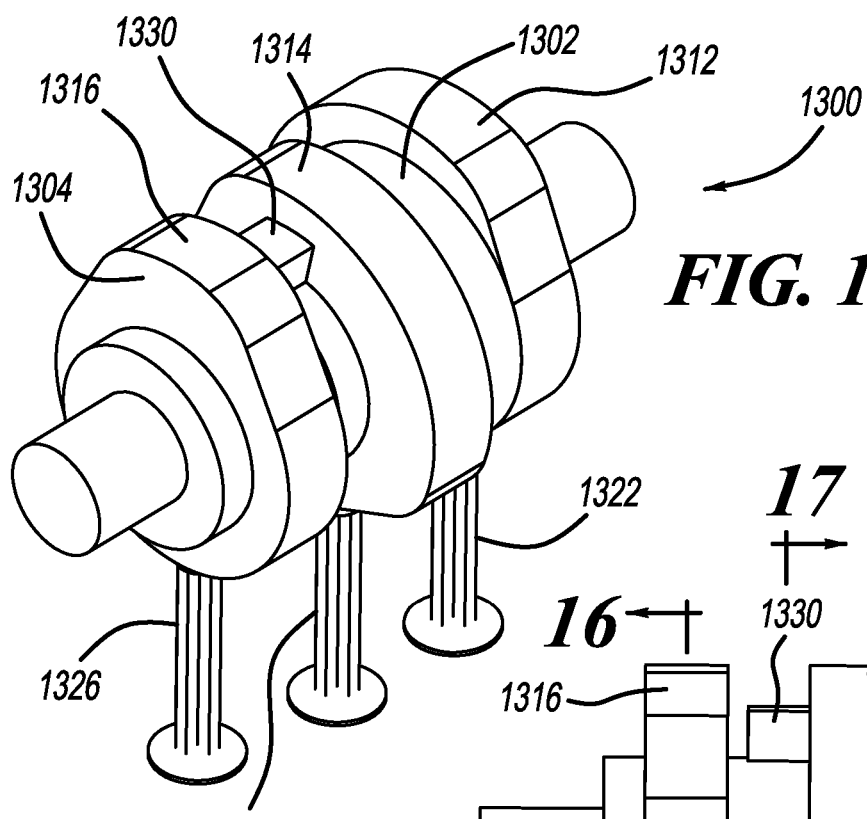
FIG. 14 is a front perspective view of a vent shut-off assembly constructed in accordance to another example of the present disclosure.
Figure 15:
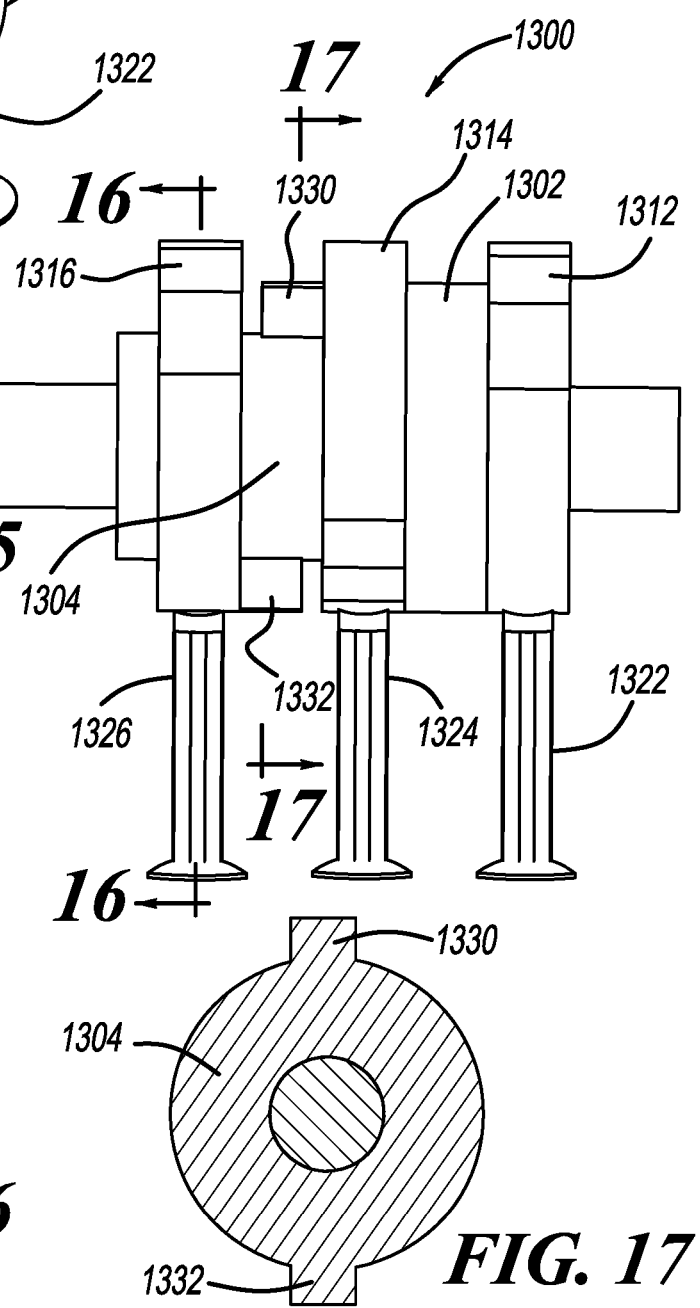
FIG. 15 is a front view of the vent shut-off assembly of FIG. 14.
Figure 16:
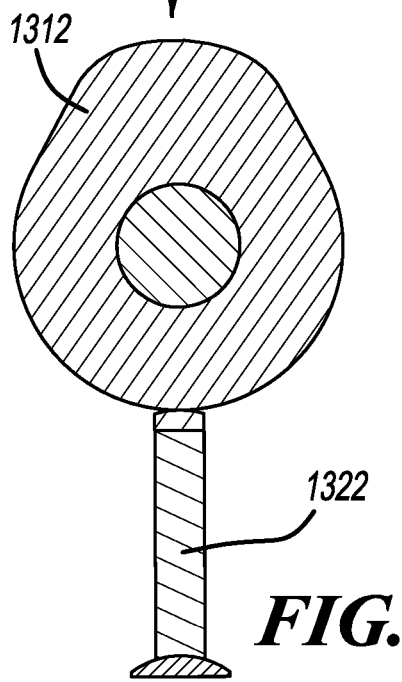
FIG. 16 is a sectional view of the vent shut-off assembly of FIG. 15 taken along lines 16-16.
Figure 17:
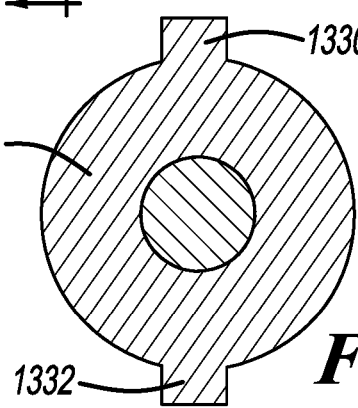
FIG. 17 is a sectional view of the vent shut-off assembly of FIG. 15 taken along lines 17-17.

Returning to FIG. 1, the energy storage device 1034 can include a capacitor, battery, pre-loaded valve or other device. The energy storage device 1034 can be connected to the vent shut-off assembly 1022 for providing power to the associated actuator (solenoids, motor etc.) in the event of power loss. The energy storage device 1034 has sufficient power to rotate the cam assembly 1130 (see FIG. 8) plus have logic that confirms the orientation of the shaft 1132. One example includes reading an encoder or accessing a last recorded angle from memory. Other examples are contemplated. The actuator assembly 1110 will rotate the shaft 1132 to a designated angle where the system will remain until power is restored. If the system is able to access current or recent accelerometer data and or fill volumes, the information can be used to define the state to rotate to. In other examples there may be a universal default state.

Exemplary fault states will now be described. If the accelerometer 1060E identifies the vehicle is upside down, all valves are rotated closed. If the accelerometer 1060E identifies a potential front end collision, valves associated with the front of the fuel tank are closed while valve associated with the rear of the fuel tank are open. If the accelerometer 1060E identifies the vehicle is at rest or cruise and the fuel volume is half-full, the actuator assembly 1110 rotates the shaft 1132 to open the first and second valves.

With reference now to FIGS. 60-64, a vent shut-off assembly 3222 constructed in accordance to another example of the present disclosure will be described. The vent shut-off assembly 3222 can be used with any of the actuator assemblies described herein for opening and closing various vent ports. In the example shown, the vent shut-off assembly 3222 includes an actuator assembly 3230, a cam disk 3232, a follower guide 3234 and a manifold 3240. In the example shown, the actuator assembly 3230 includes a rotary solenoid or stepper motor. The disk 3232 is mounted on an output shaft 3244 of the actuator assembly 3230.

First, second and third poppet valves 3250, 3252 and 3254 are arranged for translation along respective bores defined in the follower guide 3234. Each of the first, second and third poppet valves 3250, 3252 and 3254 have a cam follower 3260, 3262 and 3264, respectively at a terminal end thereof and an overmold rubber seal (identified at 3265) at an opposite end. The manifold 3240 defines various fluid paths such as fluid path 3268 to vent the fuel tank to various vents in the fuel tank such as described herein.

The cam plate 3232 includes a cam profile 3270 that includes various peaks and valleys. When the cam plate 3232 is rotated by the actuation assembly 3230, the cam profile 3270 engages the respective cam followers 3260, 3262 and 3264 and urges the respective first, second and third poppet valves 3250, 3252 and 3254 open and closed.

Figure 65:
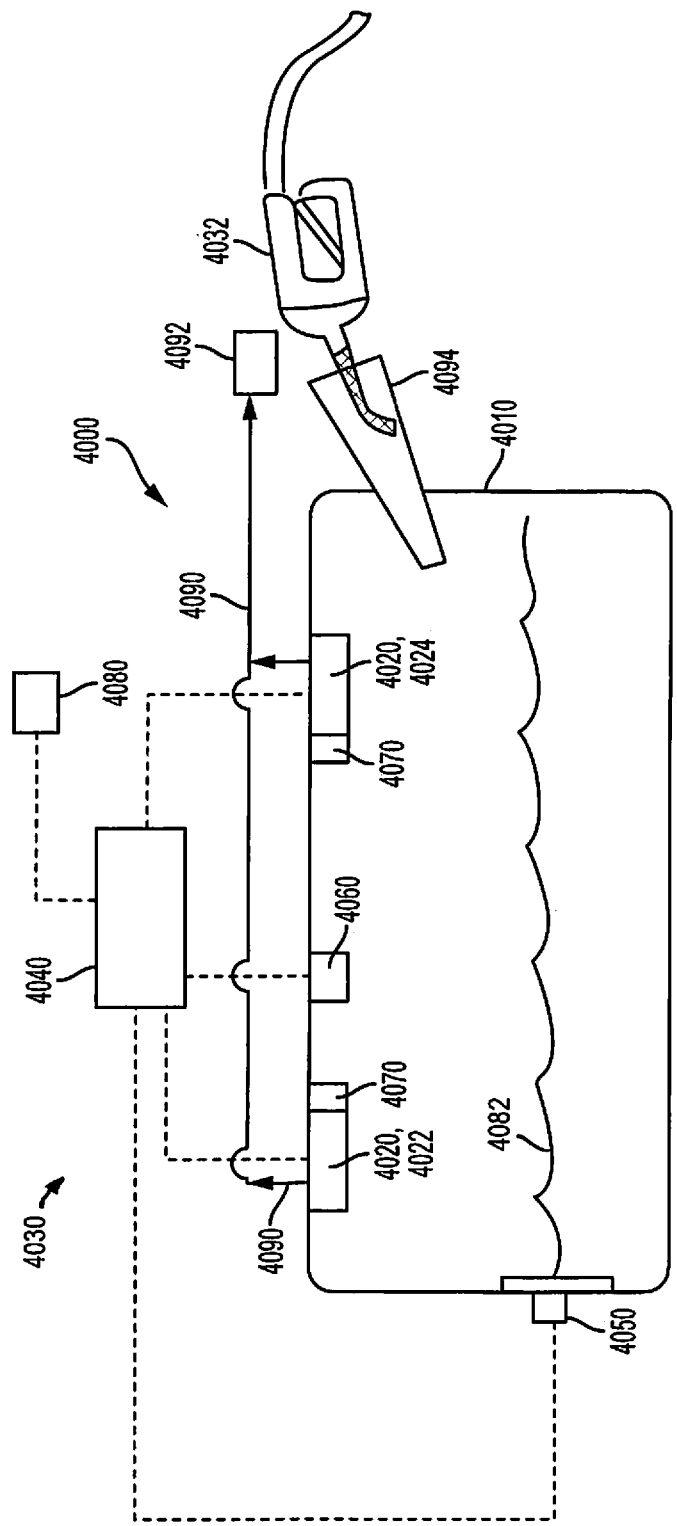
FIG. 65 is a schematic illustration of a fuel tank system in accordance to one example of the present disclosure.

FIG. 65 illustrates a fuel tank system 4000 constructed in accordance to another example of the present disclosure that can be similar to fuel tank systems described herein. Fuel tank system 4000 generally includes a fuel tank 4010 having at least one vent valve 4020. Each vent valve 4020 is an electronically controlled vent valve such as a solenoid vent valve or motor/cam-shaft operated vent valve similar to those describe herein. For example, the opening and closing of vent valves 4020 is electronically controlled via a controller 4040. Each vent valve 4020 is associated with an electronically controlled evaporative emissions control system 4030 which includes controller 4040. As used herein, the term controller refers to an application specific integrated circuit (ASIC), an electronic circuit, a processor (shared, dedicated, or group) and memory that executes one or more software or firmware programs, a combinational logic circuit, and/or other suitable components that provide the described functionality.

In the example embodiment, controller 4040 is in signal communication with each vent valve 4020 as well as a fuel level sensor 4050, a pressure sensor 4060, a valve position sensor 4070, and an accelerometer or G-sensor 4080. The fuel level sensor 4050 is configured to determine or indicate a level of fuel within fuel tank 4010 and may be similar to other fuel level sensors described herein, such as fuel level sensor 1048. Pressure sensor 4060 is configured to sense a pressure in the fuel tank 4010 and may be similar to other pressure sensors described herein, such as pressure sensor 1060A. Valve position sensor 4070 is configured to determine a position of each vent valve 4020 between a fully open and closed position. Accelerometer 4080 is configured to measure an acceleration of the vehicle or fuel tank 4010 and may be similar to other G-sensors described herein, such as G-sensor 1060E.

In the example embodiment, fuel tank system 4000 includes a specific control strategy for refueling events. In one example, during a refueling event, controller 4040 is configured to selectively open and close each vent valve 4020 based on measurements or signals from fuel level sensor 4050, pressure sensor 4060, valve position sensor 4070, and/or accelerometer 4080. In this way, fuel tank system 4000 utilizes predictive control to control vent valves 4020 during refueling events rather than relying on a passive response associated with known mechanically controlled vent valves.

Figure 66:
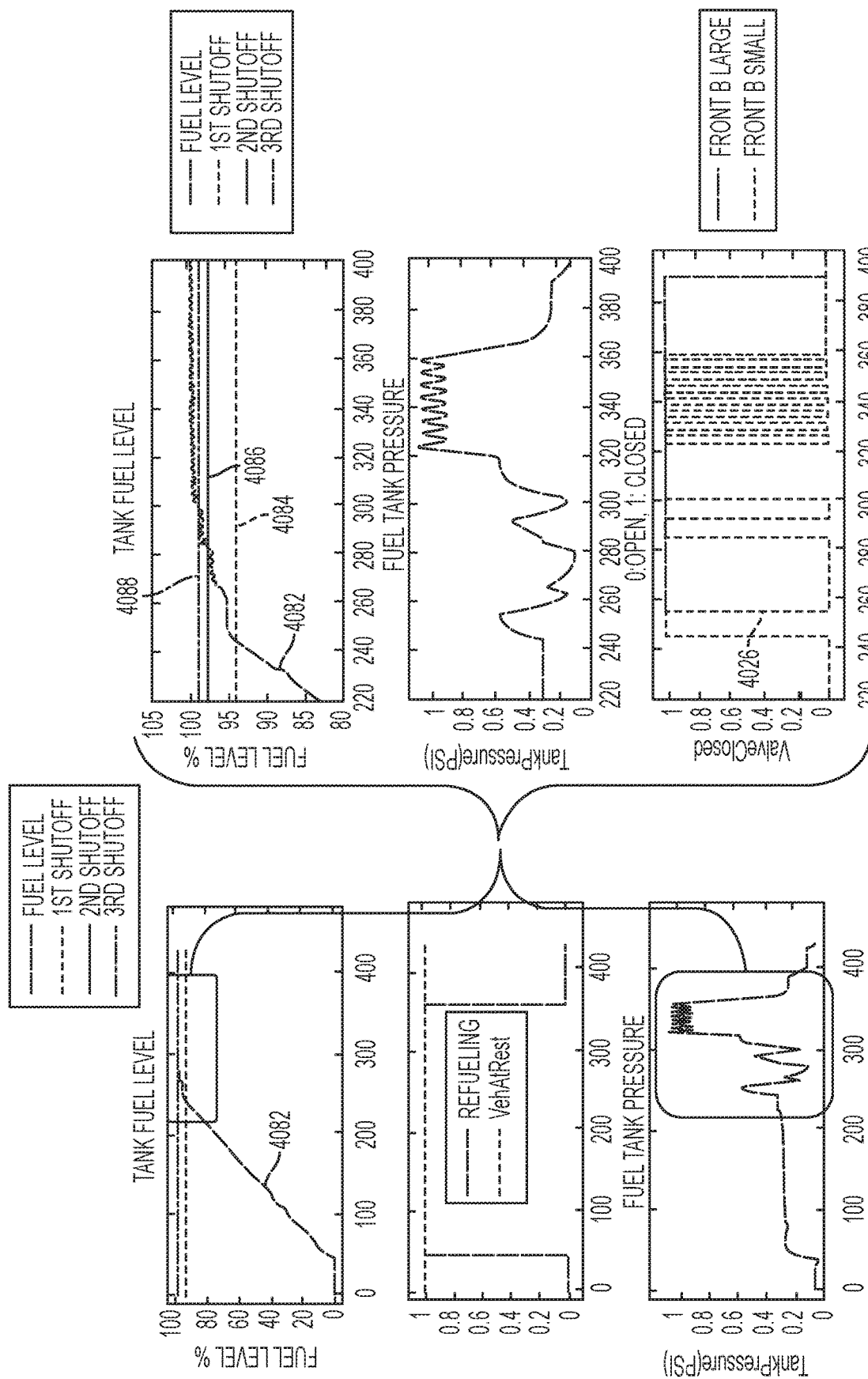
FIG. 66 illustrates various graphs related to operation of the fuel tank system shown in FIG. 65 during a refueling event.

In the example embodiment, controller 4040 determines if the vehicle is stopped based on measurements from accelerometer 4080, and monitors fuel level sensor 4050 and pressure sensor 4060. As shown in FIG. 66, as the fuel level (line 4082) increases during refueling, the pressure in the fuel tank 4010 begins to increase. When controller 4040 determines the vehicle is stopped, and the fuel level and pressure in the fuel tank 4010 are increasing, the controller 4040 recognizes this as a refueling event. Controller 4040 then operates the electronically controlled vent valves 4020 to provide smooth refueling and prevent premature shut-offs, as described herein in more detail.

In the example embodiment, when controller 4040 determines a refueling event is occurring, controller 4040 opens vent valves 4020 to allow fuel vapor and air to enter vapor vent lines 4090 and travel to charcoal canister 4092, which allows liquid fuel to continue to travel through filler neck 4094 into fuel tank 4010 (see FIG. 65). Once the fuel level sensor 4050 indicates the level of fuel has exceeded a predetermined level (e.g., 94% fill), controller 4040 can close the vent valves 4020.

In addition to the described control algorithm, controller 4040 may also utilize past measurements from fuel level sensor 4050, pressure sensor 4060, and/or accelerometer 4080 to facilitate preventing false detection of a refueling event. Accordingly, controller 4040 can learn to identify false refueling events by monitoring vehicle parameters. For example, controller 4040 can identify if the vehicle is driving on a bumpy hill on a hot day at a constant speed (no acceleration), which could falsely register that the vehicle is at rest and the fuel level and tank pressure are increasing.

Figure 67A:
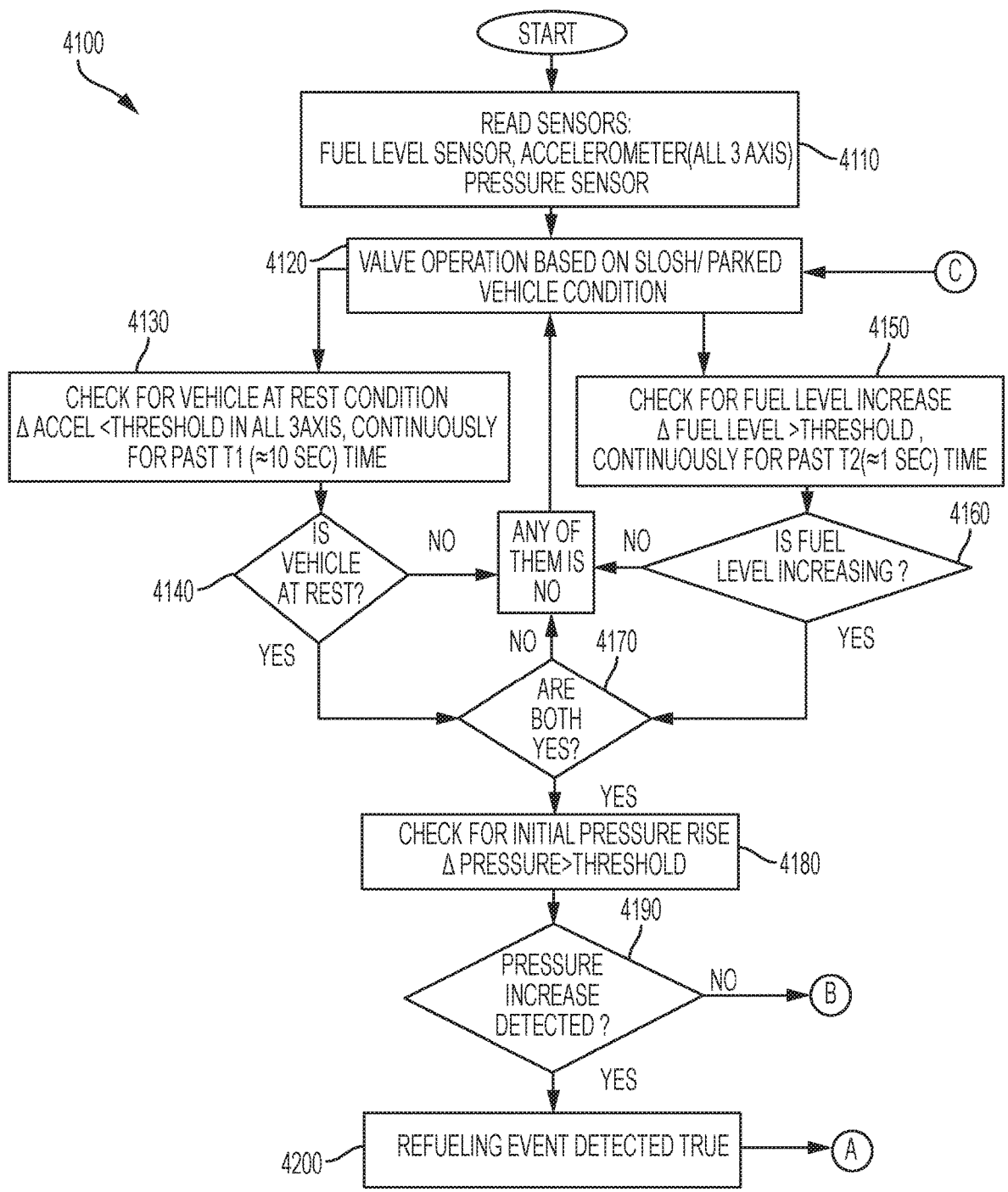
FIGS. 67A and 67B illustrate an exemplary control diagram for the fuel tank system shown in FIG. 65 during vehicle refueling according to various examples of the present disclosure.
Figure 67B:
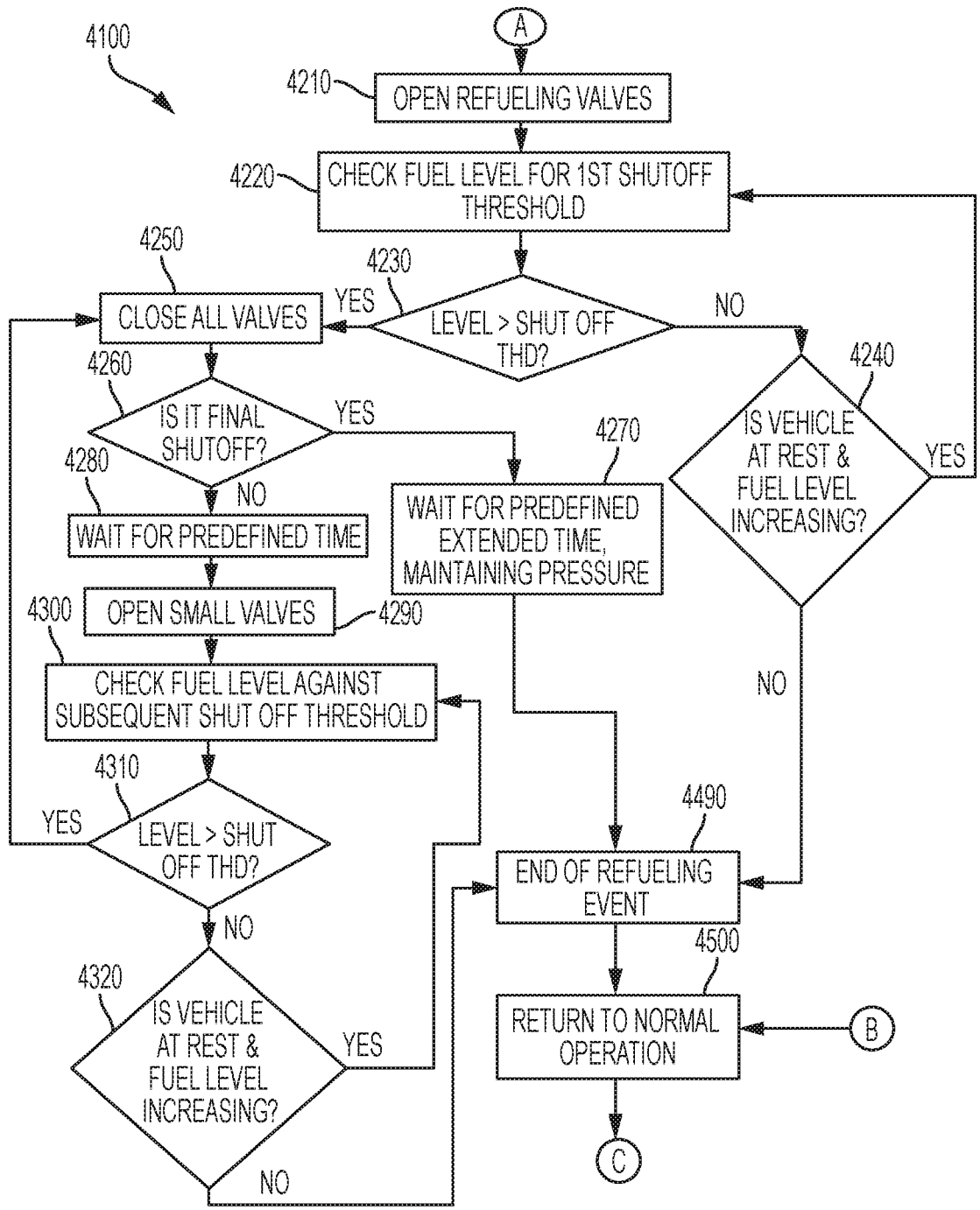

With further reference to FIGS. 67A and 68B, an example method 4100 of controlling an evaporative emissions control system begins at step 4110 where controller 4040 monitors fuel level sensor 4050, pressure sensor 4060, and accelerometer 4080. At step 4120, controller operates vent valves 4020 based on a determination of whether the vehicle is moving (slosh condition) or parked (parked condition). One example system operation during dynamic operation (slosh condition) is described in commonly owned co-pending U.S. patent application Ser. No. 15/468,739, the contents of which are incorporated herein by reference.

At step 4130, controller 4040 monitors accelerometer 4080 over a predetermined period of time to determine if a delta acceleration is less than a predetermined threshold. At step 4140, controller 4040 determines if the vehicle is not moving or is at rest based on the measurements from step 4130. If it is determined the vehicle is not at rest, control returns to step 4120. If it is determined the vehicle is at rest, control proceeds to step 4170.

At step 4150, controller monitors fuel level sensor 4050 over a predetermined period of time to determine if a delta fuel level is greater than a predetermined threshold. At step 4160, controller 4040 determines if the fuel level is increasing in the fuel tank 4010 based on the measurements from step 4150. If it is determined the fuel level is not rising, control returns to step 4120. If it is determined the fuel level is rising, control proceeds to step 4170.

At step 4170, controller 4040 determines if both the vehicle is at rest and if the fuel level in the fuel tank 4010 is increasing. If no, control returns to step 4120. If yes, control proceeds to step 4180 where controller 4040 monitors the pressure sensor 4060 over a predetermined period of time to determine if a delta pressure is greater than a predetermined threshold. At step 4190, controller 4040 determines if the pressure is increasing in the fuel tank 4010 based on the measurements from step 4180. If it is determined the tank pressure is not increasing, control proceeds to step 4500 (FIG. 3B) and returns to normal operation. If it is determined the tank pressure is increasing, at step 4200, controller 4040 determines a refueling event is occurring and proceeds to step 4210.

At step 4210 (FIG. 3B), controller 4040 opens one or more of the electronically controlled vent valves 4020. In one example, a set of larger orifice refueling vent valves 4022 (FIG. 65) are opened. At step 4220, controller 4040 monitors fuel level sensor 4050. At step 4230, controller 4040 determines if the fuel level measured in step 4220 has reached or exceeded a predetermined first shutoff level threshold (e.g., see FIG. 66, line 4084). If no, at step 4240, controller 4040 determines if the vehicle is at rest and if the fuel level is increasing based on measurements from fuel level sensor 4050 and accelerometer 4080. If yes, control returns to step 4220. If no, control proceeds to step 4490 and controller 4040 determines it is the end of the refueling event. Control then proceeds to step 4500.

If at step 4230 controller determines the measured fuel level is greater than the first shutoff level predetermined threshold, control proceeds to step 4250 and controller 4040 closes all vent valves 4020. This can result in any subsequent refueling increasing the pressure in fuel tank 4010, thereby causing a fuel pump nozzle 4032 (FIG. 65) to shut off.

At step 4260, controller 4040 determines if the predetermined first shutoff level threshold is a final shutoff (e.g., as determined by a preset condition) such that supplying additional fuel to the fuel tank 4010 is undesirable. However, multiple shutoff levels may be desirable, for example, to enable trickle filling of the fuel tank 4010. It will be appreciated that the number of threshold levels and their shutoff values may be predetermined by various factors such as manufacturing specifications, desired performance, safety standards, etc.

If the first shutoff level threshold is the final shutoff level, control proceeds to 4270, and controller 4040 subsequently operates vent valves 4020 to maintain pressure in the fuel tank 4010 for a predetermined amount of time before signaling the end of the refueling event at step 4490. If it is not the final shut off level, control proceeds to step 4280.

At step 4280, controller 4040 waits for a predetermined time (e.g., 10 seconds) and then proceeds to step 4290 where controller 4040 opens one or more vent valves 4020. In one example, a set of small orifice vent valves 4024 (FIG. 65) is opened which can allow a limited amount of fuel to subsequently enter fuel tank 4010 without shutting off the fuel pump nozzle 4032.

At step 4300, controller 4040 monitors the fuel level sensor 4050. At step 4310, controller 4040 determines if the fuel level measured in step 4300 meets or exceeds a subsequent predetermined shutoff level threshold. For example, as shown in FIG. 66, the system may include a $2^{nd}$ shutoff level threshold (line 4086) and a $3^{rd}$ shutoff level threshold (line 4088). If the increased fuel level exceeds the subsequent fuel shutoff level, control returns to step 4250. If the increased fuel level does not exceed the subsequent fuel shutoff level, control proceeds to step 4320 where the system can return to normal operation.

At step 4320, controller determines if the vehicle is at rest and if the fuel level is increasing in the fuel tank 4010 based on measurements from fuel level sensor 4050 and accelerometer 4080. If yes, control returns to step 4300. If no, control proceeds to step 4490 and signals the end of the refueling event.

As such, controller 4040 includes a fill or refueling algorithm for customization of a trickle fill based on a desired profile. For example, a desired profile can define one or more fuel heights for the predetermined shutoff level threshold(s). The fuel level sensor 4050 is utilized to determine the fuel volume in the tank and thus a percent fill. At the desired predetermined fill level, one or more vent valves 4020 are closed, resulting in a pressure buildup that causes a fuel pump nozzle to shut off. If the desired profile is to allow for trickle fill, controller 4040 subsequently opens one or more of the vent valves 4020 after a predetermined time to allow fuel tank filling to resume. Once the next fill level is reached (e.g., $2^{nd}$ shutoff level threshold 4086), controller 4040 shuts one or more vent valves 4020, again resulting in a pressure buildup that causes the fuel pump nozzle to shut off. This can be continued for one or more trickle fills (or "clicks") as determined in the desired profile.

In a case where the predetermined time the vent valves 4020 are closed (either in between trickle fills or after the final fill) is sufficiently long to cause the fuel tank pressure to build above a predetermined threshold, controller 4040 can "pulse" one or more vent valves 4020 open and closed via dithering, pulse width modulation, or other method, as shown by line 4026 in FIG. 66. The allows the fuel tank pressure to remain at or below a predetermined level while also preventing further volume to be added via fill. Such modulation can continue until the vehicle is no longer at rest, or controller 4040 receives a signal indicating the refuel event has ended.

Described herein are systems and methods for controlling electronically controlled vent valves during a vehicle refueling event. The system monitors a vehicle accelerometer, a fuel tank level sensor, and a fuel tank pressure sensor to determine if the vehicle is undergoing a refueling event. The system then automatically closes the vent valves once the fuel level exceeds a predetermined shutoff level. Moreover, the system may include additional shutoff levels that that enable additional refueling. The valve closings cause the fuel tank pressure to increase, which causes a fuel pump nozzle to shut off the supply of fuel to the fuel tank. This prevents liquid fuel from passing the vent valves and reaching other parts of the fuel tank system. Accordingly, rather than relying on vent valves that only provide passive responses to detected liquid fuel, the described control strategy enables predictive control to prevent liquid fuel from leaving the fuel tank.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. An evaporative emissions control system operably associated with a vehicle fuel tank and configured to recapture and recycle fuel vapor emitted from the fuel tank, the evaporative emissions control system comprising:

a first vent valve configured to selectively open and close a first vent;

a fuel level sensor configured to sense a fuel level in the fuel tank;
a pressure sensor configured to sense a pressure in the fuel tank;
an accelerometer configured to measure an acceleration of the vehicle; and
a controller configured to regulate operation of the first vent valve to provide pressure relief for the fuel tank, the controller programmed to:
determine if a fuel level in the fuel tank is increasing based on a first signal from the fuel level sensor;
determine if a pressure in the fuel tank is increasing based on a second signal from the pressure sensor;
determine if the vehicle is not moving based on a third signal from the accelerometer;
determine a refueling event is occurring if the first signal indicates the fuel level is increasing, the second signal indicates pressure in the fuel tank is increasing, and the third signal indicates the vehicle is not moving; and
open the first vent valve based on determining the refueling event is occurring.

2. The system of claim 1, wherein the controller is further programmed to:
determine if the fuel level in the fuel tank has exceeded a predetermined shutoff level threshold based on a fourth signal from the fuel level sensor; and
close the first vent valve if the determined fuel level exceeds the predetermined shutoff level threshold.

3. The system of claim 1, further comprising:
a second vent valve configured to selectively open and close a second vent.

4. The system of claim 3, wherein the controller is further programmed to:
open at least one of the first and second vent valves after a predetermined amount of time has elapsed since closing the first and second vent valves to enable further refueling; and
determine if the fuel level in the fuel tank has exceeded a second predetermined shutoff level threshold based on a fifth signal from the fuel level sensor.

5. The system of claim 4, wherein the controller is further programmed to close the first and second vent valves if the determined fuel level exceeds the second predetermined shutoff level threshold.

6. The system of claim 5, wherein the controller is further programmed to:
open at least one of the first and second vent valves after a second predetermined amount of time has elapsed since closing the first and second vent valves to enable further refueling; and
determine if the fuel level in the fuel tank has exceeded a third predetermined shutoff level threshold based on a sixth signal from the fuel level sensor.

7. The system of claim 6, wherein the controller is further programmed to close the first and second vent valves if the determined fuel level exceeds the third predetermined shutoff level threshold.

8. The system of claim 1, wherein the fuel level sensor is a float level sensor.

9. The system of claim 3, further comprising:
a cam assembly operably associated with the first and second vent valves, the cam assembly having a cam shaft that includes a first cam and a second cam.

10. The system of claim 9, wherein the first and second cams have respective profiles that correspond to at least a fully opened valve position, a fully closed valve position, and a partially open valve position.

11. The system of claim 10, wherein the first and second vent valves are caused to selectively open and close based on rotation of the respective first and second cams.

12. The system of claim 11, further comprising an actuator assembly that drives the cam assembly, the actuator assembly including a motor.

13. The system of claim 12, wherein the motor comprises a direct current motor that rotates a worm gear that in turn drives a drive gear coupled to the cam shaft.

14. The system of claim 3, wherein one of the first and second vent valves comprises a solenoid activated vent valve.

15. The system of claim 3, wherein the controller is further programmed to pulse at least one of the first and second vent valves open and closed if the pressure in the fuel tank builds above a predetermined threshold after closing the first and second vent valves.

16. The system of claim 3 wherein the first vent valve has a smaller orifice than a corresponding orifice of the second vent valve.

17. An evaporative emissions control system associated with a vehicle fuel tank and configured to recapture and recycle fuel vapor emitted from the fuel tank, the evaporative emissions control system comprising:
at least one vent valve configured to selectively open and close a vent;
a fuel level sensor configured to sense a fuel level in the fuel tank;
a pressure sensor configured to sense a pressure in the fuel tank;
an accelerometer configured to measure an acceleration of the vehicle; and
a cam driven tank venting control assembly having a rotary actuator that rotates a cam assembly based on operating conditions, the cam assembly having a first cam having a first cam profile configured to open and close a first vent valve of the at least one vent valve;
wherein the cam driven tank venting control assembly determines if the vehicle is not moving based on a signal from the accelerometer sensor, determines if a fuel level in the fuel tank is increasing based on a first signal from the fuel level sensor, determines if a pressure in the fuel tank is increasing based on a signal from the pressure sensor and, determines a refueling event is occurring if it is determined the fuel level is increasing, the pressure in the fuel tank is increasing, and the vehicle is not moving, and wherein the cam driven tank venting control assembly opens the at least one vent valve in response to determining the refueling event is occurring, wherein the opening comprises actuating the rotary actuator.

18. The evaporative emissions control system of claim 17 wherein the at least one vent valve comprises a first vent valve and a second vent valve, the first vent valve having a smaller orifice than a corresponding orifice of the second vent valve.

* * * * *